(12) United States Patent
Marinelli et al.

(10) Patent No.: US 11,627,051 B2
(45) Date of Patent: *Apr. 11, 2023

(54) DETERMINING ASSET ASSOCIATIONS FOR DATA CENTER CUSTOMERS

(71) Applicant: Equinix, Inc., Redwood City, CA (US)

(72) Inventors: Michael Marinelli, Chicago, IL (US); William Maloney, Fullerton, CA (US); Swayambhu Raparti, Foster City, CA (US); Anthony J. Sukiennik, San Bruno, CA (US); Purvish Purohit, Sunnyvale, CA (US); Prabhakar Gundugola, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/074,255

(22) Filed: Oct. 19, 2020

(65) Prior Publication Data

US 2021/0036930 A1 Feb. 4, 2021

Related U.S. Application Data

(63) Continuation of application No. 15/404,064, filed on Jan. 11, 2017, now Pat. No. 10,812,339.

(Continued)

(51) Int. Cl.
*H04L 41/12* (2022.01)
*G06F 11/30* (2006.01)
(Continued)

(52) U.S. Cl.
CPC ............ *H04L 41/12* (2013.01); *G06F 1/3287* (2013.01); *G06F 3/04847* (2013.01);
(Continued)

(58) Field of Classification Search
CPC ..... H04L 41/12; H04L 41/0681; H04L 41/08; H04L 41/0893; H04L 41/16; H04L 41/22;
(Continued)

(56) References Cited

U.S. PATENT DOCUMENTS 7,310,664 B1 12/2007 Merchant et al.
7,496,888 B2 2/2009 Sanjar et al.
(Continued)

FOREIGN PATENT DOCUMENTS

| CN | 103329063 A | 9/2013 |
|----|----|----|
| EP | 1411456 A2 | 10/2003 |
| WO | 2017123674 A1 | 7/2017 |

OTHER PUBLICATIONS

"Wherever You Are Access Your Data," OSIsoft, osisofl.com, 2015, 4 pp. (Applicant points out, in accordance with MPEP 609.04(a), that the year of publication, 2015, is sufficiently earlier than the effective U.S. filing date, Oct. 19, 2020, so that the particular month of publication is not in issue.).

(Continued)

*Primary Examiner* — David R Lazaro
*Assistant Examiner* — Zia Khurshid
(74) *Attorney, Agent, or Firm* — Shumaker & Sieffert, P.A.

(57) ABSTRACT

A data center infrastructure monitoring system and method that includes a plurality of geographically distributed data centers, each data center comprising a plurality of mechanical assets. A data center gateway system communicatively coupled to one or more data centers of the plurality of data centers is configured to determine a subset of the plurality of mechanical assets of the data center that provide cooling to equipment of a customer of the data center, and output, for display, a graphical depiction of the subset of the plurality of (Continued)

mechanical assets of the data center that provide cooling to equipment of the customer in the data center.

22 Claims, 33 Drawing Sheets

Related U.S. Application Data

(60) Provisional application No. 62/353,471, filed on Jun. 22, 2016, provisional application No. 62/336,300, filed on May 13, 2016, provisional application No. 62/277,038, filed on Jan. 11, 2016.

(51) Int. Cl.

| | | |
|---|---|---|
| *G06F 11/32* | (2006.01) | |
| *H04L 41/22* | (2022.01) | |
| *H04L 49/40* | (2022.01) | |
| *H04L 67/1097* | (2022.01) | |
| *H04L 41/0681* | (2022.01) | |
| *H04L 41/08* | (2022.01) | |
| *H04L 41/0893* | (2022.01) | |
| *H04L 41/16* | (2022.01) | |
| *H04L 67/025* | (2022.01) | |
| *G06F 1/3287* | (2019.01) | |
| *G06F 3/04847* | (2022.01) | |
| *G06Q 50/06* | (2012.01) | |
| *H04L 67/00* | (2022.01) | |
| *H04L 67/10* | (2022.01) | |

(52) U.S. Cl.
CPC .......... *G06F 11/30* (2013.01); *G06F 11/3006* (2013.01); *G06F 11/3051* (2013.01); *G06F 11/3058* (2013.01); *G06F 11/3062* (2013.01); *G06F 11/32* (2013.01); *G06Q 50/06* (2013.01); *H04L 41/0681* (2013.01); *H04L 41/08* (2013.01); *H04L 41/0893* (2013.01); *H04L 41/16* (2013.01); *H04L 41/22* (2013.01); *H04L 49/40* (2013.01); *H04L 67/025* (2013.01); *H04L 67/1097* (2013.01); *H04L 67/00* (2013.01); *H04L 67/10* (2013.01); *Y04S 40/00* (2013.01)

(58) Field of Classification Search
CPC ... H04L 49/40; H04L 67/025; H04L 67/1097; H04L 67/00; H04L 67/10; G06F 1/3287; G06F 3/04847; G06F 11/30; G06F 11/3006; G06F 11/3051; G06F 11/3058; G06F 11/3062; G06F 11/32; G06Q 50/06; Y04S 40/00
USPC ....................................................... 709/223
See application file for complete search history.

(56) References Cited

U.S. PATENT DOCUMENTS

| | | | |
|---|---|---|---|
| 7,774,446 | B2 | 8/2010 | Nedelcu et al. |
| 8,639,482 | B2 | 1/2014 | Rasmussen et al. |
| 8,730,040 | B2 | 5/2014 | Donovan et al. |
| 8,737,357 | B2 | 5/2014 | Denny et al. |
| 8,738,753 | B2 | 5/2014 | Devraj et al. |
| 8,849,995 | B1 | 9/2014 | Gabrielson et al. |
| 8,930,331 | B2 | 1/2015 | McGrew et al. |
| 8,990,639 | B1 | 3/2015 | Marr et al. |
| 9,165,120 | B1 | 10/2015 | Brandwine et al. |
| 9,235,971 | B1 | 1/2016 | Juels et al. |
| 9,350,703 | B2 | 5/2016 | Murthy et al. |
| 9,426,030 | B1 | 8/2016 | Anerousis et al. |
| 9,429,927 | B2 | 8/2016 | Nesler et al. |
| 9,519,517 | B2 | 12/2016 | Dalgas et al. |
| 9,568,974 | B2 | 2/2017 | Khuti et al. |
| 9,571,588 | B2 | 2/2017 | Duffy et al. |
| 9,589,287 | B2 | 3/2017 | Hill et al. |
| 9,606,529 | B2 | 3/2017 | Livesay et al. |
| 9,634,893 | B2 | 4/2017 | Boutros et al. |
| 9,709,636 | B2 | 7/2017 | Witter et al. |
| 9,762,438 | B2 | 9/2017 | Anerousis et al. |
| 9,778,718 | B2 | 10/2017 | Zacho |
| 9,866,637 | B2 | 1/2018 | Doraiswamy et al. |
| 9,948,521 | B2 | 4/2018 | Doraiswamy et al. |
| 9,948,522 | B2 | 4/2018 | Marinelli et al. |
| 10,156,987 | B1 | 12/2018 | Gutierrez et al. |
| 10,574,529 | B2 | 2/2020 | Marinelli et al. |
| 10,812,339 | B2 | 10/2020 | Marinelli et al. |
| 2002/0052719 | A1 | 5/2002 | Alexander et al. |
| 2006/0193247 | A1 | 8/2006 | Naseh et al. |
| 2006/0193252 | A1 | 8/2006 | Naseh et al. |
| 2006/0271544 | A1 | 11/2006 | Devarakonda et al. |
| 2007/0094128 | A1 | 4/2007 | Rung et al. |
| 2009/0138313 | A1 | 5/2009 | Morgan et al. |
| 2009/0144338 | A1 | 6/2009 | Feng et al. |
| 2009/0144393 | A1 | 6/2009 | Kudo |
| 2009/0271725 | A1 | 10/2009 | Dirla |
| 2010/0005331 | A1 | 1/2010 | Somasundaram et al. |
| 2010/0057935 | A1 | 3/2010 | Kawai et al. |
| 2010/0127881 | A1 | 5/2010 | Schechter et al. |
| 2010/0131109 | A1 | 5/2010 | Rasmussen et al. |
| 2010/0188207 | A1 | 7/2010 | Glenn et al. |
| 2010/0211669 | A1 | 8/2010 | Dalgas et al. |
| 2010/0272262 | A1 | 10/2010 | Boubion |
| 2011/0077795 | A1 | 3/2011 | VanGilder et al. |
| 2011/0082596 | A1 | 4/2011 | Meagher et al. |
| 2012/0059934 | A1 | 3/2012 | Rafiq et al. |
| 2012/0102039 | A1 | 4/2012 | Gifford et al. |
| 2012/0158329 | A1 | 6/2012 | Hurri et al. |
| 2012/0266209 | A1 | 10/2012 | Gooding et al. |
| 2012/0290135 | A1 | 11/2012 | Bentevigna et al. |
| 2013/0110306 | A1 | 5/2013 | Wang et al. |
| 2013/0190899 | A1* | 7/2013 | Slessman ............... G06Q 10/04 700/28 |
| 2013/0198354 | A1 | 8/2013 | Jones et al. |
| 2013/0231786 | A1 | 9/2013 | Noguchi |
| 2013/0232240 | A1 | 9/2013 | Purusothaman |
| 2013/0297603 | A1 | 11/2013 | Brenker et al. |
| 2014/0025968 | A1 | 1/2014 | Khuti et al. |
| 2014/0298091 | A1 | 10/2014 | Carlen et al. |
| 2014/0359131 | A1 | 12/2014 | Seed et al. |
| 2015/0012566 | A1 | 1/2015 | Cartwright et al. |
| 2015/0051749 | A1* | 2/2015 | Hancock ............ G01R 21/1331 700/295 |
| 2015/0134123 | A1 | 5/2015 | Obinelo |
| 2015/0156079 | A1 | 6/2015 | Satterlee et al. |
| 2015/0180544 | A1 | 6/2015 | Morimoto et al. |
| 2015/0180736 | A1 | 6/2015 | Leung |
| 2015/0207682 | A1 | 7/2015 | Nichele et al. |
| 2015/0277856 | A1 | 10/2015 | Payne et al. |
| 2015/0280969 | A1 | 10/2015 | Gates et al. |
| 2015/0312311 | A1 | 10/2015 | Subramanian et al. |
| 2015/0350016 | A1 | 12/2015 | Gundogola et al. |
| 2016/0034329 | A1 | 2/2016 | Larson et al. |
| 2016/0050116 | A1 | 2/2016 | Sheshadri et al. |
| 2016/0063845 | A1 | 3/2016 | Lloyd |
| 2016/0087933 | A1 | 3/2016 | Johnson et al. |
| 2016/0124742 | A1 | 5/2016 | Rangasamy et al. |
| 2016/0127167 | A1 | 5/2016 | Chou et al. |
| 2016/0127254 | A1 | 5/2016 | Kumar et al. |
| 2016/0127454 | A1 | 5/2016 | Maheshwari et al. |
| 2016/0156711 | A1 | 6/2016 | Purusothaman |
| 2016/0308762 | A1 | 10/2016 | Teng et al. |
| 2016/0352588 | A1 | 12/2016 | Subbarayan et al. |
| 2016/0371957 | A1 | 12/2016 | Ghaffari et al. |
| 2017/0012941 | A1 | 1/2017 | Subbarayan et al. |
| 2017/0041248 | A1 | 2/2017 | Toy |
| 2017/0078241 | A1 | 3/2017 | Zhang et al. |
| 2017/0093958 | A1 | 3/2017 | Huang |
| 2017/0140071 | A1 | 5/2017 | Coates et al. |
| 2017/0192414 | A1 | 7/2017 | Mukkamala et al. |
| 2017/0200240 | A1 | 7/2017 | Marinelli et al. |
| 2017/0201413 | A1 | 7/2017 | Marinelli et al. |

(56) References Cited

U.S. PATENT DOCUMENTS

| | | |
|---|---|---|
| 2017/0201424 A1 | 7/2017 | Doraiswamy et al. |
| 2017/0201425 A1 | 7/2017 | Marinelli et al. |
| 2017/0201585 A1 | 7/2017 | Doraiswamy et al. |
| 2018/0157762 A1 | 6/2018 | Tee |
| 2018/0197393 A1 | 7/2018 | Gallo et al. |
| 2018/0231967 A1 | 8/2018 | Cohen et al. |

OTHER PUBLICATIONS

Emerson Network Power, ASCO PowerQuest Power Monitoring and Control Systems, Dec. 2011, Emerson Electric Co, Publication 3245 R3 (Year: 2011), 18 pp.

Prosecution History from U.S. Appl. No. 15/404,015, through Jan. 25, 2018, 70 pp.

Prosecution History from U.S. Appl. No. 15/404,055, through Mar. 2, 2018, 223 pp.

Prosecution History from U.S. Appl. No. 15/404,083, dated May 3, 2017 through Jan. 28, 2020, 137 pp.

SteadyPower.com, ASCO PowerQuest 5900 Custom Critical Power Management System 2016, Coffman Electrical Equipment Company (Year 2016), 5 pp. (Applicant points out, in accordance with MPEP 609.04(a), that the year of publication, 2016, is sufficiently earlier than the effective U.S. filing date, so that the particular month of publication is not in issue.).

Prosecution History from U.S. Appl. No. 15/404,064, dated Apr. 28, 2017 through Jun. 25, 2020, 90 pp.

* cited by examiner

DETERMINING ASSET ASSOCIATIONS FOR DATA CENTER CUSTOMERS

This application is a Continuation of U.S. patent application Ser. No. 15/404,064 filed Jan. 11, 2017, which claims the benefit of U.S. Provisional Application Ser. No. 62/277,038, filed Jan. 11, 2016, U.S. Provisional Application Ser. No. 62/336,300, filed May 13, 2016, and U.S. Provisional Application Ser. No. 62/353,471, filed Jun. 22, 2016, the entire content of each of which is incorporated herein by reference.

TECHNICAL FIELD

The disclosure relates to data management networks and, more specifically, to monitoring data center infrastructure.

BACKGROUND

A network services exchange provider or co-location provider (a "provider") may employ a communication facility, such as a data center or warehouse, in which multiple customers of the provider locate network, server, and storage gear and interconnect to a variety of telecommunications and other network service provider(s) with a minimum of cost and complexity. Data centers may be shared by the multiple tenants locating networking equipment within the data centers.

A data center may include a storage volume storing numerous electronic devices that produce heat, including network, server, and storage gear, as well as power distribution units for distributing power to devices within the facility, for example. The data center may also include cooling units to supply a cool air stream into the storage volume.

SUMMARY

In general, techniques are described for determining asset associations in a data center infrastructure monitoring system having globally distributed co-location facilities such as data centers. In one example, a system includes a plurality of geographically distributed data centers, each data center of the plurality of data centers comprising a plurality of physical infrastructure assets; a data center gateway system communicatively coupled to one or more data centers of the plurality of data centers and configured to, receive a request from a customer of a data center of the plurality of data centers to display a real-time power path that shows a current flow of power through a plurality of assets of the data center, determine a subset of the plurality of assets of the data center that provide power to equipment of the customer of the data center, and output, for display, a graphical depiction of the real-time power path between the subset of the plurality of assets of the data center that provide power to equipment of the customer in the data center.

According to one example, a method comprises receiving, by a computing device, a request from a customer of a data center to display a real-time power path that shows a current flow of power through a plurality of assets of the data center; determining, by the computing device, a subset of the plurality of assets of the data center that provide power to equipment of the customer of the data center; and outputting, by the computing device and for display, a graphical depiction of the real-time power path between the subset of the plurality of assets of the data center that provide power to equipment of the customer in the data center.

According to another example, a method comprises receiving, by a computing device, a request from a customer of a data center to display a real-time power path that shows a current flow of power through a plurality of assets of the data center; determining, by the computing device, a subset of the plurality of assets of the data center that provide power to equipment of the customer of the data center; and outputting, by the computing device and for display, a graphical depiction of the real-time power path between the subset of the plurality of assets of the data center that provide power to equipment of the customer in the data center.

According to another example, a computer readable storage medium comprises instructions that, when executed by at least one programmable processor of at least one computing device, cause the at least one computing device to: receive, by a computing device, a request from a customer of a data center to display a real-time power path that shows a current flow of power through a plurality of assets of the data center; determine, by the computing device, a subset of the plurality of assets of the data center that provide power to equipment of the customer of the data center; and output, by the computing device and for display, a graphical depiction of the real-time power path between the subset of the plurality of assets of the data center that provide power to equipment of the customer in the data center.

The techniques of this disclosure may provide one or more advantages, such as the ability to monitor heterogeneous data center infrastructure that combines legacy and modern infrastructure, a large scale of infrastructure components that may be located in multiple regions, metropolitan areas, and data centers. In some examples, the data center infrastructure monitoring system described herein may help address issues arising from inconsistent operational processes resulting from infrastructure vendor driven best practices, the exponential scale of the availability of data, including both data at rest and in transit. The techniques of this disclosure may allow for context building across global heterogeneous infrastructure and systems, providing integration between multiple systems for complex rule processing. The techniques of this disclosure may also provide a framework for integrated, synchronized data monitoring and management of both physical and virtual infrastructures, as well as across both mechanical and electrical infrastructure assets.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
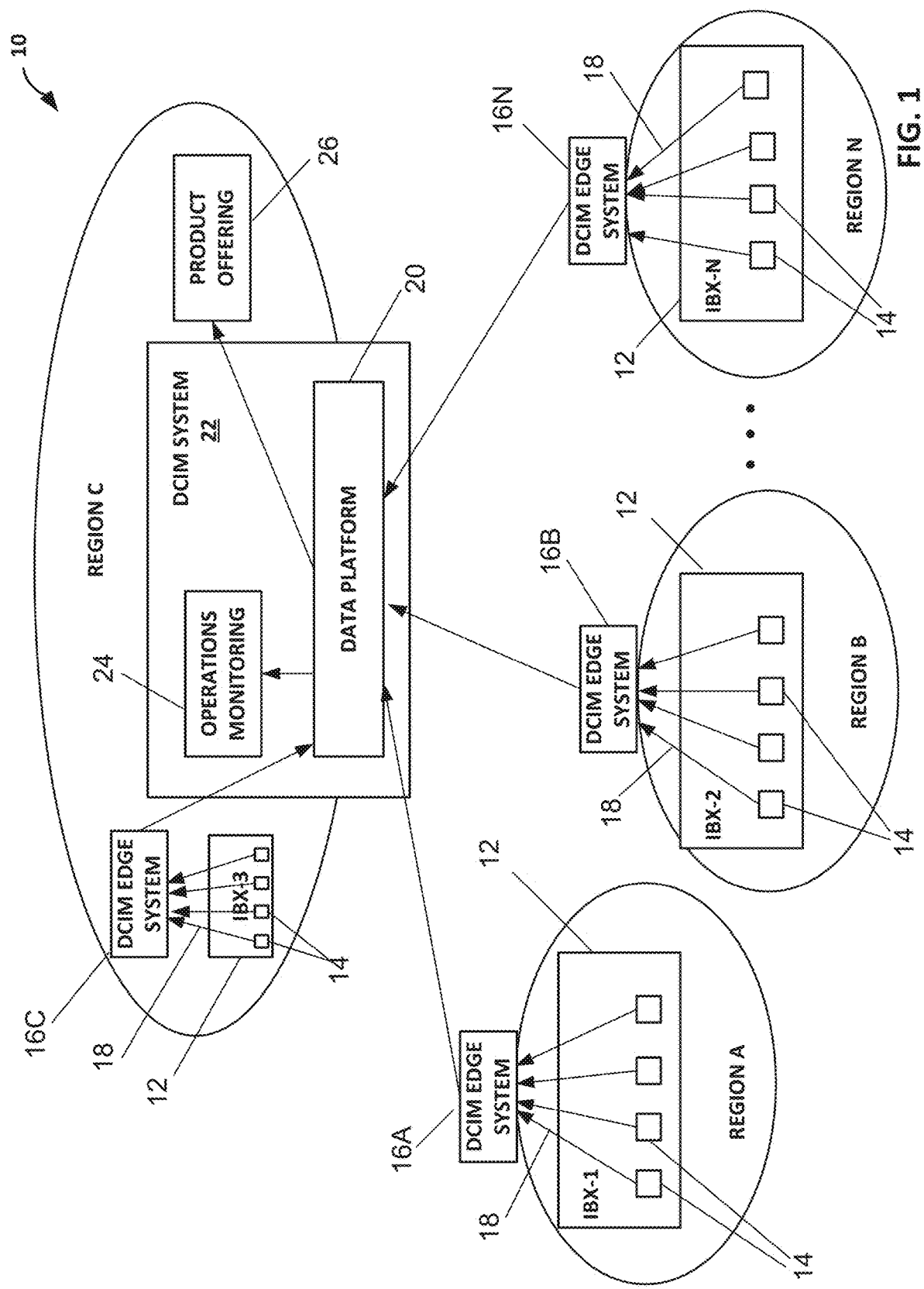
FIG. 1 is a block diagram illustrating an example system for data center infrastructure monitoring, in accordance with techniques described herein.

FIG. 1 is a block diagram illustrating an example system 10 for a data center infrastructure monitoring system, in accordance with techniques described herein. In the example of FIG. 1, system 10 includes multiple data centers 12 (also referred to herein as "co-location facilities" or "international business exchanges (IBX1-IBX-N)"), with each of the data centers 12 being located at one or more geographically distributed locations. For example, the data center infrastructure monitoring system 10 may include multiple data centers 12 located within a single region (e.g., country, continent) of regions A-N, or may include multiple data centers 12 located within multiple regions A-N.

Each of the multiple data centers 12 located within a given region A-N include multiple physical infrastructure assets 14 that enable operation of a physical building and IT systems located within the data center 12. For example, the assets 14 may include physical structure related to power systems and cooling systems associated with controlling the environment within the data center 12, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, assets 14 may include devices related to security, lighting, electrical, structural integrity, occupancy, or energy credits, for example. Each of the assets 14 are communicatively coupled to a corresponding one of data center infrastructure monitoring (DCIM) edge systems 16A-16N ("DCIM edge systems 16") via a connection 18. For example, each of the data centers 12 may communicate data associated with the assets 14 with the corresponding DCIM edge system 16 via one or more of a metro Ethernet network, the Internet, a mobile backhaul network, or a Multiprotocol Label Switching (MPLS) access network (not shown).

As shown in FIG. 1, respective DCIM edge systems 16 are located on different geographically distributed regions A-N. In some examples, a given region may have multiple DCIM edge systems 16 for multiple data centers 12 on the region, such as in different metropolitan areas, or multiple data centers in a metropolitan area. DCIM edge systems 16 may each be located within geographically distributed colocation facility provider facilities (not shown and hereinafter, "colocation facilities"), e.g., colocation data centers, each associated with (e.g., owned and/or operated by) a single colocation facility provider. The colocation service provider is a single entity, business, operator, service provider, or the like. In some examples, the colocation service provider operates an internet exchange, Ethernet exchange, and/or a cloud exchange, such as described in U.S. application. Ser. No. 15/099,407, entitled CLOUD-BASED SERVICES EXCHANGE, filed Apr. 14, 2016, the entire contents of which are incorporated by reference herein.

The distributed colocation facilities in which the DCIM edge systems 16 are located may be connected by Wide Area Network (WAN). In this way, each of the DCIM edge systems 16 are connected to a data platform 20 within an operations/monitoring center 22 located within one of regions A-N, including being located within one of regions A-N having one or more data centers 12 co-located therein. Data associated with assets 14 from multiple data centers 12 is therefore received by the operation/monitoring center of a central DCIM system 22, and the data is then stored in a central platform for subsequent analysis and distribution by an operations monitoring infrastructure 24. In some examples, the data may be offered as part of a product offering 26, and/or utilized by one or more of the data centers 12 to monitor and control infrastructure and optimize ongoing operation of the one or more data centers 12, as described below in detail.

In some examples, DCIM edge systems 16 and DCIM system 22 may include components that function well offline without using a network to back them up, such as by using local storage for buffering messages that need to go across the network. In some examples, DCIM edge systems 16 and DCIM system 22 may employ a data platform to support real time data streaming, data-in-transit to data-at-rest, which is reliable and robust to prevent data loss. In some examples, DCIM edge systems 16 and DCIM system 22 may include granular independent components designed to do one thing well.

DCIM system 22 may use a set of collaborating services (e.g., micro-services) organized around business capabilities. In some examples, DCIM edge systems 16 use infrastructure modeling (e.g., JSON-based) to standardize across machines and devices. DCIM edge systems 16 and DCIM system 22 may distribute and parallelize the processing of data from assets 14 across machines over the network.

Security features may be built in to system 10. For example, in some examples DCIM edge systems 16 and DCIM system 22 may include end-to-end trust points and countermeasures for each component in the ecosystem of system 10. In some examples, system 10 defines API contracts first using Domain Driven Design and exposes everything as a respective service. In some examples, DCIM edge systems 16 and DCIM system 22 may rely on container-based cloud native application development. In some examples, DCIM edge systems 16 and DCIM system 22 may use lightweight and platform-agnostic communication between the components and with each other using smart end points and light weight protocols. System 10 provides automation and continuous delivery and deployment to enable developers for seamless deployment and maintenance of assets 14 in system 10.

Figure 2:
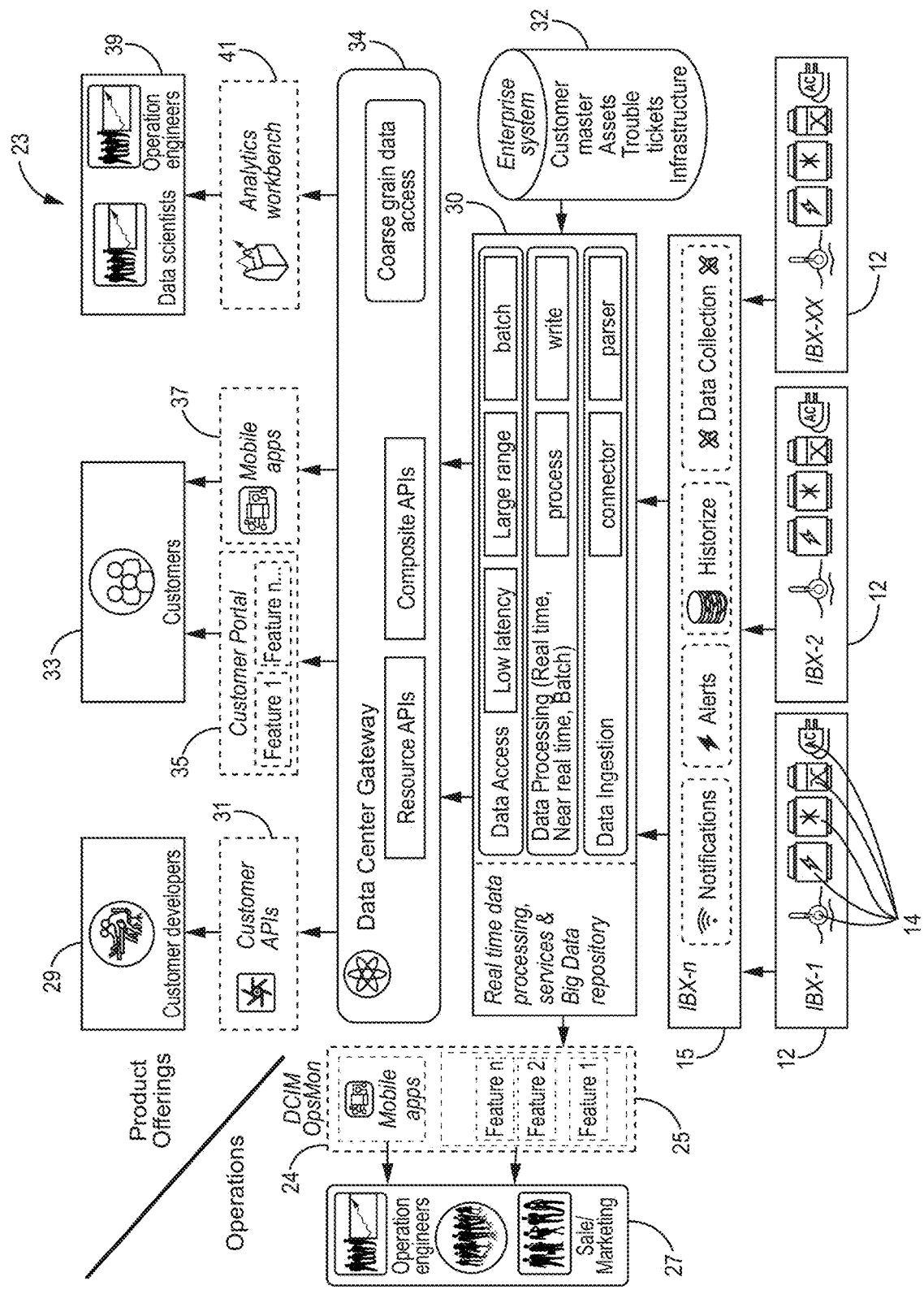
FIG. 2 is a block diagram illustrating an example data center infrastructure monitoring system, in accordance with techniques described herein.

FIG. 2 is a block diagram illustrating example reference architecture for a data center infrastructure monitoring system 23, in accordance with techniques described herein. The DCIM system 23 of FIG. 2 may correspond to DCIM system 22 and DCIM edge systems 16 of FIG. 1, for example. In the example of FIG. 2, the assets 14 included in the data centers 12 may include such data center infrastructure assets as temperature centers, power units, chillers, power usage and power switching, for example. The global DCIM system 10 includes a DCIM system 22 that gathers information related to the layer of assets 14 from multiple data centers 12, and stores the information within a data repository 30. The global information in data repository 30 is used to gather and create analytics for customers, business development and operations, using real time end to end data collection, operational analytics, predictive analytics, data processing and services. In some examples, data monetization and what-if analysis utilizing data science algorithms may be performed using the global information. An enterprise system 32 is included to enable data centers 12 to notify DCIM system 22 when specific assets are non-operational, i.e., "offline", or experiencing operational disturbances. Enterprise system 32 may store data relating to one or more of customer master assets, trouble tickets, and infrastructure, for example.

A data center gateway 34 integrates with customer portal 35 and customer application programming interfaces (APIs) 31 to enable role based access control for users of cross-functional nature, such as operations, sales and customer roles, along with access governance and perimeter access controls for each system. Data center gateway 34 may provide resource APIs, composite APIs, and/or coarse grain data access, for example. The global information is used by the DCIM operations monitoring infrastructure 24 to develop certain features and mobile applications used by operation engineers and sales and marketing, including micro-services architecture driven feature based development of applications. The DCIM system 22 may provide authorization, access controls, audit trails, notification services, system health checks and integration.

In this way, information 15, such as notifications, alerts, and history associated with particular asset events, along with general asset data is received from multiple data centers 12 (IBX1-IBXX) and is collected within data repository 30. Data repository 30 processes the data in real-time, near real time and/or in batches. The resulting processed multi-data center asset data is received by DCIM operations monitoring infrastructure 24, which transfers specific features 25 associated with the assets for internal operations 27 (e.g., internal to the co-location facility provider that operates data centers 12), including sales and marketing personnel and operations engineers, for example. In some examples, DCIM operations monitoring infrastructure 24 presents the data via mobile applications. In addition, the resulting asset data is received by customer developers 29 via customer APIs 31, and/or by specific customers 33 via customer portals 35 or mobile applications 37. The resulting data (e.g., coarse grain data) may also be accessed by data scientists and operations engineers 39 via an analytics workbench 41.

Figure 3:
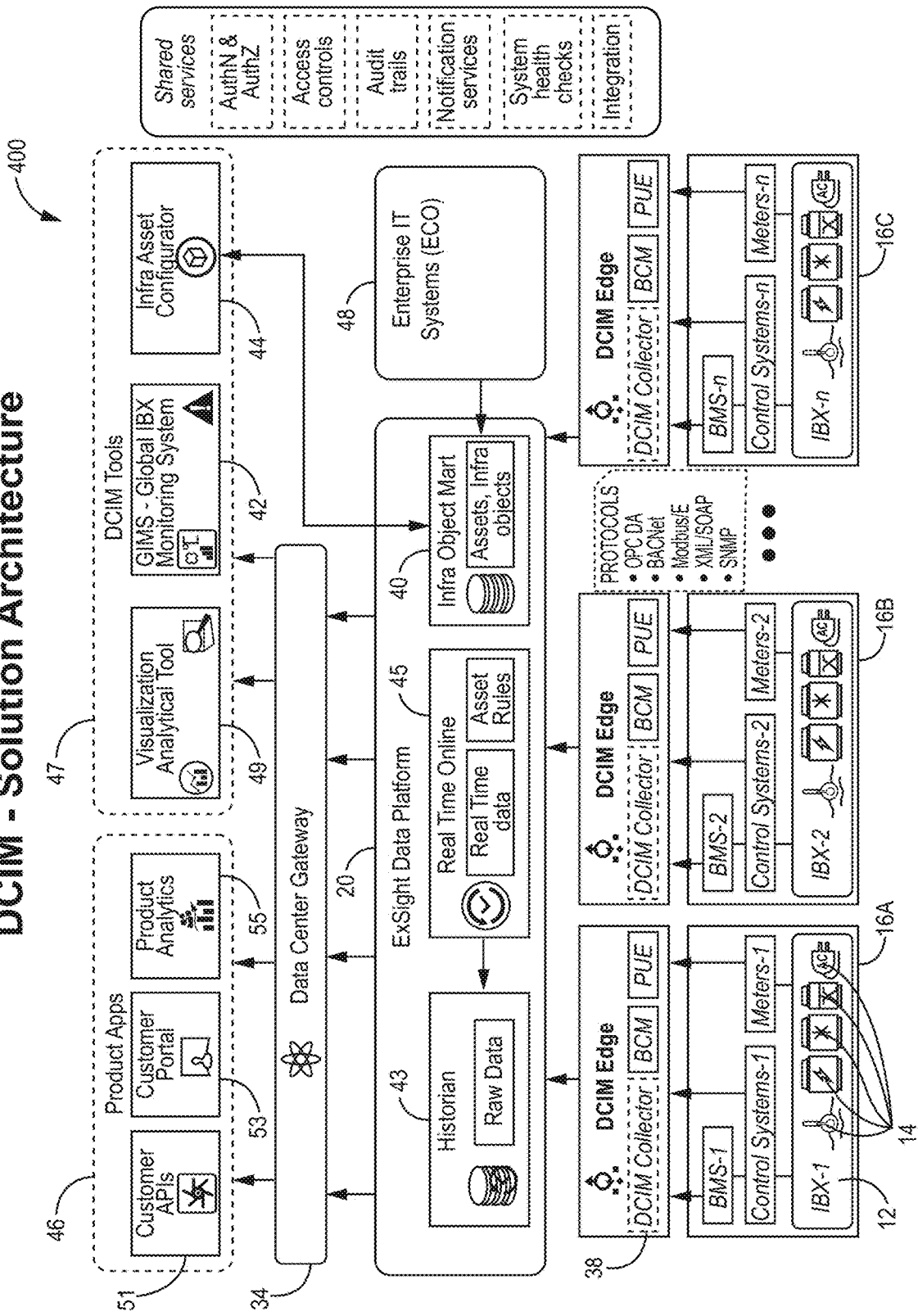
FIG. 3 is block diagram illustrating an example data center infrastructure monitoring system, in accordance with techniques described herein.

FIG. 3 is block diagram illustrating an example data center infrastructure monitoring system 400 architecture, in accordance with techniques described herein. The DCIM system 400 of FIG. 3 may correspond to DCIM system 22 and DCIM edge systems 16 of FIG. 1, and DCIM system 23 of FIG. 2, for example. In some examples, DCIM edge systems 16 receive data generated by assets 14 via one or more meters, control systems, and/or BMSs. In some examples, assets 14 may be "smart" devices, i.e., physical objects that contain embedded technology configured to provide some degree of computing intelligence. These smart devices may communicate and sense or interact with their internal states or the external environment.

In the example of FIG. 3, the DCIM edge systems 16 may include a DCIM collector 38 for collecting asset tag points and data interfacing, along with branch circuit monitoring (BCM) and power usage effectiveness (PUE) monitoring. In some examples, DCIM collectors 38 may each include interfaces for various protocols by which DCIM collectors 38 receive data from BMS, control systems, and meters, such as Open Platform Communications Data Access (OPC DA), Building Automation and Control Networks (BACNet), Modbus, Modbus over Ethernet (Modbus/E), eXtensible Markup Language (XML)/Simple Object Access Protocol (SOAP), and Simple Network Management Protocol (SNMP), for example.

Data platform 20 includes an infrastructure object mart 40 that is a data store for storing asset models and infra objects, described below, that receives asset data from multiple data centers 12 via associated DCIM edge systems 16 and drives processing of how data comes into the DCIM system 22, how the data is processed once within the DCIM system 22, and how the data is presented by the DCIM system 22 via a user interface or visualization tools. In this way, the DCIM system 22 performs common infra asset modeling for various assets 14 in the data centers 12, including alerts and notification configuration for tag points. DCIM system 22 includes data lifecycle management for real time online data storage, a data historian storing data history, real time alerts and notifications, and integration with a source system of record of the co-location facility provider that operates data centers 12. Data platform also includes a historian 43 for storing raw data, and a real time online data store 45 for storing real time data and asset rules. An enterprise IT system 48 interacts with the data platform 20 and may be utilized to make the data meaningful.

DCIM system 22 includes DCIM tools 47, such as a global data center (IBX) monitoring system (GIMS) 42 for data center health monitoring, reporting and dashboards, and infrastructure asset usage analysis, and a visualization analytical tool 49 for presenting and reviewing asset data information. In addition, DCIM tools 47 may include an infrastructure asset configurator 44 ("infra asset configurator") that transfers information to and receives data information from infrastructure object mart 40 and performs common infrastructure asset modeling for various devices in the data centers 12, along with alerts and notification configurations for tag points. Asset data is transmitted from data platform 20 to DCIM tools 47 via data center gateway 34. Product applications 46 in DCIM system 22 include application programming interfaces such as customer APIs 51 and customer portals 53, along with product analytics 55 for cross selling and upselling of data, which receive data from the data platform 20 via data center gateway 34.

Figure 4:
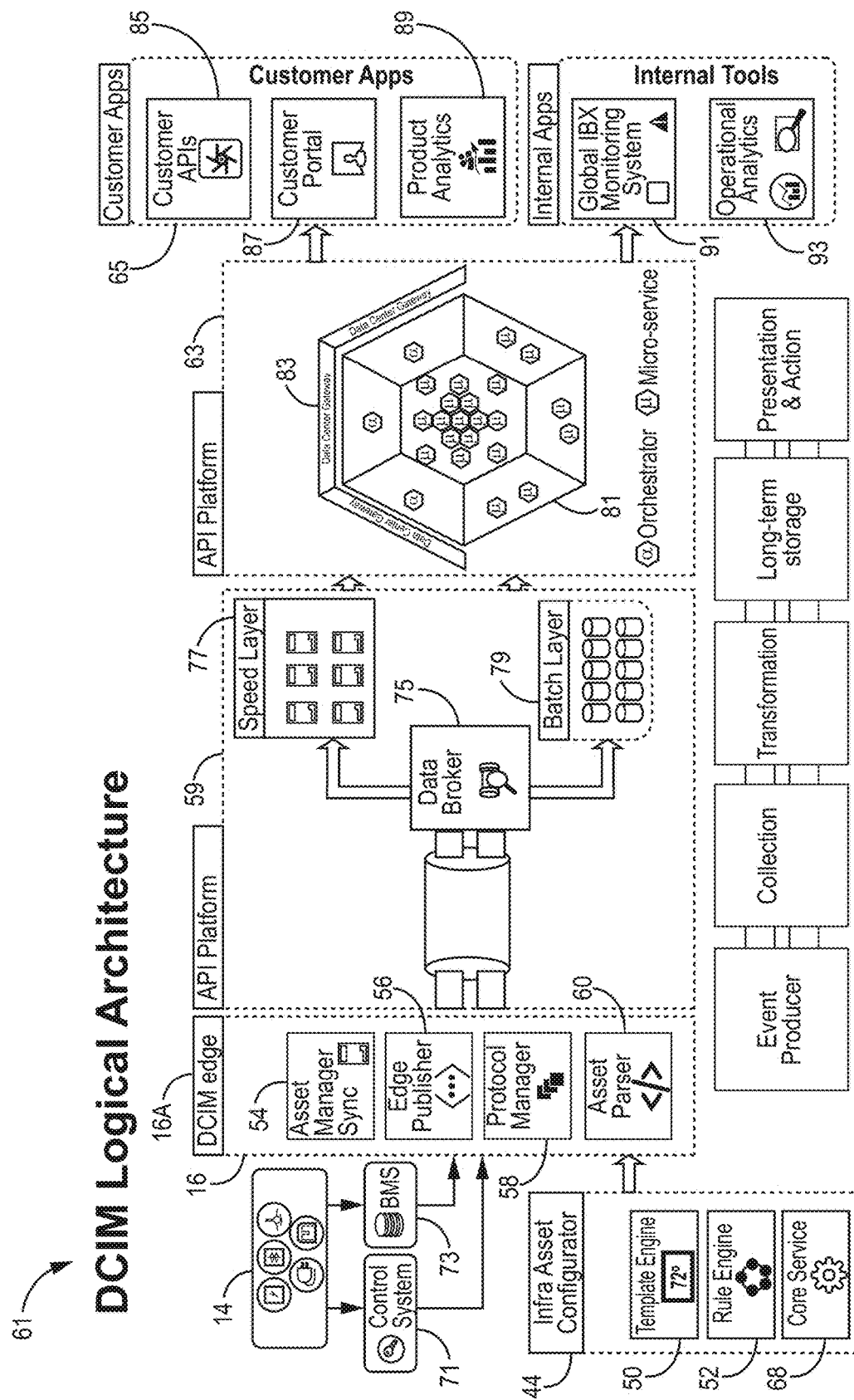
FIG. 4 is a block diagram illustrating a logical architecture in an example data center infrastructure monitoring system, in accordance with techniques described herein.

FIG. 4 is a block diagram illustrating an example logical architecture 61 of a data center infrastructure monitoring system, in accordance with techniques described herein. DCIM logical architecture 61 of FIG. 4 may correspond to DCIM system 22 and DCIM edge systems 16 of FIG. 1, for example. The DCIM logical architecture 61 may offer such functionality as event producing, collection, transformation, long-term storage, presentation, and action. In the example of FIG. 4, the DCIM logical architecture 61 includes an infra asset configurator 44 used by a DCIM edge system 16A to classify and manage a plurality of assets 14 for which DCIM edge 16 receives information. The DCIM logical architecture also includes a data platform 59 and an API platform 63 for providing data to customer applications 65 and internal applications 67.

In the example of FIG. 4, infra asset configurator 44 includes a template engine 50 for applying a template to data received from data centers 12, as described below, a rules engine 52 associated with the format of the templates, along with core services 68, described below in FIG. 6. Each DCIM edge system 16 includes an asset manager synchronizer 54, an edge publisher 56, a protocol manager 58 and an asset parser 60, for receiving asset data associated with assets 14 of the data center 12 via a control system 71 and a building management system (BMS) 73. Information related to data assets 14 is transferred to an associated DCIM edge 16 via control system 71 and BMS 73. A data broker 75 of data platform 59 receives the data assets via publisher 56 of DCIM edge 16 and processes the data using one or more of speed layer processing 77 and batch layer processing 79 techniques (described in further detail with respect to FIG. 8). API platform 63 (described in further detail with respect to FIGS. 10 and 11) includes an orchestrator 81 and underlying data service (micro-services) 83 for providing API endpoints for transmitting the asset data to customer applications 65, such as customer APIs 85, customer portals 87 and product analytics 89, and internal tools 67, such as global IBX monitoring system 91 and operational analytics 93.

Figure 5:
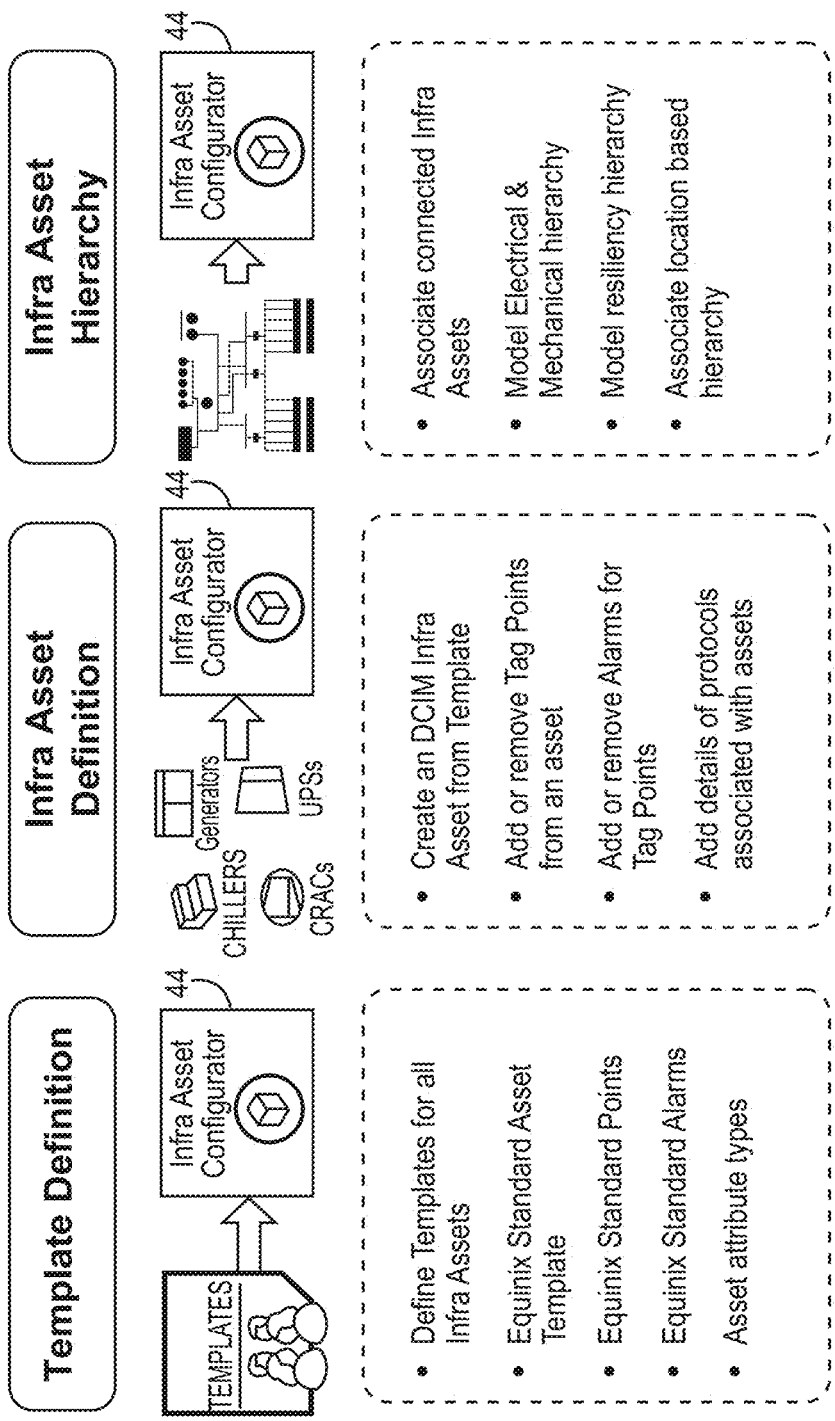
FIG. 5 is a block diagram illustrating an example normalization process of an infrastructure asset configurator in a data center infrastructure monitoring system, in accordance with techniques described herein.

FIG. 5 is a block diagram illustrating an example normalization process of an infrastructure asset configurator (e.g., infra asset configurator 44 of FIGS. 4 and 6) in a data center infrastructure monitoring system, in accordance with techniques described herein. A single data center 12 may typically include many assets 14 (e.g., approximately three hundred assets). Due to the large number of assets 14 that may be associated with each data center 12, challenges may arise in being able to compare and contrast data associated with the multitude of assets 14 across data centers 12. For example, in order to benefit from operational efficiencies, best practices are compared across the assets. The best practices could include, for example, practices related to how the asset was set up, how the asset is being configured, how the asset is being used, what hash points and readings are set up, and other any other relevant measurements and/or units associated with the asset. In accordance with the techniques of this disclosure, the DCIM includes an infrastructure asset configurator 44 that provides an asset normalization process, asset modeling options, and a roll-out approach for asset definition, normalization, and standardization. Infrastructure asset configurator 44 follows a normalization process that may include infrastructure asset configurator 44 defining templates, infrastructure asset configurator 44 defining infra assets (i.e., infrastructure asset data that logically represents physical infrastructure assets), and infrastructure asset configurator 44 associating the infra asset within an infra asset hierarchy.

Infrastructure asset configurator 44 initially sets up an asset model that includes an asset definition of each asset type so that assets can be categorized by being associated to a template. For example, if an asset is a generator, the asset is associated with a generator template. In this way levels of abstraction are provided for asset readings. For example, if there is a power distribution unit from which an output distribution reading may be generated and read, such as output voltage, it would be necessary that the reading generated from one data center at one location be identified in the same way as the output distribution from another data center at a different location, so that if the two are to be compared, they have the same tag name configuration to identify them. In other words, the infrastructure asset configurator provides a normalization process that includes asset configurations for defining asset models, for defining how to populate the asset models and what metadata is required to be able to normalize all of the infrastructure assets and asset points. Asset points are readings that the asset 14 is set up to record. For example, zone-temperature may be an asset point if a temperature sensor is available for an asset 14. In some cases, on average, there may be approximately 100 tag points per asset 14. Tag points are associated with units of measure since the quantity that the tag points are reading is intended to be associated with a unit of measure. The DCIM system may include a recording unit of measure, or quantity, to determine data compression rules.

In one example, the DCIM system 22 obtains the data for populating the templates from operation administrators associated with each data center who input data onto a spreadsheet for which protocol detail for each of the assets is part of the spreadsheet, and is then kept as a control list and is loaded into the data platform 20. The template definition includes the asset type information, and also includes all of the readings or points, and all alarms that have been associated with those points. Infrastructure asset configurator 44 may push the templates to other data centers to complete tags/asset type information using common protocols including the same tag names to enable cross comparison. In this way, infrastructure asset configurator 44 brings all assets to a common level of description for comparison using common protocols. The association is not a single data point association, but rather, infrastructure asset configurator 44 may map multiple points to points indicated in the template. Points that are unique only to a specific asset, such as to a single specific generator for example, may not be mapped by infrastructure asset configurator 44, so that only common points across all of the data centers are included in the template. In this way, when a new asset is generated in the DCIM system, the asset configurator 44 may automatically detect what template should be applied for the new asset based on the tag points included with the new asset, and on the mapping between tag points and the template. Assets may have as many as 60 points, and at a high level examples of the asset classifications may be electrical, mechanical, fire and smoke, along with other such infrastructure classifications, for example.

In this way, in the example of FIG. 5, during the normalization process, the infrastructure asset configurator 44 defines templates for all infrastructure assets during template definition to create standard asset templates, standard points, and standard alarms, along with standard asset attribute types. In some examples, the standards templates may be defined by the co-location facility provider operating data centers 12. During infrastructure asset definition, the infrastructure asset configurator 44 creates a DCIM infrastructure asset from the template, adds or removes tag points from an asset, adds or removes alarms for tag points, and adds details of protocols associated with assets. In some examples, an asset model includes pre-defined alarm definitions, e.g., based on the type of asset. During infrastructure asset hierarchy, the infrastructure asset configurator 44 associates connected infrastructure assets, models electrical and mechanical hierarchy, models resiliency hierarchy, and associates location based hierarchy. As a result of the described normalization process, the DCIM system provides a platform to compare and contrast data associated with assets. By providing the template with a defined set of asset tag points, the DCIM system is able to map tag points at an asset level to tag points of a template. For example, for an asset such as a generator, it may be the case that there are one or more generators from one location that have 15 tag points, for example, and one or more generators at another location that have 10 tag points. The DCIM system identifies a common set of tag points that, although the tag points may have been named differently at the two locations, the tag points are meant to have the same purpose, and maps the identified common tag points back to a standard nomenclature defined within the template itself. The resulting mapping may then be then stored.

Infrastructure asset configurator 44 may be employed to provide consistent infrastructure asset views across data centers, asset hierarchy navigation across tools, fault information dashboard (e.g., showing resiliency state), the ability to associate assets using a location-based hierarchy, system alarm dashboards, and infra asset master for data collection, and infra asset models used for all DCIM applications tools, customer applications, and APIs. One or more formats may be used for data modelling by infrastructure asset configurator 44, such as YANG (Yet Another Next Generation), YAML (Yet Another Markup Language), and JSON (JavaScript Object Notation).

Figure 6:
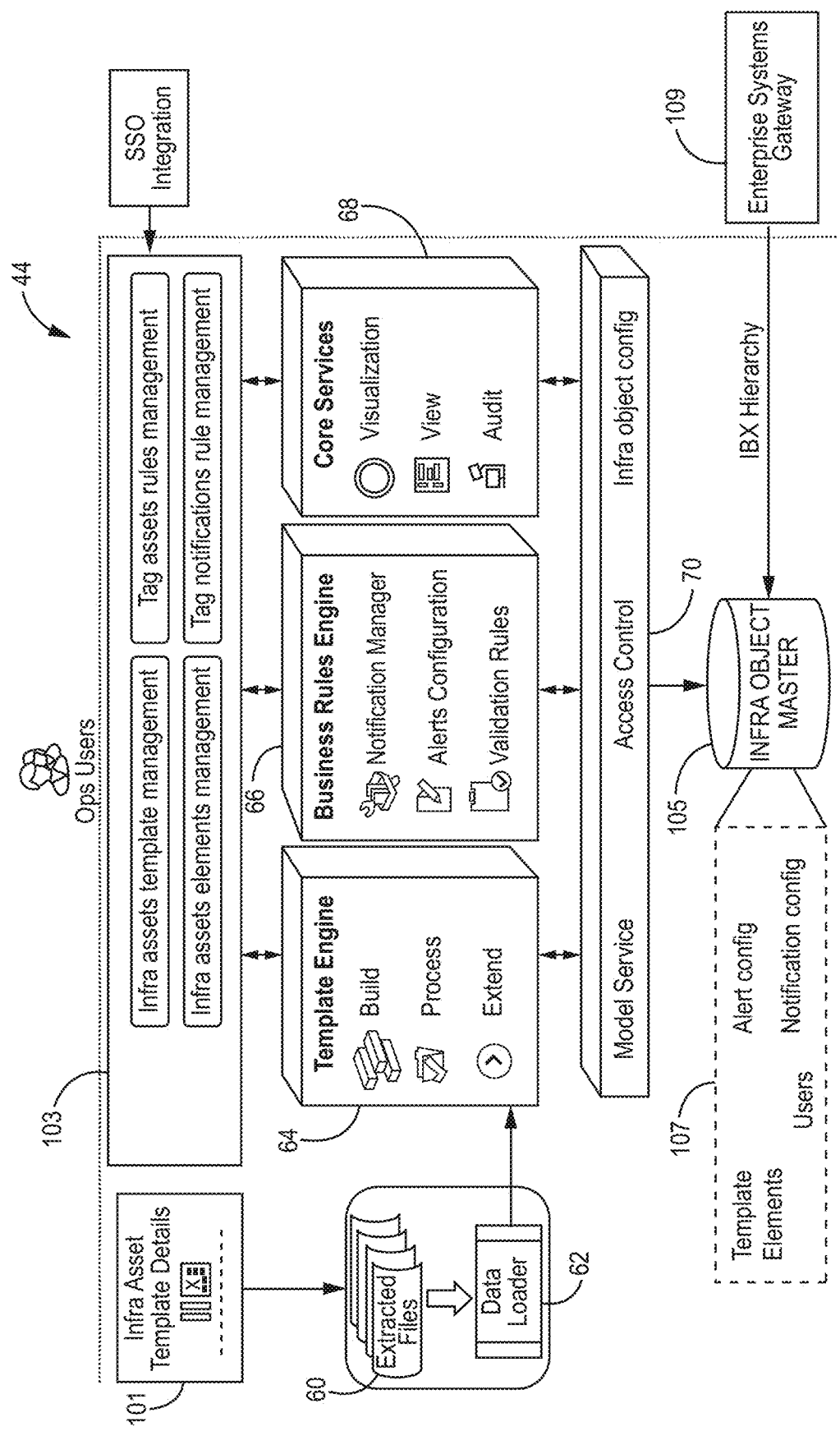
FIG. 6 is a block diagram illustrating in further detail an example infrastructure asset configurator in a data center infrastructure monitoring system, in accordance with techniques described herein.

FIG. 6 is a block diagram illustrating in further detail an example infrastructure asset configurator 44 in a data center infrastructure monitoring system, in accordance with techniques described herein. In the example of FIG. 6, during processing of the asset model, the process begins with data associated with infra asset template details 101 coming in from data sheets and spreadsheets as extracted files 60 that are received and loaded as spreadsheets by a data loader 62. For example, an infrastructure asset instance points template may be formatted as a spreadsheet that includes fields for general attributes, such as an asset instance name, operation, template matched point, display point name, short point name/reference name, point data collection type, data type, recording unit of measurement, decimal places, default state table, whether a data point is customer visable, etc., along with trending information such as COV (%), collection interval (in minutes), and so forth. An infrastructure assets instances spreadsheet may include fields such as operation, infrastructure asset template, asset instance name, customer visible point, location vector (value of the location vector selected in infra. asset template for this instance of the asset), asset ID, asset number, asset site ID, serial number, description, vendor, manufacturer, common attributes, base data collection information such as protocol and scan frequency (in seconds), and so forth.

A template engine 64 includes a building step where, based on the data from the template, the asset model is reconstructed and processed, and some configurations are defined as part of the template as a result of the newly received data. For example, if an oil level is less than a certain threshold, an alarm is generated. Template engine 64 also allows templates to be extended. Business rules engine 66 includes a notification manager for notifying the data centers of changes in configurations that are part of the templates, updates alert configurations, and may include validation rules associated with the template for the asset model using business rules and checks. The business rules engine 66 may allow the data to persist or may send the data back for correction when errors are identified. In some examples, data can be persisted using a database such as a NOSQL database.

In some examples, business rules engine 66 or other component of infra asset configurator 44 may be configured to automatically identify which particular infrastructure assert the infra asset configurator 44 has to go into to detect if a configuration information delta has occurred, or upon identifying a delta determine at which infrastructure asset the delta is and where that infrastructure asset is geographically located.

The infrastructure asset configurator 44 also includes core services 68, such as visualization tools, visualization/views including user interface screens to visually show what information has been provided, along with performing audits to record modifications that occurred and identify who performed the modifications. The infrastructure asset configurator 44 also includes access control 70 for determining who has access to what assets, i.e., external facing customers or internal operations facing guests. For external facing customers, it may be not desirable to allow exposure of all assets or reading to all customers. Rather, exposed data is confined to only those assets that the customer is associated with, and which data center and which cage the specific customer belongs to, so as not to mix information shared by multiple customers. As a result, the access controls are applied on top of the assets indicating who has what access.

In addition, since access is typically upstream, in some examples the DCIM system 22 does not control turning on/off of infrastructure, but rather the assets respond to proprietary controls at the data center by local operations teams. In other examples, the DCIM system 22 may be used by customers or data center operations teams to control or manage infrastructure assets. As one example, customers may use DCIM system 22 to provision infrastructure assets in a self-servicable manner. As another example, a customer may have smart locks in the customer's cabinets or cages in the data center, and the customer may use the DCIM system 22 to lock or unlock the smart locks. Operations users may interface with asset and tag management module 103, which may support such functionality as infra assets template management, infra assets elements asset, tag asset rules management, and tag notifications rule management. Asset and tag management module 103 enables the data asset information within each data center 12 to be transmitted from template engine 64, business rules engine 66, and core services 68 to operational users for creation, review and processing. Asset and tag management module 103 may have single sign on (SSO) integration, such as with a federation server that provides identity management and single sign-on via a web interface.

In addition, an infra object master 105 stores data such as templates, elements, alert configuration, notification configuration 107, and may receive data center hierarchy information from an enterprise systems gateway 109. Infra object master 105 receives data from the layer of infra asset configurator that supports model service, access control, and infra object configuration.

The infrastructure asset configurator 44 uses templates for multiple infrastructure assets, such as generators, chillers, HVAC, etc., that are used to generate an infra asset master for DCIM and sources data from various source system records (namely IBX Master). In addition, a user interface is included in infrastructure asset configurator 44 that is used by global operations engineering to manage asset normalization. The infrastructure asset configurator 44 includes single sign on and uses APIs for create, read, update and delete (CRUD) operations on asset master data.

In some examples, infra asset configurator 44 may rely on manual uploads of asset information, and not user interface-based configuration. Asset normalization is performed for manually uploaded asset information using a data attributes (points) library and an infrastructure object template library, for example, while data center (IBX) onboarding includes template instantiation, infra object hierarchy management, scan frequency set-up and data collection enablement.

In some examples, infra asset configurator 44 may be automated using a user interface enabling a core services and business rule engine to be built, along with generation of standard device name, standard point name, device definition, device hierarchy management and device templatization.

In some examples, an infra asset configurator 44 may be rolled out in a phased manner, using manual uploads in a first phase and automated UI-based in a second phase.

Figure 7A:
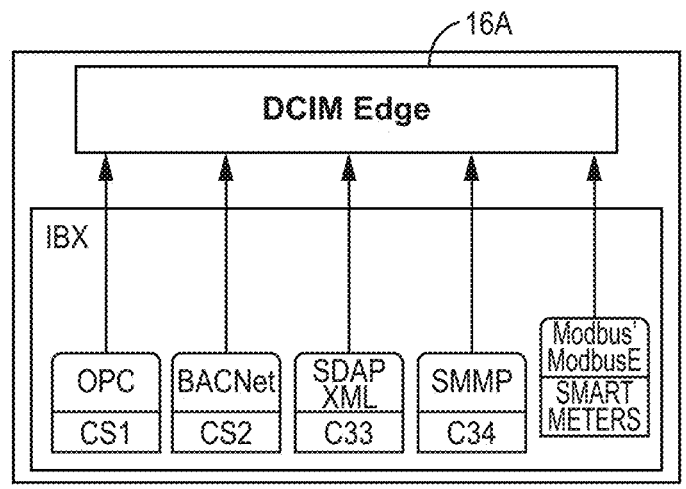
FIGS. 7A-7C are block diagrams illustrating various example infra assets access patterns by a DCIM edge system.
Figure 7B:
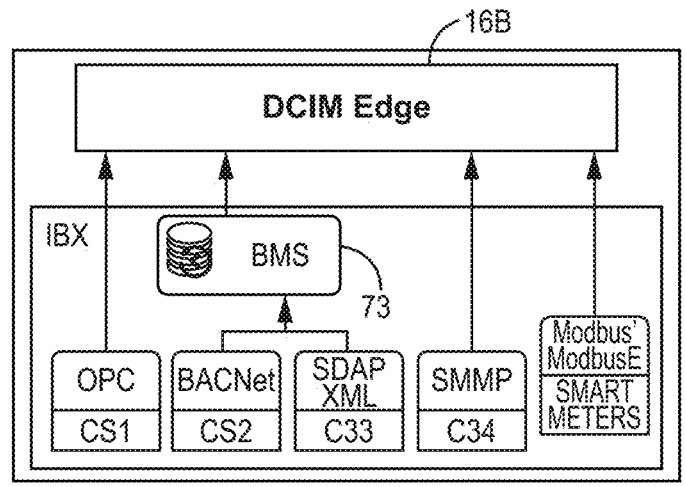
Figure 7C:
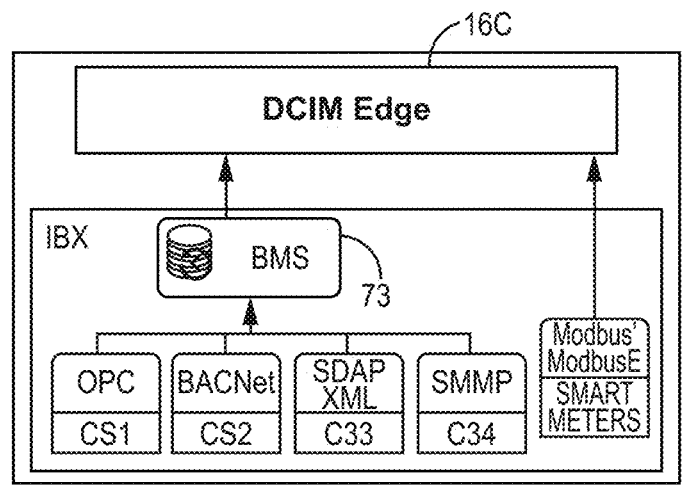

FIGS. 7A-7C are block diagrams illustrating various example infra assets access patterns by a DCIM edge system 16A. In the example of FIG. 7A, DCIM edge system 16A may access only control systems CS1-CS4 in a data center (IBX). This may be the case when a building management system (BMS) does not exists or is not connected, or does not have high level interfaces. In the example of FIG. 7A, DCIM edge system 16A interfaces directly with control systems or smart meters using respective protocols such as Open Platform Communications Data Access (OPC DA), Building Automation and Control Networks (BACNet), Modbus, Modbus over Ethernet (Modbus/E), eXtensible Markup Language (XML)/Simple Object Access Protocol (SOAP), and Simple Network Management Protocol (SNMP), for example, which may be known protocols (although this may vary based on some proprietary control systems). In this example, data collection from the control systems may be either Change of Value (COV)/subscription based (data is collected only when there is a change in value) or polling-based.

In the example of FIG. 7B, DCIM edge system 16A may follow a hybrid access model, accessing some control systems directly and accessing some control systems via a BMS 73. This may be the case when a BMS exists and can act as mediator, but not all control systems are connected with BMS 73. In this example, data collection from BMS 73 may be polling based, and data collection from Control Systems is either COV/subscription based or polling based, depending on the protocol. In some examples, BMS 73 can potentially put additional constraints, if BMS capabilities are subpar relative to those of the control systems.

In the example of FIG. 7C, DCIM edge system 16A may access control systems only via the BMS 73 in a data center (IBX). This may be the case when a BMS 73 exists and can act as a mediator between DCIM edge system 16A and all of the control systems. This approach may leverage a BMS's existing integration with Control systems. In some examples, BMS 73 can potentially put additional constraints, if BMS 73 capabilities are subpar relative to those of the control systems. In this example, data collection from BMS 73 may be polling based.

Figure 8:
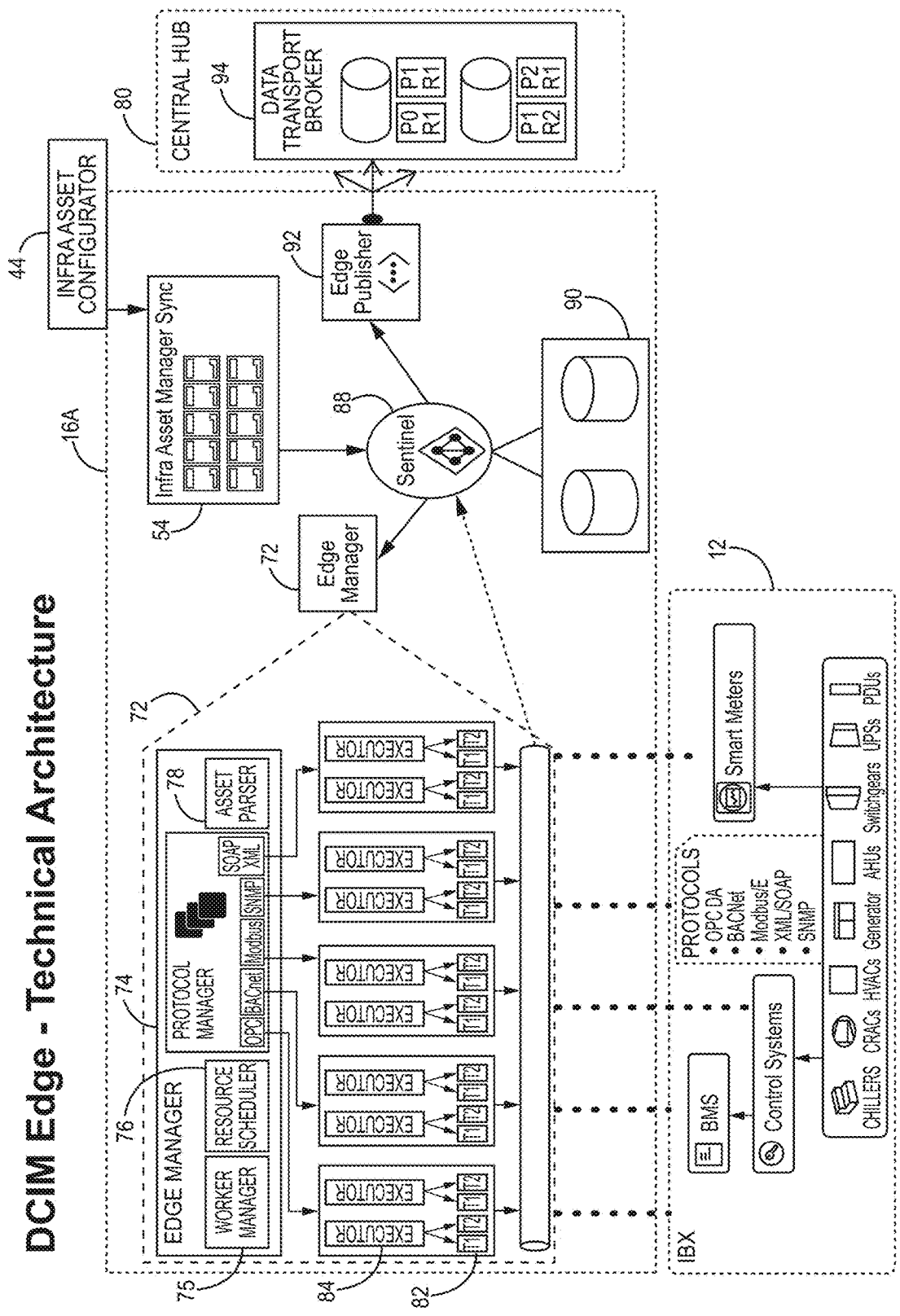
FIG. 8 is a block diagram illustrating an example edge system in a data center infrastructure monitoring system, in accordance with techniques described herein.

FIG. 8 is a block diagram illustrating an example edge system in a data center infrastructure monitoring system, in accordance with techniques described herein. FIG. 8 illustrates a DCIM edge system, such as DCIM edge system 16A of FIG. 4, in further detail. In the example of FIG. 8, the assets and asset models defined and uploaded within the infrastructure asset configurator 44, as described above, are received by an edge manager 72 of DCIM edge system 16A via infra asset manager synchronizer 54. A protocol manager 74 within the edge manager 72 receives the defined asset models for particular instances, and selects a protocol for that defined asset model. In the example of FIG. 7, edge manager 72 also includes a worker manager 75, a resource scheduler 76 and an asset parser 78.

In some examples, protocol manager 74 may automatically discover devices and instruments that come into the network. Executors 84 are software components that query the BMS or components to get the data from them. Edge manager 72 may be configured to automatically detect those systems that come into the system in the IBX, and automatically select the right protocol to communicate with those systems, and automatically start collecting data from them. Edge manager 72 does this all without requiring manual configuration of the systems at the DCIM edge system 16 (e.g., without requiring manual entry of the IP addresses and/or protocols to use for communicating with the sensors, BMS or control systems in the IBXs). In some examples, the customers may want to install devices themselves, and the customer could submit a list of trusted devices to DCIM edge 16A, and then the DCIM edge system could automatically discover the trusted devices.

Infra asset configurator 44 is where all the asset models are defined, such as by using asset templates, for example. As one example, a template may specify how to connect to an asset such as a generator (what protocol does the generator use to communicate), what are the data points available from the generator. This information is all in the asset model defined by the infra asset configurator 44. IBX operations team may upload info into infra asset configurator 44, for example.

Infra asset configurator 44 may create the asset model payload and stream the asset model payload to DCIM edge 16A, at local IBX environment. Protocol manager 74 receives the asset model for that particular asset, and then parses the asset model to identify the protocol to use for communicating with particular assets in the IBX.

Resource scheduler 76 determines how many executors are needed to process the data from the devices, such as based on the number of devices. Executors 84 are distributed processing software components. In some examples, in a central cloud compute infrastructure, the executors 84 may be endpoints driven by microservices. Edge manager 72 dynamically spins up more executors, and resource scheduler 76 schedules more executors based on need.

Protocol manager 74 manages a plurality of different executors 84 and threads (T1, T2) 82, with two threads per executor 84 in the example of FIG. 8. Protocol manager 74 sends a particular part of the payload to an executor 84. Executor 84 looks at the many different tag points and applies some grouping logic to group the tag points. The grouping is based on one or more parameters, such as poll frequency and bucket size, for example. For example, executor 84 may group the tag points that should be polled at the same time. Threads T1 and T2 82 for an executor will then poll the tag points at the IBX 12 and pull the data for the group of tags at the appropriate poll frequency. A given thread 82 is associated with a given group of tags, as grouped by executor 84. Some protocols send data based on events, and edge manager 72 subscribes to the protocol to receive event-driven data updates.

Worker manager 75 is a lifecycle manager. Worker manager 75 manages the lifecycle of the executors 84. If an executor 84 crashes, worker manager 75 brings the executor 84 back to a safe state. Resource scheduler 76 interacts with worker manager 75.

Executors 84 then store the data to database(s) 90, e.g., via a data hub such as sentinel 88. Stored data may include an asset ID, a data value, and a timestamp indicating a time the data was obtained, as an example. From there, database 90 publishes the data to edge publisher 92 which in turn sends the data to a data broker 94 of central hub 80.

Figure 9:
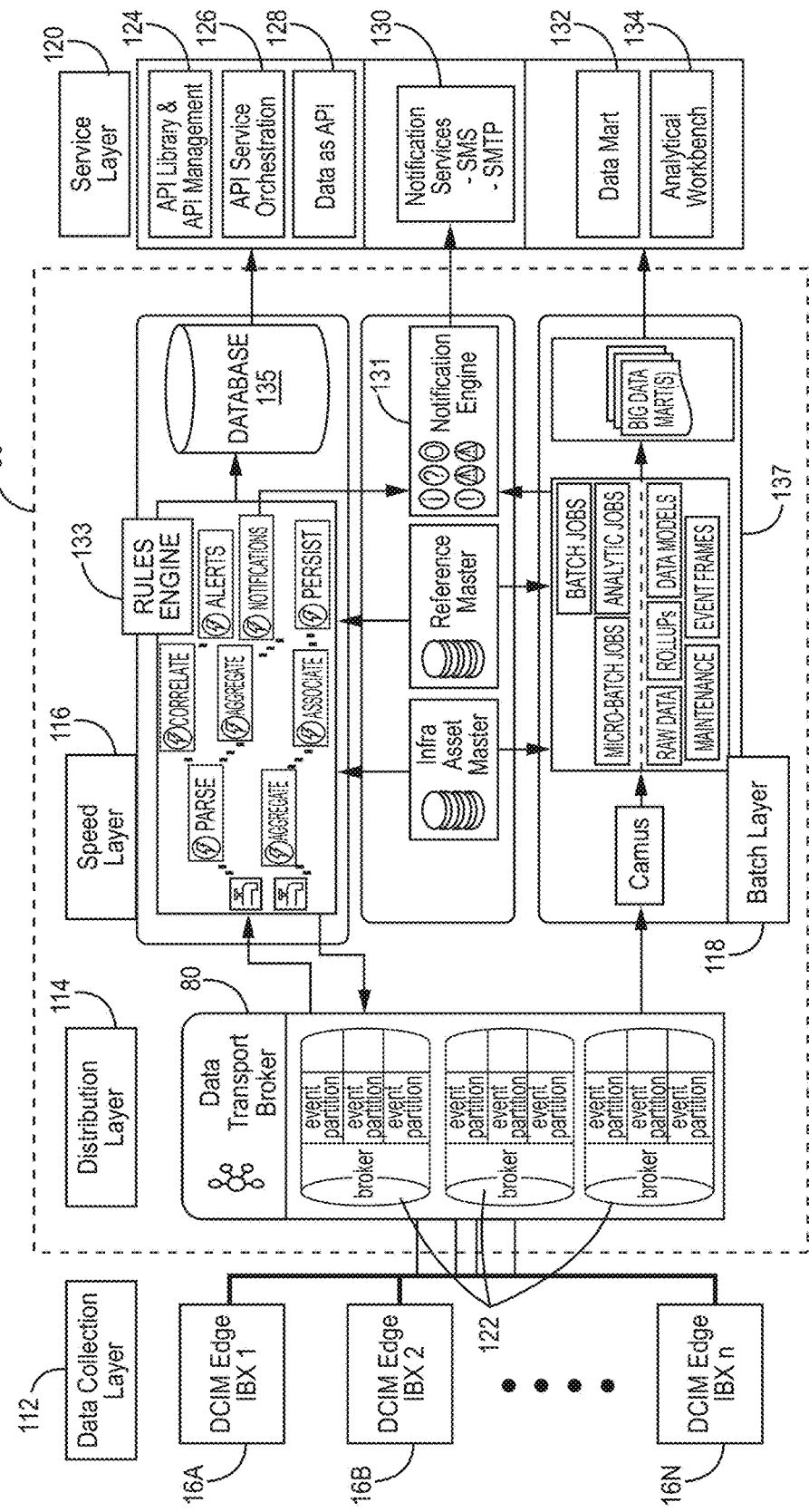
FIG. 9 is a block diagram illustrating an example data center gateway data platform in a data center infrastructure monitoring system, in accordance with techniques described herein.

FIG. 9 is a block diagram illustrating an example data center gateway data platform technical architecture 110 in a data center infrastructure monitoring system, in accordance with techniques described herein. In the example of FIG. 9, an architecture of data platform 59 includes a data collection layer 112, a distribution layer 114, a speed layer 116, and a batch layer 118 located within data platform 59, and a service layer 120. Data is transmitted from multiple DCIM edge systems 16A-16N associated with multiple data centers 12 of data collection layer 112, and received by associated brokers 122 of data transport broker 86 within distribution layer 114.

Batch layer 118 includes a big data pipeline, such as Camus, which runs as a job and consumes data from data transport broker 86 into a distributed file system, for example. Batch layer 118 may include batch jobs, micro-batch jobs, analytics jobs, raw data, roll-ups, data models, maintenance, and event frames, for example. These may receive data from infra asset master and reference master, and feed into notification engine 131 and big data mart(s). Data from the big data mart(s) of batch layer 118 may then go to data mart 132 and analytical workbench 124, for example.

Speed layer 116 may aggregate, associate, and persist DCIM asset events received from data transport broker 86. Speed layer 116 may parse DCIM asset events, correlate and/or aggregate events, and identify events that warrant alerts. For example, speed layer 116 may include a rules engine 133 that applies alert rules and notifies notification engine 131 when alert-worthy events are detected based on the alert rules. In some examples, rules engine 133 applies business rules for real-time processing of asset events. For example, a rule may specify that whenever a particular tag point goes beyond a configured threshold, raise an alarm (e.g., a temperature goes above a threshold temperature). A raised alarm may be one example of an asset event. The alert rules may be created in response to receiving the user inputs configuring alerts, and, for example, may be conditional alerts, as described later In some examples, speed layer 116 may store a customer-to-device association, and may also have access to a maintenance schedule for a customer. In this example, speed layer 116 may determine that a device is not sending data, associate the device with the customer, and determine that the maintenance schedule for the customer indicates that the device is planned to be down for maintenance. In this case, speed layer 116 will not identify the device not sending data as an event warranting an alarm.

Speed layer 116 may also store or access information defining a hierarchy of assets that indicates how the assets are connected and/or the interdependency between assets. In some examples, a hierarchy of assets may specify a primary asset and a corresponding backup asset. When rules engine 133 identifies that an asset has triggered a rule, speed layer 116 can associate the asset with other related assets to identify other assets that may be affected by a raised alarm in an asset. For example, if a primary asset becomes non-operational, speed layer 116 may determine that a corresponding backup asset will become operational as a result. In some examples a power and electrical hierarchy may indicate whether power and electrical are running on a primary asset or a backup asset. This may be referred to as resiliency status. The speed layer 116 provides this information back to the data center operations team, e.g., via notification services or dashboard APIs, so the team has an overall idea of how the power chain and mechanical chains are operating.

Figure 15:
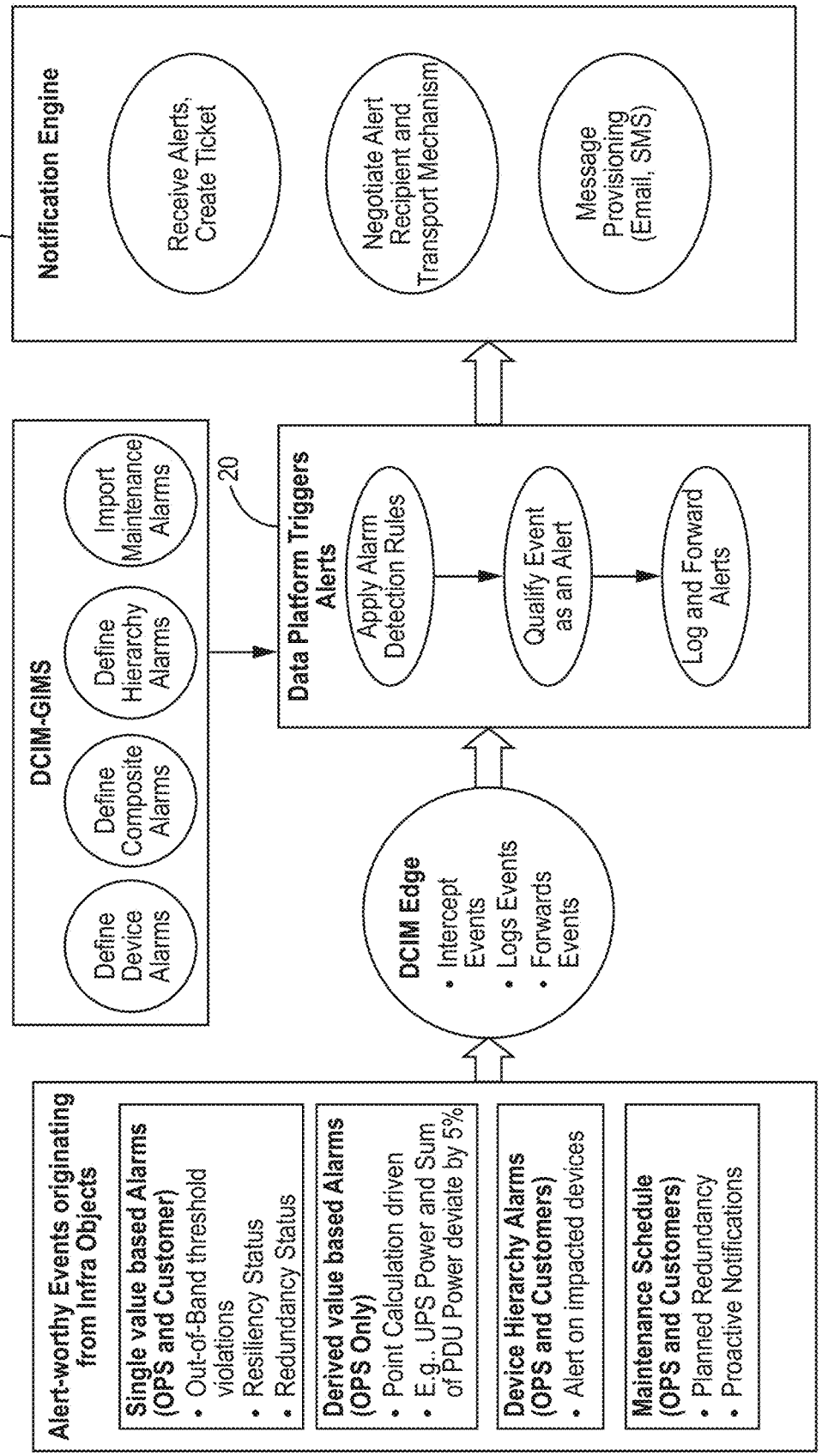
FIG. 15 is a block diagram illustrating an example alerts and notification process in a data center infrastructure monitoring system, in accordance with techniques described herein.
Figure 19:
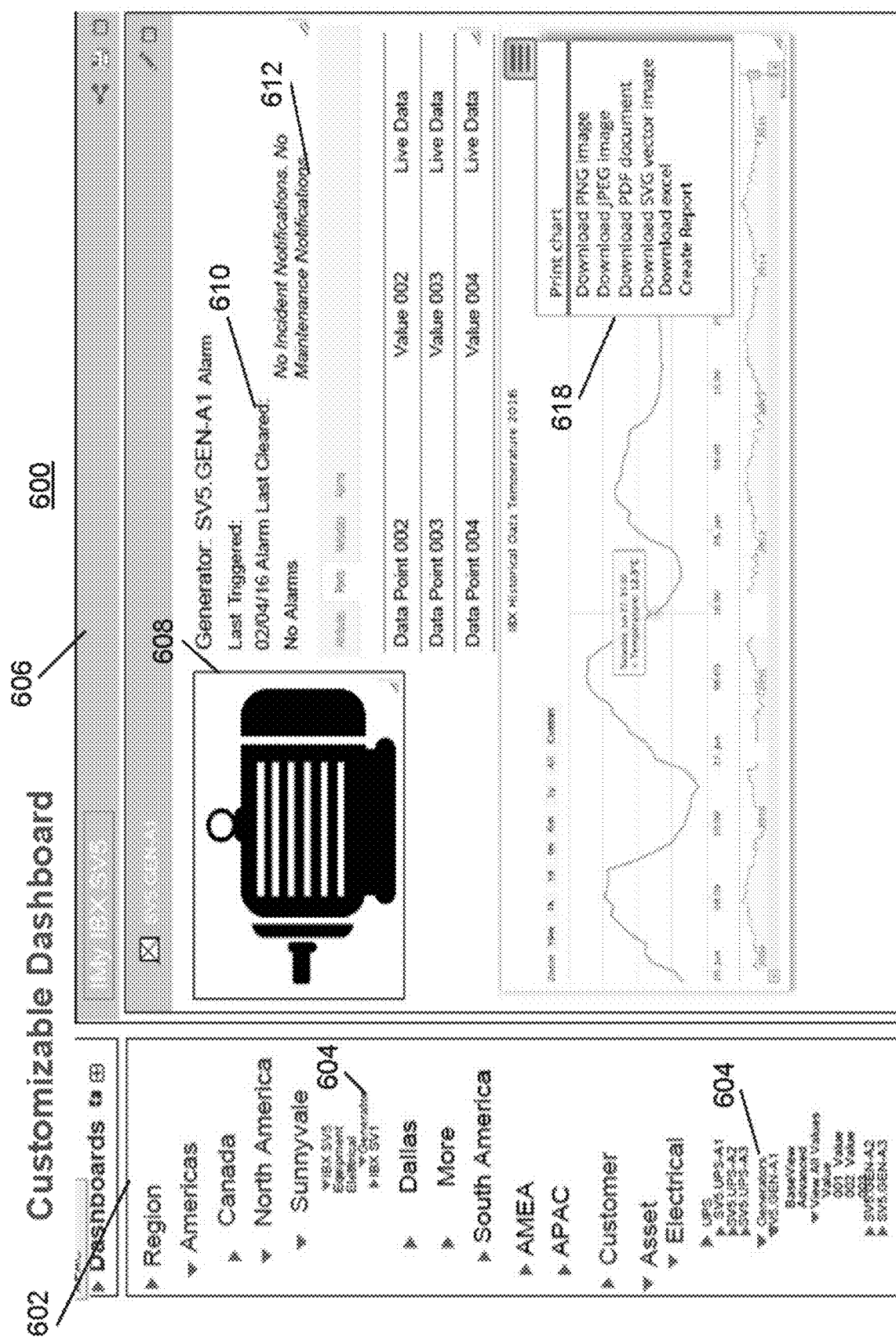
FIG. 19 is a schematic diagram illustrating an example customizable dashboard for displaying an asset in accordance with techniques described herein.

Notification engine 131, described in further detail with respect to FIG. 15, provides notification services based on alerts received from the batch layer and/or speed layer. For example, the alerts may be configured as described herein with respect to FIGS. 30-33. Speed layer 116 stores indications of asset events to a database 135 (e.g., Cassandra) and to an analytical layer 137 (e.g., Hadoop) in the batch layer that may be used for running reports later, etc. The database 135 provides data to API library and API management 124, API service orchestration 126, and data as API 128 of service layer 120. The service layer 120 may display information by a custom dashboard, e.g., using APIs. An example custom dashboard is shown in FIG. 19.

Service layer 120, which receives the data from data platform 59, includes API library and API management 124, API service orchestration 126, data as API 128, notification services 130, such as SMS and SMTP, a data mart 132 and an analytical workbench 134.

Figure 10:
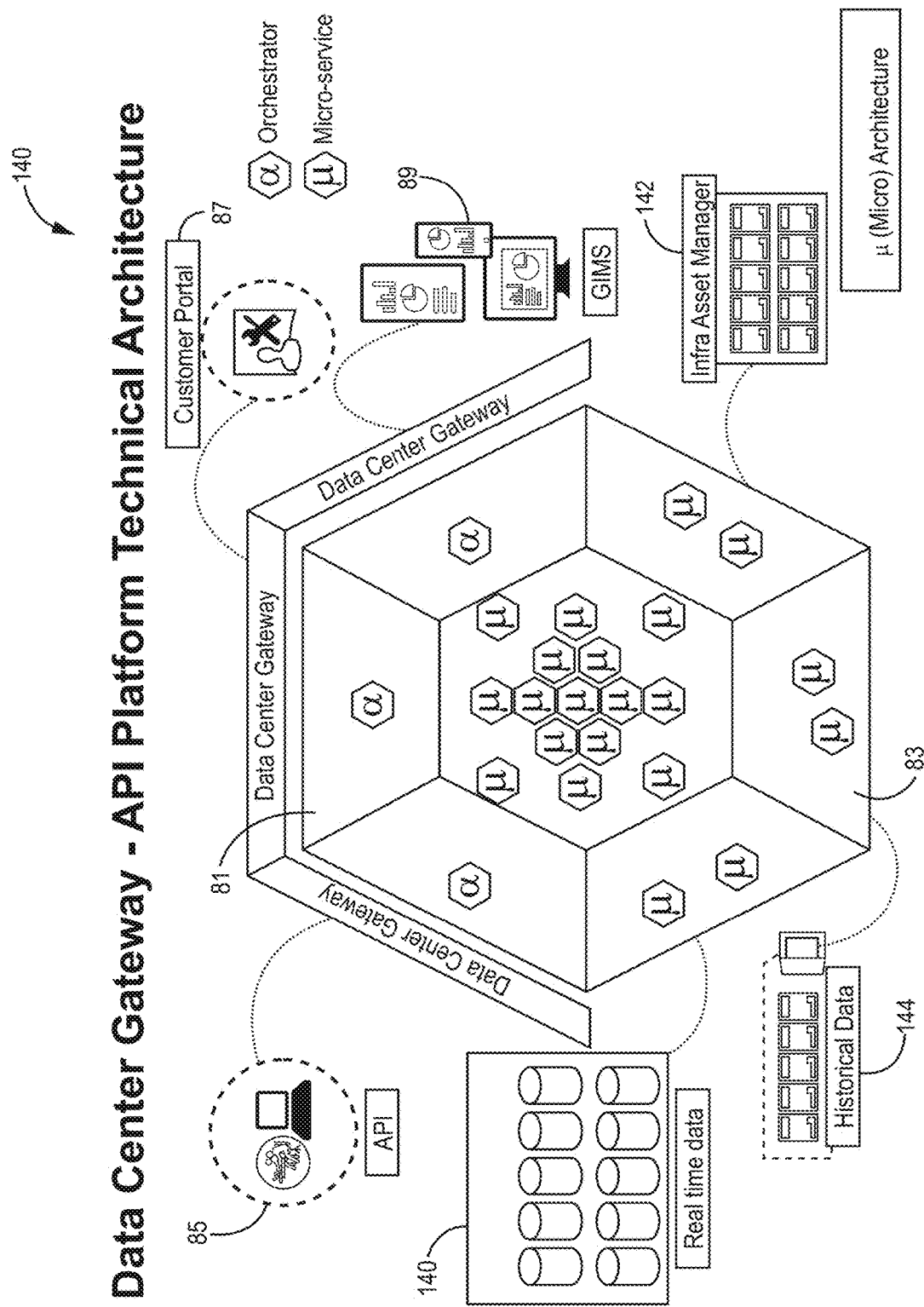
FIG. 10 is a block diagram illustrating an example application programming interface (API) in a data center infrastructure monitoring system, in accordance with techniques described herein.

FIG. 10 is a block diagram illustrating an example application programming interface (API) in a data center infrastructure monitoring system, in accordance with techniques described herein. In the example of FIG. 10, an example API platform technical architecture 140 includes orchestrator 81 for transmitting real time data 140, and historical data 142, and data with infra asset manager 144. Underlying data service 83 (micro-services) provides API endpoints that can be invoked by customer applications, such as customer APIs 85, customer portals 87 and global IBX management system (GIMS) 89. In the example of FIG. 10, there may be different microservices for each of real-time data 140, historical data 144, and infra asset manager 144, for example.

In some examples, the API platform described herein may be an application platform as described in U.S. application Ser. No. 14/927,451, entitled INTERCONNECTION PLATFORM FOR REAL-TIME CONFIGURATION AND MANAGEMENT OF INTERCONNECTIONS WITHIN A CLOUD-BASED SERVICES EXCHANGE, filed Oct. 29, 2015, the entire contents of which are incorporated by reference herein. Orchestrator 81 may be an orchestrator/orchestration engine as described in U.S. application Ser. No. 14/927,306, entitled ORCHESTRATION ENGINE FOR REAL-TIME CONFIGURATION AND MANAGEMENT OF INTERCONNECTIONS WITHIN A CLOUD-BASED SERVICES EXCHANGE, filed Oct. 29, 2015, the entire contents of which are incorporated by reference herein.

Customer portals 87 may utilize various approaches, such as using an existing customer portal container and/or an existing customer portal architecture, for example. In another embodiment, customer portals 87 may utilize a customer portal/DCIM hybrid design, including DCIM a specific additional container, and replicates skin, navigation and layout, along with URL switching split (mostly leveraging the customer portal team) for a common approach. Such a CP/DCIM hybrid design aligns with a customer portal strategy of feature based development of an uber portal concept. According to another example, customer portals 87 may utilize an uber portal with customer portal and DCIM design may be utilized that follows uber architecture guidelines, uses feature based application deployment, and uses DCIM as an on-boarding application. According to yet another example, a customer portal with embedded DCIM user experience design (UX) may be utilized that includes features such as static content in the customer portal 87, and in which the dynamic part of DCIM is called from the DCIM backend. Customer portal with embedded DCIM UX may invoke DCIM services using a java-script framework, and which invokes DCIM. In this way, customer portals 87 leverages existing customer portal integrations with an internet protocol (IP) portal for permissions and existing message center for alerts and notifications.

GIMS may be associated with a number of possible operational activities. For example, GIMS 89 may be associated with operational management of power usage effectiveness (PUE), alerts and assets, along with management of templates, assets, points and access controls. GIMS 89 may also be associated with real time analytics of historical data trends, asset maintenance, consistent asset view, asset status and fault information. In another example, GIMS may be associated with simulation and prediction of asset hierarchy traversal, one line diagram-what-if analysis, and time based query rules.

Figure 11:
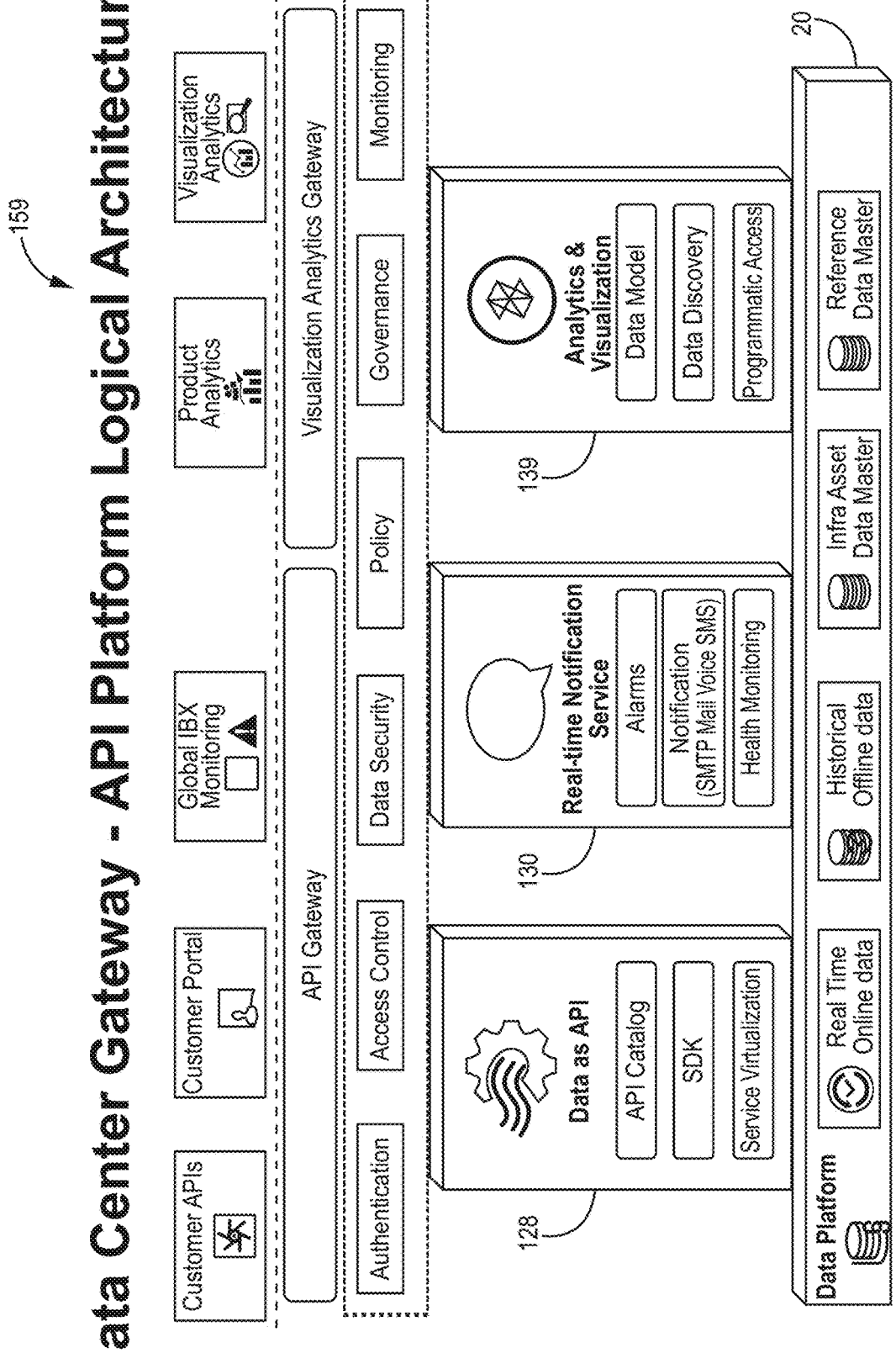
FIG. 11 is a block diagram illustrating an example data center gateway API platform logical architecture for a data center gateway, in accordance with one or more aspects of this disclosure.

FIG. 11 is a block diagram illustrating an example data center gateway API platform logical architecture 159 for a data center gateway, in accordance with one or more aspects of this disclosure. Data platform 20 corresponds to data platform 20 of FIG. 1. Data platform 20 may include real time online data, historical offline data, infra asset data master, and reference data master. Data as API 128, real-time notification services 130, and analytics and visualization 139 are shown in FIG. 11 as logically operating on top of data platform 20.

Data as API 128 may include, for example, an API catalog, software development kit (SDK), and service virtualization. Real-time notification services 130 may include, for example, alarms, notifications (e.g., by SMTP, mail, voice, and/or SMS), and health monitoring. Analytics and visualization 139 may include, for example, data model, data discovery, and programmatic access. Customer APIs, customer portal, global IBX monitoring, product analytics, and visualization analytics may access data via API gateway and/or visualization analytics gateway, such as via API endpoints for authentication, access control, data security, policy, governance, and monitoring, for example. Monitoring APIs may provide, for example, environmental information such as humidity or temperature data from sensors, alerts from alarms, which customers may access by invoking customer APIs by the API gateway.

For example, a customer may send an API request by a customer API, where the API request invokes a monitoring API endpoint. The request payload may specify the monitoring API endpoint, and may specify particular monitoring information that is requested, such as information from particular sensor(s) for example. API gateway may access data from the data platform to service the API request, and may include the data (e.g., environmental information such as sensor data) in the API response payload.

Figure 12:
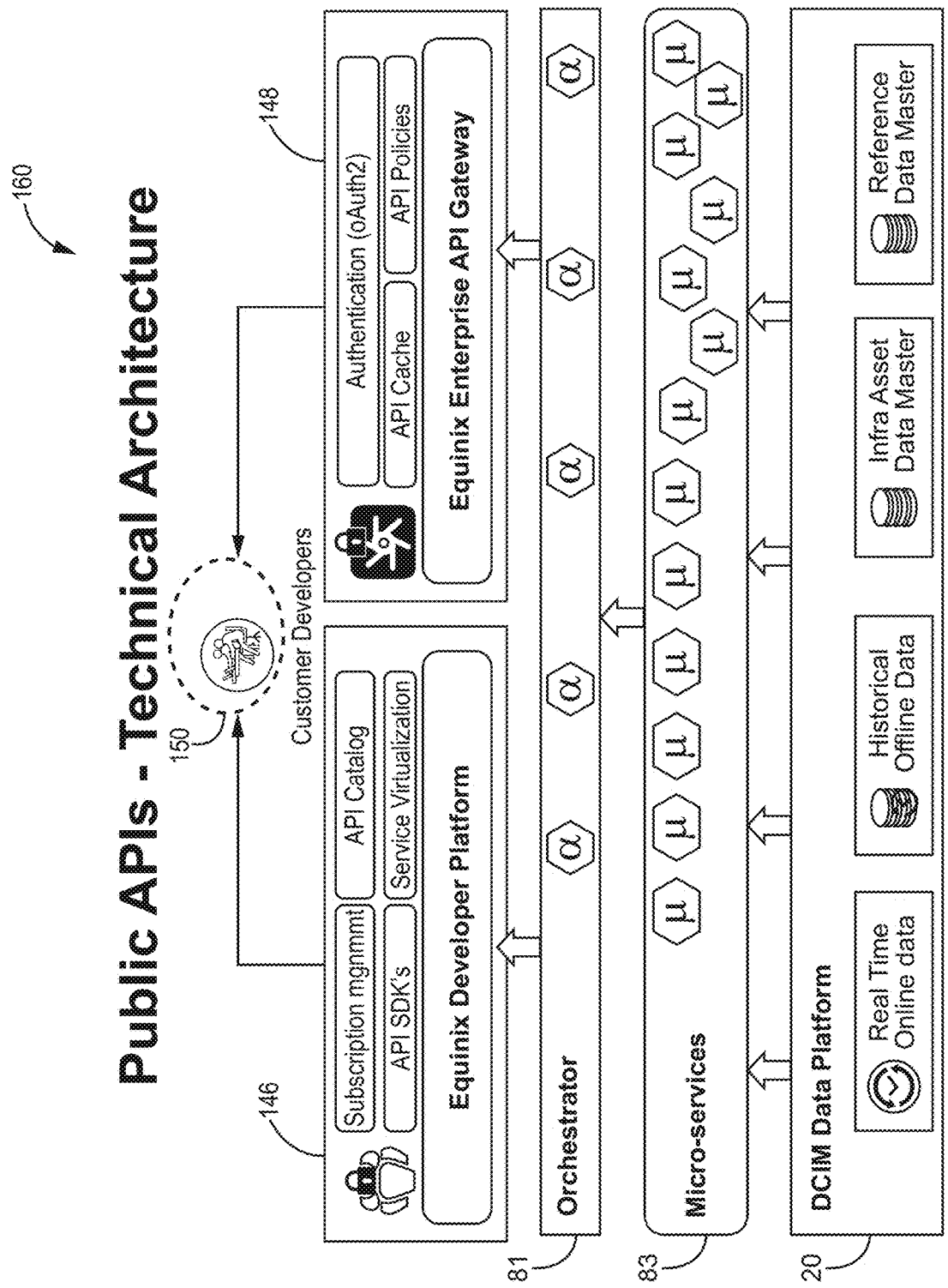
FIG. 12 is a block diagram illustrating an example technical architecture for public application programming interfaces (APIs) interfacing with a data center infrastructure monitoring system data platform, in accordance with techniques described herein.

FIG. 12 is a block diagram illustrating an example technical architecture for public application programming interfaces (APIs) 160 interfacing with a data center infrastructure monitoring system data platform, in accordance with techniques described herein. In the example of FIG. 12, asset data is received from DCIM data platform 20 by underlying micro-services 83 and orchestrator 81. In the example of FIG. 12, DCIM data platform 20 includes real time online data, historical offline data, data associated with an infra asset data master, and data associated with a reference data master. Orchestrator 81 provides an orchestration layer that can break down customer API requests into workflows for accessing the underlying micro-services 83. In some examples, micro-services 83 may be provided as part of a full-stack development framework execution environment to facilitate application development for microservice-based application architectures, such as described by U.S. application Ser. No. 14/927,315, entitled MICROSERVICE-BASED APPLICATION DEVELOPMENT FRAMEWORK, filed Oct. 29, 2015, the entire contents of which are incorporated by reference herein.

A developer platform 146 and an enterprise API gateway 148 receive the asset data from orchestrator 81, and the resulting managed and authenticated asset data is transmitted to customer developers 150. In the example of FIG. 12, developer platform 146 includes subscription management, API software development kits (SDKs), an API catalog, and service virtualization. In the example of FIG. 12, enterprise API gateway 148 includes authentication (e.g., oAuth2), an API cache, and API policies. In some examples, the technical architecture shown in FIG. 12 may leverage a cloud exchange model for customer onboarding using developer platform 146 of the co-location facility provider. The technical architecture may also leverage the enterprise API gateway 148 of the co-location facility provider for all DCIM APIs. The technical architecture may also leverage BMS APIs and enhance the API catalog and SDKs. In some examples, the technical architecture of FIG. 12 may use a sandbox approach for APIs. In some examples, the microservices and orchestrator that are used for customer portal 87 and/or applications internal to the co-location facility provider may be reused for customer APIs.

Figure 13:
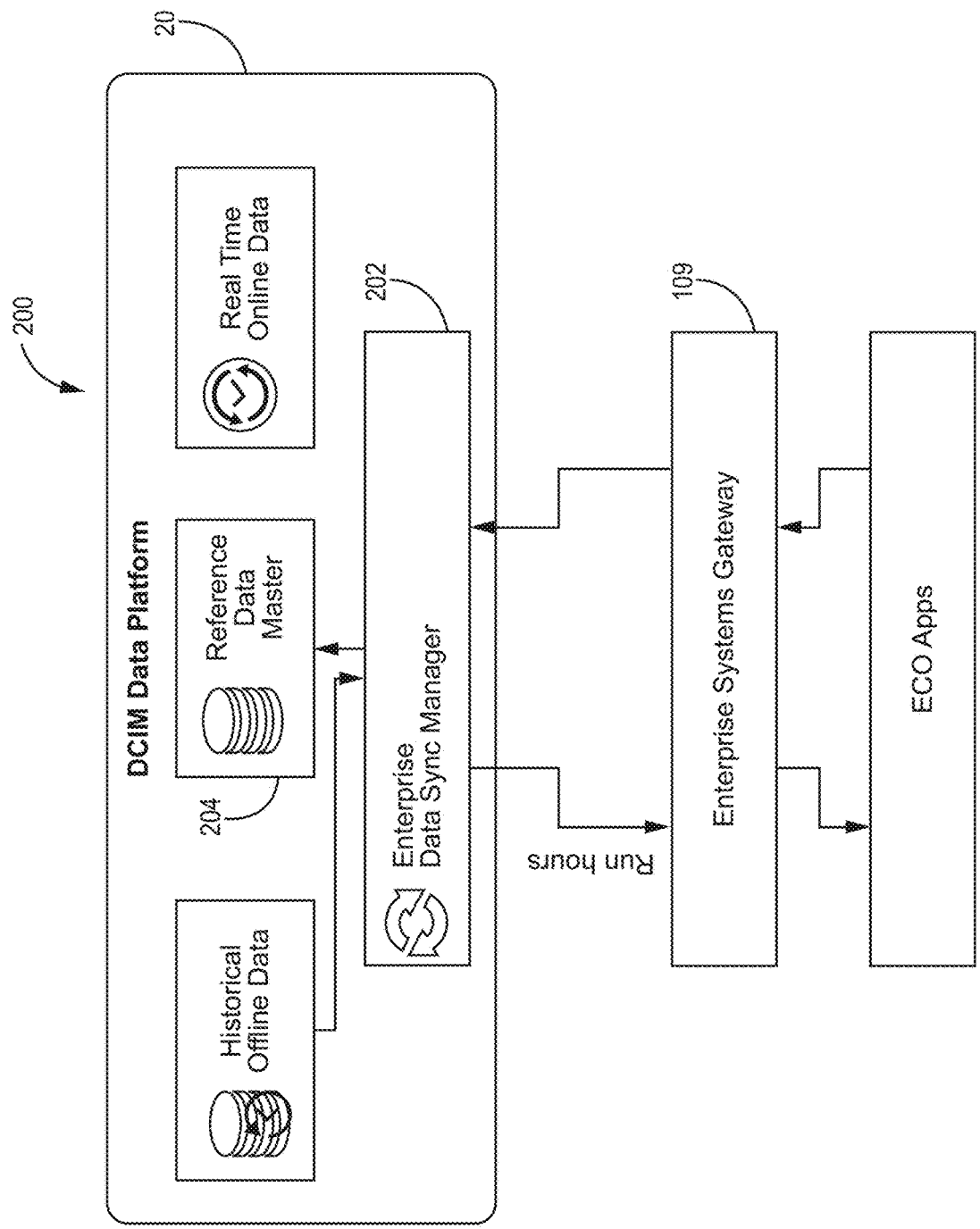
FIG. 13 is a block diagram illustrating an example system in which other IT systems are integrated with the DCIM data platform, in accordance with one or more aspects of this disclosure.

FIG. 13 is a block diagram illustrating an example system 200 in which other IT systems are integrated with the DCIM data platform 20, in accordance with one or more aspects of this disclosure. In the example of FIG. 13, DCIM data platform 20 includes historical offline data, real time online data, a reference data master 204, and enterprise data synchronization master ("enterprise data sync master") 202. In some examples, reference data master 204 may obtain enterprise systems data via enterprise data sync manager 202.

In some examples, DCIM data platform 20 leverages an Enterprise Systems Gateway 109 to obtain data for enterprise systems. In some examples, DCIM data platform 20 obtains cage, cabinet and space drawings from a data management software system of the co-location facility provider. In some examples, DCIM data platform 20 obtains Electrical Infrastructure Assets information and maintenance information from an enterprise asset management (EAM) software system. DCIM data platform 20 may write Electrical infrastructure assets run hours back to the EAM software system at Enterprise Systems Gateway 109. Enterprise Systems Gateway 109 may interact with ECO applications for engaging or managing data centers and systems.

Figure 14:
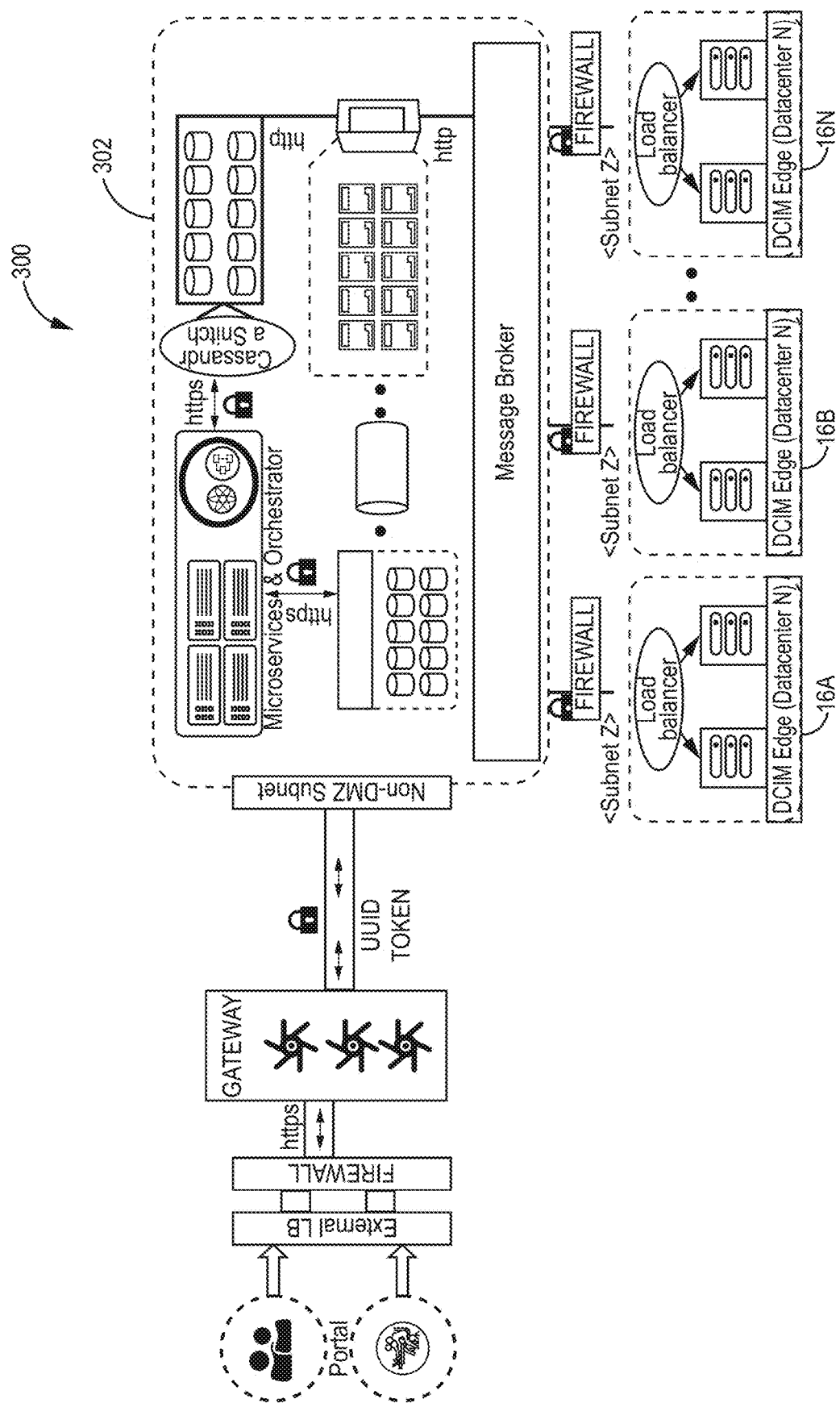
FIG. 14 is a block diagram illustrating a system showing an example security configuration for components of a DCIM system, in accordance with one or more aspects of this disclosure.

FIG. 14 is a block diagram illustrating a system 300 showing an example security configuration for components of a DCIM system, in accordance with one or more aspects of this disclosure. DCIM system 302 may correspond to DCIM system 22 of FIG. 1 and/or data platform 59 of FIG. 9, for example. As shown in the example of FIG. 14, DCIM edge data center and associated DCIM edge system 16 is secured by its own subnet. System 300 includes various firewalls, which may be data center-level next generation firewalls and security. DCIM edge systems 16 may use SSL-based communication between DCIM edge systems 16 and message broker. Secure connection will be enabled between Microservices and database. A data center gateway authenticates external requests via OAuth and generate a unique identifier (UUID). In some examples, the data center gateway may have secured geo-redundancy for database and message broker.

FIG. 15 is a block diagram illustrating an example alerts and notification process in a data center infrastructure monitoring system, in accordance with techniques described herein. As shown in FIG. 15, alert-worthy events originate from infrastructure objects ("infra objects"). Alert-worthy events may include, for example, single value based alarms, derived value based alarms, device hierarchy alarms, and maintenance schedule alarms. Single value based alarms may include, for example, out-of-band threshold violations, resiliency status, and redundancy status. Derived value based alarms may include, for example, point calculation driven alarms, e.g., UPS power and sum of PDU power deviate by 5% from a threshold value. Device hierarchy alarms may alert on impacted devices, for example. Maintenance schedule alarms may include alarms/notifications based on planned redundancy and proactive notifications, for example.

In some examples, single value based alarms, device hierarchy alarms, and maintenance schedule alarms may each be configurable by data center operations administrators and/or by customer administrators. In some examples, derived value based alarms may be configurable only by data center operations administrators and not by customer administrators. For example, data center operations administrators or customer administrators may enter configuration data (e.g., via a customer portal or global IBX monitoring system) for creating and defining device alarms and setting alarm threshold values, defining composite alarms, defining hierarchy alarms, and importing maintenance alarms.

As shown in FIG. 15, a DCIM edge system (e.g., any of DCIM edge systems 16 described herein) intercepts the events originating from the infra objects, logs the events, and forwards the events to the data platform 20. Data platform 20 triggers alerts, such as by applying the configured alarm detection rules. Data platform 20 qualifies an event as an alert based on the applications of the rules, and logs and forwards the alerts to notification engine (e.g., notification engine 131 of FIG. 8). Notification engine 131 receives the alerts and creates tickets for the alerts (e.g., a ticket for each alert). Notification engine 131 negotiates the alert recipient and transport mechanism. Notification engine 131 provides message provisioning, e.g., via email using Simple Mail Transfer Protocol (SMTP) or Short Message Service (SMS).

Figure 16:
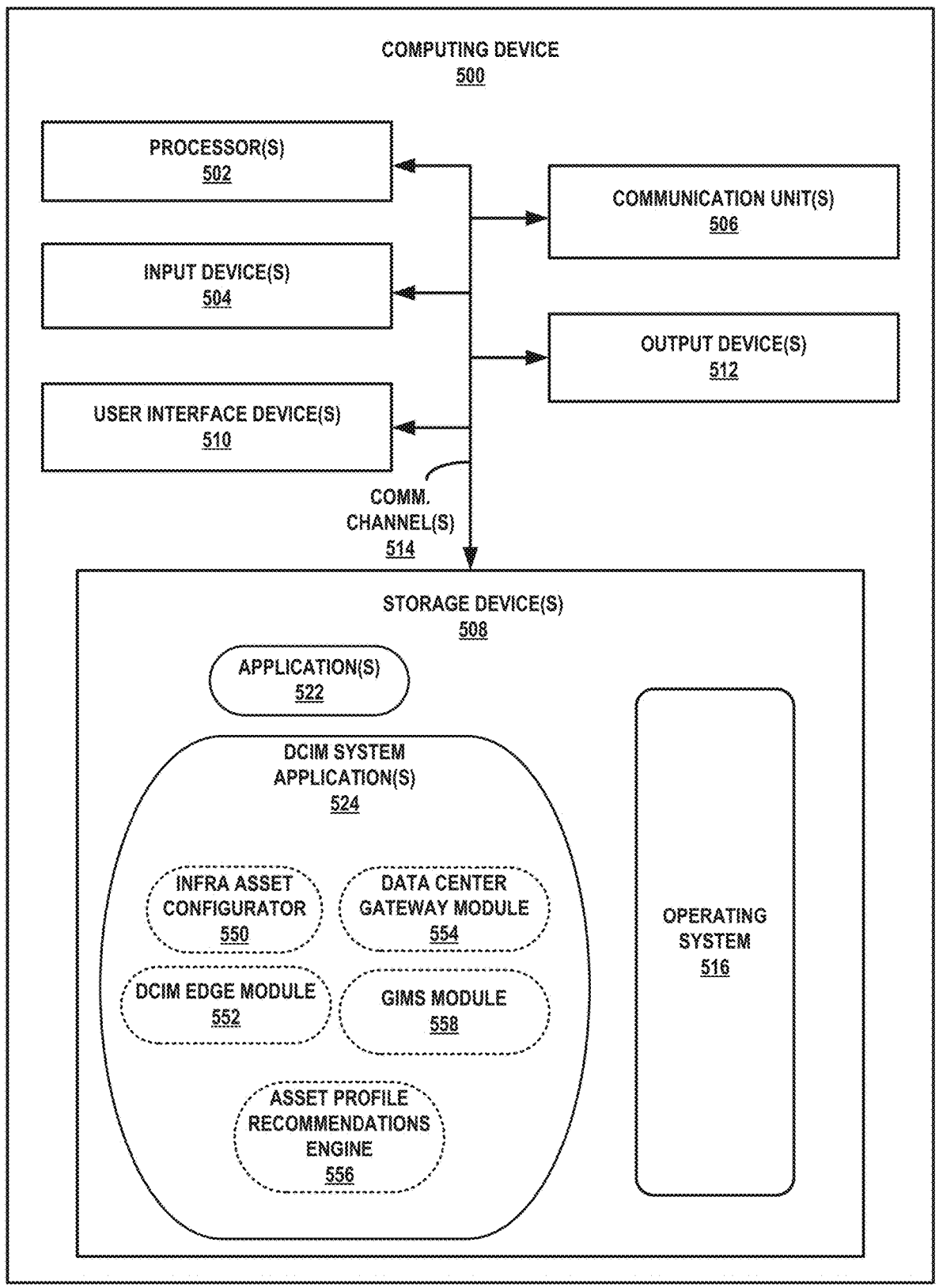
FIG. 16 is a block diagram illustrating further details of one example of a computing device that operates in accordance with one or more techniques of the present disclosure.

FIG. 16 is a block diagram illustrating further details of one example of a computing device that operates in accordance with one or more techniques of the present disclosure. FIG. 16 may illustrate a particular example of a server or other computing device 500 that includes one or more processor(s) 502 for executing any one or more of infra asset configurator 550, DCIM edge module 552, data center gateway module 554, asset profile recommendations engine 556, or any other computing device described herein. Other examples of computing device 500 may be used in other instances. Computing device 500 may be, for example, any of DCIM systems 22 (FIG. 1), DCIM system 23 (FIG. 2), DCIM system 400 (FIG. 3). Although shown in FIG. 16 as a stand-alone computing device 500 for purposes of example, a computing device may be any component or system that includes one or more processors or other suitable computing environment for executing software instructions and, for example, need not necessarily include one or more elements shown in FIG. 16 (e.g., communication units 506; and in some examples components such as storage device(s) 508 may not be colocated or in the same chassis as other components).

As shown in the example of FIG. 16 computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, DCIM system application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and DCIM system application(s) 524 with processors 502, communication unit 506, storage device 508, input device 504, user interface devices 510, and output device 512.

Application 522 and DCIM system application(s) 524 may also include program instructions and/or data that are executable by computing device 500. Example DCIM system application(s) 524 executable by computing device 500 may include any one or more of infra asset configurator 550, DCIM edge module 552, data center gateway module 554, asset profile recommendations engine 556, each illustrated with dashed lines to indicate that these may or may not be executable by any given example of computing device 500. Other DCIM system applications not shown may alternatively or additionally be included, providing other functionality described herein.

In this example, DCIM system applications 524 include infra asset configurator 550, DCIM edge module 552, data center gateway module 554, asset profile recommendations engine 556, and GIMS module 558. Infra asset configurator 550 may include instructions for causing computing device 500 to perform one or more of the operations and actions described in the present disclosure with respect to infra asset configurator 44. DCIM edge module 552 may include instructions for causing computing device 500 to perform one or more of the operations and actions described in the present disclosure with respect to DCIM edge 16. Data center gateway module 554 may include instructions for causing computing device 500 to perform one or more of the operations and actions described in the present disclosure with respect to any of data center gateways 34, 110, 140. Asset profile recommendations engine 556 may include instructions for causing computing device 500 to perform one or more of the operations and actions described in the present disclosure with respect to asset profile recommendations. For example, when an asset such as a UPS, for example, is introduced into the DCIM system, the asset profile recommendations engine 556 may automatically identify an asset type based on tag points, and recommend a configuration setup based on how other assets of the same type in other data centers are configured, resulting in the introduced asset being more operationally efficient based on the setup of similar assets in the other data centers. GIMS module 558 may include instructions for causing computing device 500 to perform one or more of the operations and actions described in the present disclosure with respect to GIMS 42.

Figure 17:
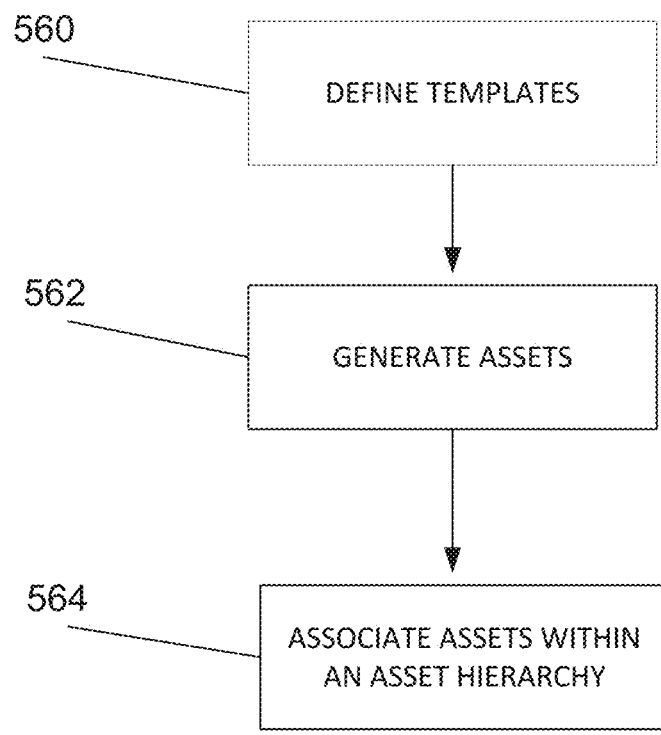
FIG. 17 is a flowchart illustrating example operation of one or more network devices in a data center infrastructure monitoring system in accordance with techniques described herein.

FIG. 17 is a flowchart illustrating example operation of one or more network devices in a data center infrastructure monitoring system in accordance with techniques described herein.

As illustrated in FIG. 17, according to one example, the asset configurator 44 performs a normalization process that may include defining templates Block 560, as described above. In this way, asset configurator 44 may define templates for all infrastructure assets during template definition to create standard asset templates, standard points, and standard alarms, along with standard attribute types. During infrastructure asset definition, the infrastructure asset configurator 44 creates a DCIM infrastructure asset Block 562 from the template, adds or removes tag points from an asset, adds or removes alarms for tag points, and adds details of protocols associated with assets. In some examples, an asset model includes pre-defined alarm definitions, e.g., based on the type of asset. During infrastructure asset hierarchy, Block 564, the infrastructure asset configurator 44 associates connected infrastructure assets, models electrical and mechanical hierarchy, models resiliency hierarchy, and associates location based hierarchy. Infrastructure asset configurator 44 may store the associations and hierarchies, e.g., to infra asset manager sync 54, which may send the data to edge publisher 92 for publishing to central hub 80. The data published to central hub 80 is then available to data center gateway 59, as described herein.

Figure 18:
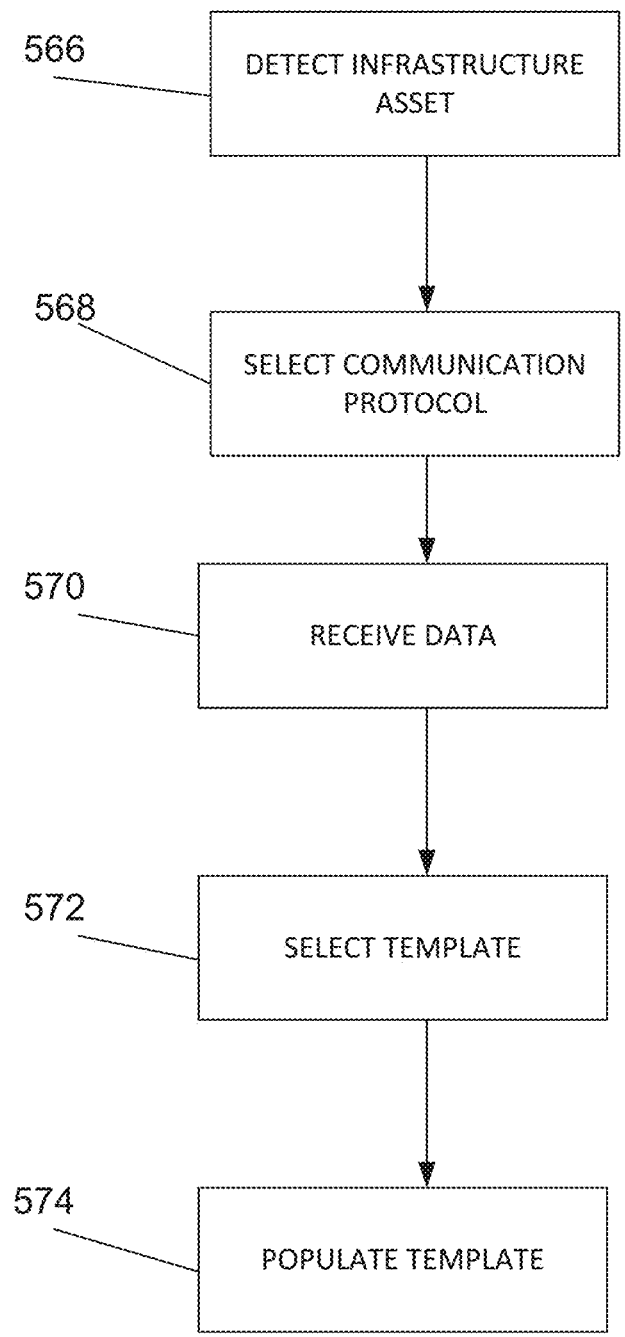
FIG. 18 is a flowchart illustrating example operation of one or more network devices in a data center infrastructure monitoring system in accordance with techniques described herein.

FIG. 18 is a flowchart illustrating example operation of one or more network devices in a data center infrastructure monitoring system in accordance with techniques described herein. As illustrated in FIG. 18, according to one example, as described above, one or more of data center infrastructure monitoring systems 16A-16N may detect an infrastructure asset of the one or more infrastructure assets Block 566, select a communication protocol for receiving data associated with the detected infrastructure asset Block 568, and receive the data using the selected communication protocol Block 570. Data center infrastructure monitoring systems 16A-16N may select a template of the defined templates for the detected infrastructure asset in response to the received data Block 572, and populate the selected template using asset points defined by the selected template Block 574. The selected template may specify a communication protocol for communicating with the detected infrastructure asset.

The data center infrastructure monitoring system applications 524, as described herein, provide an extensible and distributed DCIM platform that provides unified asset models, and enables discovery of assets and ensures security and trust of assets. The DCIM system enables effective monitoring of assets, along with improved alarms being put in place to more effectively manage those assets. The DCIM system allows for defining and maintaining a complex network of interconnected assets across asset classifications, with dynamic loading of asset hierarchies and resiliency states that is supported by smart and on-demand edge processing capabilities. The DCIM system employs a distinct layered "trusted and distributed collection-centralized gathering-visualize anywhere" strategy, with each layer having a unique scheme to support its intended function. Trusted and distributed collection is implemented via a smart edge processing component of the DCIM platform, and centralized gathering is implemented via a complex network of data pipelines with intelligent routing towards the targeted persistence, with the ability for visualization anywhere being implemented via a gateway scheme that includes a rich set of data publishing APIs.

In some examples, the DCIM system provides a unified asset model framework that includes a normalization framework that contains a de-dupe algorithm to identify and recognize asset instances across vendors, along with protocols and cross asset classifications during upstream data definition processes. The algorithm includes the grouping of a complex defined set of tag points by protocols, devices and sites. The DCIM system provides a comparison algorithm to pick and choose, compare and contrast asset instances that serve the same functional purposes. This comparison technique is a matching algorithm that identifies those asset instances for comparisons during downstream data analysis processes. The algorithm uses a mix and match of static asset attributes and points and conditional check on the points list differentials.

In some examples, DCIM system applications 524 includes an asset profile recommendations engine 556 that can auto-contextualize the asset based on the geographic position of the asset, and coordinates within the asset hierarchy and the functional interconnections with neighboring assets on the hierarchy. DCIM system applications 524 provide unified asset hierarchy and resiliency modelling that enables the building of a network of interconnected assets for electrical and mechanical hierarchies and the dynamic application of resiliency definitions. The DCIM system enables electrical and mechanical hierarchy to be kept unified in a single framework and implementing the intelligence in defining the inter-connections between assets to ensure that they are acceptable connections. For example, the hierarchy may be generic to the extent that if another data center has a similar equipment setup, i.e., interconnected in a similar way, the hierarchy may be easily represented and does not need to be customized for each data center, or may only require a very minimal amount of customization. In this way, having a generic hierarchy and/or schematic allows for an electrical hierarchy to be defined for use in each data center based on a finite number or pool of generic definitions and/or schematics.

In one example, certain standard schematics may represent available real-world hierarchic representations, such as electrical or mechanical representations for example, using different topologies. For example, the DCIM system may provide a topology A, a topology B and a topology C, where each topology may be built from a common set of building blocks, such as a feed layer for the power feed coming into the data center, a middle layer related to redundancies of the data, and a distribution layer where the power is fed to one or more circuits. These building blocks may be mixed and matched to build any desired topology so that when a new data center arrives, modeling may be created using the default building blocks. In the event a new data center requires revised customization of an electrical hierarchy, a revised topology may be generated using the building blocks and the new customization will be genericized so that the enhanced building will be added to the common pool and utilized in the future.

In another example, a hierarchy builder functionality may be included, which allows equipment icons to be dragged and dropped into a process building block and the blocks are subsequently attached to create a hierarchy. This may be part of the GIMS 42 application for use by data center operations teams in creating data center topology hierarchy. In this way, during defining of the hierarchy within a data center, icons may be positioned on a schematic of a display and connected to create one or more one-line diagram arrangement of different electrical environments, for example, and automatically associate the assets represented by the icons. Further examples of this functionality are described below. In this way, once a hierarchy is defined for a given data center by positioning and attaching icons to create a schematic display, the data that is being collect by the DCIM Edges by infra asset configurator is fed into the hierarchy display through a data processing platform, i.e., data center gateway 59. The data processing platform may also perform the logic for determining conditions, such as alarm conditions for example. The condition processing outcome is fed into the hierarchy of the schematic display, and an alarm condition may be displayed to select customers based on the hierarchy, along with information to express the alarm condition, such as a temperature threshold or power threshold being exceeded, for example. In one example, if an asset, such as a UPS for example, is in an alarm state, data center gateway may determine which downstream circuits are impacted as a result of the UPS being down, along with a determination of which customers are affected by the generated alarm. As a result, only customers within a data center that are affected by the alarm event may be contacted by providing a notification to the effected customers.

Building of an electrical hierarchy is described above for purposes of example. In a similar manner, other types of infrastructure asset hierarchies, such as a hierarchy of mechanical infrastructure assets may be generated in response to receiving user inputs defining graphical relationships between mechanical infrastructure assets. For example, mechanical assets may be responsible for cooling zones within the data center, and therefore a hierarchy may be generated associated with flow of cool water and whether flow is along an ideal path or an alternate path, and generation of associated alarms.

In some examples, the DCIM system provides alarm intelligence that is context aware, location aware and channel aware, along with an alarm configuration technique that enables geo-position awareness, communication channel awareness and connectivity awareness while applying, detection and notification of alarms, and an alarm suppression algorithm to eliminate the noise to prevent false alarms or repetitive alarms. The DCIM system includes a wide distribution of edge system processing servers that are capable of interacting with a diverse set of assets across multiple protocols and reporting back data via the pipeline scheme, along with the ability to push metadata that makes up the intelligence within edge system channels.

In some examples, the DCIM system is configured to detect inefficiencies in data center infrastructure by analyzing the data DCIM edge has discovered. e.g., particular machine is not working optimally. After the DCIM system detects the inefficiencies based on the collected data points, the data points can be taken into consideration to look at the comparable instrumentation. For example, assume one generator in one data center is not performing optimally because the oil in that generator is low, for example. The DCIM system can compare that data point with all the other generators across the other data centers. The DCIM system can analyze how the other systems are operating, and report the detected inefficiencies.

The DCIM system can provide customers or data center operations team with insight into resiliency status in a given data center, by displaying state of both electrical and mechanical assets together. The DCIM system can provide customers or data center operations team with insight into what is the actual flow of electricity in the data center. The DCIM system can provide customers or data center operations team with insight into what the redundant flow looks like, what the customer is getting, on both electrical and mechanical assets together. The DCIM system performs asset modeling and has the platform capability to establish relationships and topologies across both electrical and mechanical assets, and enables DCIM system to display information about both in a seamless fashion. The DCIM system receives information from infrastructure assets in the mechanical domain as well as the electrical domain.

In some examples, DCIM edge module 552 or data center gateway module 554 may be configured to raise alarms in response to detecting any conditions that would result in SLAs coming down. DCIM edge module 552 or data center gateway module 554 may raise alarms, both to customers and to internal operations team. DCIM edge module 552 or data center gateway module 554 may provide intelligent alarming, such as location aware alarming, noise filtering, context-aware alarming, and alarm suppression based on context and/or location. For example, if DCIM edge module 552 or data center gateway module 554 detects a customer cage has a particular cage has a temperature that is beyond a threshold level, the system is location aware and can identify the location to check for unusual situations that should be addressed.

The DCIM system architecture described herein is capable of handling infrastructure in the data centers from multiple different vendors, and across globally distributed systems. The DCIM system provides near real-time alarming and alerting in a massive and distributed architecture. In some examples, the DCIM system may be directly integrated with cloud ticketing systems (e.g., cloud-based IT help desk services). For example, for a customer that also utilizes cloud services for ticketing needs, such integration may enable any monitoring, alarms and/or alerts to be directly integrated with the cloud services to enable further accessibility to the customer. In some examples, if one or more cloud service providers provide DCIM data for the cloud service provider infrastructure assets to the DCIM system, customers of the DCIM system may also have access to view the cloud service provider data in a single system.

DCIM system architecture described herein is capable of handling infrastructure in the data centers from multiple different vendors, and across globally distributed systems. The DCIM system provides near real-time alarming and alerting in a massive and distributed architecture. According to one example, a DCIM system gathers data from other existing systems (such as facility control and monitoring systems, capacity management systems (CapLogix), branch circuit monitoring (BCM), customer install databases and maintenance tracking systems (Maximo)), and presents the data through a single portal in a logical, unified format. Such unified format allows for uses such as real time facility operating data and alarm monitoring by internal and external users, storage and retrieval of historical data, comparison of operational efficiency within sections of a facility or between facilities, and evaluation of infrastructure capacity. In addition to having a unified data format, the data may be aggregated into as few databases as possible and made available for any business purpose, including the DCIM system, PUE Portal, CapLogix, and the on-going and day-today operations of each MX.

In one embodiment, the DCIM system may provide consistent graphical views of the underlying data. For example a view of a generator may show the same information in the same graphical manner and with similar naming structures, without regard to the site being viewed, and may include equipment that is organized into vertical structures in a site. The equipment of the DCIM system may be organized into vertical structures in a site, and may include development of a Create Read Update Delete (CRUD) matrix, and organized into vertical structures on site.

In another example, a graphical user interface includes graphics such as graphical based views that allow up and down navigation, and that provide summary alarm and resiliency information for each sub area that is shown. Up and down navigation of the equipment infrastructure may also to be provided, along with the availability within an IBX of one line drawing based equipment views. Historical data may be recorded and made available for all system points stored for an extended period of time. In one example, the historical data may be recorded and made available forever.

In another example, real time data may be moved from existing control/monitoring systems to a central internal database and archived without affecting performance of local control/monitoring systems, and the DCIM system may function as an overlay and aggregation system so that local controls/monitoring system will not be replaced by the DCIM system.

In this way, in one example, data of a DCIM system flows from current existing local control systems in multiple co-location facilities or data centers (IBXs) to a central internal database that may include graphics features, an historian feature and an alarm server. The data may then flow only from the central internal database to local interfacing portals having local specific graphics, historical data display and alarm display relevant to that local IBX. In addition, relevant email alarm notifications may be transmitted from the central internal database to one or more local IBXs. As a result, the DCIM system of the present application provides continuous monitoring and maintenance to assure that data is continuously available and accurate, and provides company users and customers with the ability to view infrastructure status and alarm data for all IBXs for which permission has been assigned with a single log-in at the internet facing portal. By providing a unified view of multiple data centers, the DCIM system allows users to view operations and efficiency data easily and consistently across all data centers, providing a unified solution to several internal projects that presently have differing solutions, resulting in a unified solution that allows projects to be accomplished with fewer resources and at a reduced cost.

In one example, push alerts may be provided, such as SNMP, email, SMS, etc., for indicating changes in alarm status of key IBX infrastructure, resulting in immediate notification for all events that could potentially impact customer availability or redundancy. In addition, push alerts may be provided, such as SNMP, email, SMS, etc., for indicating when the availability status key IBX infrastructure changes, resulting in immediate notification of changes to redundancy of key IBX redundancy. Users may choose to receive push alerts for all local power circuits or a subset of the power circuits, enabling customization of the number and frequency of alarms, failures or recovery events. In one example, users may choose the frequency of alerts, such as in real time, in a daily, weekly or monthly summary, and may choose to receive push alerts when alarms and availability return to normal.

In another example, a customer portal may include reporting capabilities to display various data, such as a history of alarms, failures, and changes in availability, allowing reports and trend events to be viewed, along with availability changes. In one example, a customer portal may provide for display of average temperature and humidity of an entire IBX, phase or floor, resulting in cage level and IBX level view of temperature and humidity. In another example, schedules of upcoming and scheduled maintenances on key IBX infrastructure may be display, along with an expected list of alarms and availability statuses during maintenance, enabling the DCIM system to view upcoming schedules of maintenances and expected events, such as alarms, load shifts, etc. during each scheduled maintenance and expected event.

According to an embodiment of the present disclosure, other example options and functionality, supported by the DCIM system described herein, for operations and engineering teams, may be provided by way of a Global IBX Management System (GIMS), such as operations monitoring infrastructure 24 and/or GIMS 42, 89, 91 as described herein.

According to one example, the DCIM system monitors and reports on IBX infrastructure without having the ability to control any equipment on site. According to one example, the DCIM server infrastructure may include a globally distributed, redundant and fault tolerant DCIM server structure with transfer between the internal database and the Internet facing portal being secure and one way.

In another example, a list of standard points may be provided for each equipment type (chiller, generator, PDU, etc.) and may guide what data is transferred from sites to the central database. The points list will utilize the Tag Naming Standards described above to provide consistency in naming. In one example, approximately 2,000,000 data and alarm points on approximately 32,000 infrastructure objects globally may be provided.

In another example, controls/monitoring system at each IBX may forward data to the central database or may be polled for data. Industry standard data exchange protocols, such as OPC, may be utilized to transfer the data.

Calculations associated with collected data may be performed based on specific collection algorithms. For example, a minimum PUE and cooling efficiency (kw/ton of cooling) may be calculated, or in another example, calculated PUE values may be imported from the PUE portal.

All data points in the DCIM may be measured at a given frequency, such as every second, for example, and historical data may remain available for an extended period of time, such as 3 or more years, for example. Because of the large amount of data being archived, compression algorithms may be applied to the data to allow the data to be compressed while maintaining the critical underlying trends required for data analyses.

In another example, historical data for any point or combination of points to which a user has access may be available as a trend graph, as tabular data or for download as a .csv or Microsoft Excel compatible document. Reports may be retrieved for any user specified time period for which historical data exists either through the DCIM system, BI, or another method that reduces constraint of the requests on the DCIM system.

Preventative and Critical Maintenance schedules may be available to the system in real time, and any current or upcoming maintenance procedures which affect the infrastructure in a graphical display may be visible within that display. A user may also have the ability to see all scheduled upcoming maintenances for infrastructure in IBXs for which the user has permission to view.

In another example, the present resiliency state of any piece of equipment may be visible on any display associated with the equipment. This resiliency state may be representative of all equipment in the hierarchy above the piece of equipment being viewed.

In one example, three resiliency statuses are available: "Redundancy as Designed," "Reduced Redundancy (Planned)," and "Reduced Redundancy (Fault)." For example, if a user is viewing a UPS and, due to an upstream utility power outage, that UPS is currently operating on generator, the resiliency state of this equipment chain would be displayed as "Reduced Redundancy (Fault)." When the resiliency status is changed to either "Reduced Redundancy (Planned)" or "Reduced Redundancy (Fault)," an estimate of the duration of the reduced redundancy state may also be displayed, if known.

In another example, the changes to the existing PUE portal may be made in parallel with the described DCIM system, and the DCIM system may capture PUE data from the updated developed PUE Portal display the PUE data in the DCIM system. PUE data may be available in DCIM system reports. In another example, the DCIM may communicate with the customer database so that data access permissions for customers will be driven by their association with a cage in the customer database. A customer's power circuits may also be associated with upstream electrical infrastructure. The DCIM may be able to communicate with the branch circuit monitoring (BCM) system so that BCM data is available to customers within the DCIM, and the DCIM system may integrate with existing work order ticketing systems so that work orders can be generated automatically by the system or by internal users based upon received alarms. The DCIM system may be system integrated for equipment information—including maintenance and hierarchy information, for obtaining specific customer asset information, for obtaining IBX and cage layout drawings and other capacity related data, and integrated with the PUE database for obtaining PUE data.

According to one example, the DCIM system may have the ability to display alarms based upon equipment condition, and the alarms may be configurable to show severity, and in one example users may have the ability to select alarm visibility based upon severity of the alarm. In another example, it may be possible to view the most severe alarm condition of a geographic area when viewing geographic based graphics. For example, when viewing a metro area, the most severe alarm present may be indicated by color and wording on the graphic. According to another example, it may be possible, for any system alarm, to view all customers who may be impacted by the alarm. In another example, the DCIM system may notify users via an alarm indication, email or SNMP when an alarm conditions exist. For example, the DCIM system may notify users when temperature or humidity SLA thresholds are approached and/or exceeded.

In another example, DCIM system may include a physical security information management (PSIM) component, with PSIM capabilities that may include access control and CCTV monitoring capabilities. In another example, DCIM system may be capable of higher level monitoring of the existing IBX security systems and may be adapted to meet PSIM needs.

In one example, both DCIM system internal user and customer or external users may include certain functions. For example, a user with proper permissions may have the ability to download cage/space drawing in pdf, autocad/.dwg, and visio. In another example, a user with proper permissions may have the ability to download a drawing showing where their space sits on the overall floor. In one example, drawings do not show customer names other than the customer named in the quote. In one example, for an existing customer with the proper permissions, basic cage drawings may be available via the portal for view. In one example, interactive visual displays (e.g. dashboards) of IBX physical and performance metrics may be provided to users having proper permissions. In one example, a view of an entire site plan may be provided to a user having proper permissions.

In one example, a granular view of site plan (e.g. drill down features into single cabinet equivalent) may be provided to a user having proper permissions. In another example, a user with proper permissions may view one or more of site temperature by zone, utility, UPS power loads, site humidity by zone, usage of switch panels and PDUs, and power chain and roll-up of the UPS panel, PDUs, etc.

In one example, data import and export of provisioned utility capacity, subject to user having proper permissions, may be supported by the systems described herein. In another example, what-if analysis for component arrangements (e.g. impact to space, power, network, and cooling), subject to user having proper permissions, may be supported by the systems described herein. In one example, a report on capacity status and workflow state for each capacity element (space, power, etc.). For example, available=green, restricted=yellow, unavailable=red defined by configurable criteria, subject to user having proper permissions may be included.

Other options and functionality, supported by the DCIM system described herein, for products and portals presented to customers of the data centers (IBXs), may be included, such as via product offering 26, customer portals 35, 53, 87 and/or APIs 31, 51, 85, as described herein, for example. In one example, data from four or more disparate systems may be displayed in the DCIM system to collect data and communicate with the DCIM system in a scalable way that is consistent with data architecture systems in place.

In another example, the DCIM portal may be used as both an internal tool as well as a service that is provided by the DCIM system to customers. The system may have the ability to support multiple customer subscriptions and may include a Product, Product Element(s) and Element Attribute(s). In another example, customer access may be granted to a subset of the data to which the customer may have access to data related to customers of theirs (customers of customer access). This may include one or more of the cabinets in a cage and the associated power circuits and specific temperature/humidity sensors.

In one example, non-customer IBX level alarm and monitoring data may be available to all customers in an IBX. This IBX level service may display information regarding alarms and the availability status of each UPS, Battery String, ASTS, Generator, Utility Feed, CRAC, CRAH, Chiller, and other infrastructure objects in the IBX. The average temperature and average humidity from all temperature and humidity sensors in the IBX may also be displayed (or determine a better way of signaling the temperature/humidity within the IBX). In one example, no customer or power circuit specific data is shown nor will customers have the ability to receive real time push alerts for alarms or changes in availability status in this IBX-specific view. When the resiliency status is changed to either "Reduced Redundancy (Planned)" or "Reduced Redundancy (Fault)," an estimate of the duration of the reduced redundancy state may also be displayed, if known.

In one example, the DCIM system, as a customer facing service, may be available to all Private Cage and Secure Cabinet customers globally and may apply to all IBXs globally. In one example, customer permission to view data in the DCIM may be based upon their association with a cage in the customer database.

In one example, temperature and humidity data points may indicate whether or not they can be used as evidence of an SLA violation. For example, any views displaying temperature and humidity data may call out that the data is not suitable evidence of an SLA violation unless otherwise noted. In one example, any temperature/humidity sensor that is located in an SLA qualifying area may have a call out indicating that the sensor can be used as SLA violation evidence. (Temperature and humidity SLA qualifying area may be defined as between three and five feet from the floor and no closer than twelve inches from the cool air intake side of a cabinet, for example.)

In one example, requirements around termination fees and pricing may be included once the rate structure is confirmed through business case approval. (i.e. month-to-month pricing, yearly subscription, etc. Pricing by customer, country, metro, IBX, etc).

According to one example, various levels of access to the DCIM system granting users different permissions may be provided. In one example, "Internal Access" indicates DCIM system users and "Customer Access" indicates customer or external users. Branch Circuit Monitoring, BCM data may be made available to some customers but not all customers for strategic reasons. For example, one access level for those customers with whom BCM data is shared may be created and another level for those with whom BCM data is not shared may be created; hence access level numbers 7 and 8 below. If there is a better way to make BCM data available to only some customers, access level numbers 7 and 8 below may not be necessary.

1. Internal Access—ADMINISTRATOR

Read-only access to all data and permission to create, update and delete IBXs and infrastructure objects Create & remove access to all internal & customer users as needed Hyperlink to BMS system for each site in current view (BMS access outside scope of DCIM)

Customizable dashboards with ability to drill down

Ability to configure infrastructure status change notifications (alarms, resiliency changes) protocol & recipients by infrastructure object Create and save customized reports that are globally accessible to all internal users Create and save customized reports that are globally accessible to all customer users 2. Internal Access—MANAGER Read-only access to all data in read only Create access to internal users as needed, remove access to internal users previously created by self Hyperlink to BMS system for each site in current view (BMS access outside scope of DCIM)

Customizable dashboards with ability to drill down

Ability to configure infrastructure status change notifications (alarms, resiliency changes) protocol & recipients by infrastructure object Create and save customized reports that are accessible by self 3. Internal Access—USER Read-only access to all data for a defined subset of IBXs Hyperlink to BMS system for each site in current view (BMS access outside scope of DCIM)

Customizable dashboards with ability to drill down

Ability to configure infrastructure status change notifications (alarms, resiliency changes) protocol & recipients by infrastructure object Create and save customized reports that are accessible by self 4. Customer Access—CUSTOMER GENERAL Summary infrastructure data for only the IBXs in which Customer has a system name (a subset of "All" data, to be defined)

Temperature/Humidity data to IBX or zone level—not customer cage/cab level

5. Customer Access—CUSTOMER ADMINISTRATOR

Create & remove access to all users within Customer as needed

CUSTOMER GENERAL data

Subset of Infrastructure object data (to be defined) specific to each power circuit in each system name Temperature/Humidity data specific to a system name (requires temperature/humidity sensors to be installed)

Ability to view floor layout drawings with no customer information besides the location of their system names Ability to view cage layout drawings for Customer system names Customizable dashboards with ability to drill down Ability to configure infrastructure status change notifications (alarms, resiliency changes) protocol & recipients by infrastructure object Ability to drill down to various infrastructure objects supporting their system name Create and save customized reports that are accessible by all users within Customer 6. Customer Access—CUSTOMER USER CUSTOMER GENERAL data Subset of Infrastructure object data (to be defined) specific to each power circuit in each system name Temperature/Humidity data specific to a system name (requires temperature/humidity sensors to be installed)

Ability to view floor layout drawings with no customer information besides the location of their system names Ability to view cage layout drawings for Customer system names Customizable dashboards with ability to drill down Ability to configure infrastructure status change notifications (alarms, resiliency changes) protocol & recipients by infrastructure object Ability to drill down to various infrastructure objects supporting their system name Create and save customized reports that are accessible by all users within Customer 7. Customer Access—CUSTOMER SUBUSER CUSTOMER GENERAL data Subset of Infrastructure object data (to be defined) specific to each power circuit in each system name Temperature/Humidity data specific to a subset of cabinets and associated power circuits within one system name (requires temperature/humidity sensors to be installed)

Ability to view floor layout drawings with no customer information besides the location of their system names Ability to view cage layout drawings for Customer system names Customizable dashboards with ability to drill down Ability to drill down to various infrastructure objects supporting the subset of cabinets and associated power circuits to which the user has access Create and save customized reports. Such reports are only visible to themselves.

8. Customer Access—CUSTOMER ADMINISTRATOR (BCM)

Create & remove access to all users within Customer as needed

CUSTOMER GENERAL data

Subset of Infrastructure object data (to be defined) specific to each power circuit in each system name Temperature/Humidity data specific to a system name (requires temperature/humidity sensors to be installed)

Ability to view floor layout drawings with no customer information besides the location of their system names Ability to view cage layout drawings for Customer system names Customizable dashboards with ability to drill down Ability to configure infrastructure status change notifications (alarms, resiliency changes) protocol & recipients by infrastructure object Ability to drill down to various infrastructure objects supporting their system name Create and save customized reports that are accessible by all users within Customer Access to BCM data for all power circuits in all Customer system names 9. Customer Access—CUSTOMER USER (BCM)

CUSTOMER GENERAL data

Subset of Infrastructure object data (to be defined) specific to each power circuit in each system name Temperature/Humidity data specific to a system name (requires temperature/humidity sensors to be installed)

Ability to view floor layout drawings with no customer information besides the location of their system names Ability to view cage layout drawings for Customer system names Customizable dashboards with ability to drill down Ability to configure infrastructure status change notifications (alarms, resiliency changes) protocol & recipients by infrastructure object Ability to drill down to various infrastructure objects supporting their system name Create and save customized reports that are accessible by all users within Customer Access to BCM data for all power circuits in all Customer system names In one example, a user interface of the DCIM system may support having a hyperlink or a remote desktop link to the underlying controls/monitoring system for the IBX or IBXs currently being displayed. Only users with proper permissions may have the ability to see this link. (See Access Levels). In one example, the DCIM system may provide a link to an external controls/monitoring system to some users, but each user must have permission to access the controls/monitoring system, separate and independent from the permission to access the DCIM.

In some examples, customers may be able to view their branch circuit monitoring (BCM) data through the DCIM, although there may be situations or caveats where it is not desirable to show customers BCM data. Therefore, the DCIM system may have the ability to disable BCM data presentation. In one example, the DCIM system may have the ability to disable BCM data presentation using different levels of access (e.g. one level of access that allows a customer to view all infrastructure data relevant to their company's Spaces and BCM, instead of just the data relevant to their Spaces) as outlined above in Access Levels.

In one example, DCIM system may enable users or customer users to be able to build their own views of the underlying data. For example, if an internal user has access to view all generators in a metro area, the user may be able to create a single graphical view showing all of the data for all of these generators. In another example, if a customer user has a cage in four IBXs across three countries, the customer may be able to create a single graphical view showing all the data for all four cages.

In one example, access to data, reports, graphical views, maintenance status, fault information and other features described below may be able to be configured on a per user basis. In one example, system operation may restrict a user's access to data, objects or features to which they have been granted permission through use of Active Directory.

In one example, the graphical views may be arranged in a hierarchical structure and may allow navigation up and down the hierarchy (as determined by Infrastructure object relationships). This may apply both to geographical and equipment hierarchies. For example, a global view may lead to a region view which will lead to a country view, a metro view and an IBX view. Within an IBX, a utility feed may lead to a distribution bus, UPS, STSs, PDUs and circuits. From any graphic display, a user may be able to navigate up to that display's parent display (for example from a UPS to a distribution bus) or down from a display to its child displays (for example from a UPS to its ASTSs). While navigating, the visibility of objects may be limited to those objects to which a user has access, for example two users with different access navigating down from a UPS may see different STSs. In one example, graphics representing one line drawings showing the status of associated equipment may be included at the IBX level. In another example, users may have the ability to view information at the cage level and to navigate from a cage to the mechanical and electrical systems associated with that cage. Minimum information displayed for a cage may depend on the permissions granted to each user, (See Access Levels) but may include all or some of the following: branch circuit information, temperature information, maintenance requests, infrastructure resiliency state, capacity data, customer name, and all CapLogix data. In one example, data may be able to be displayed both by logical devices and by cage. For example, for temperature and humidity data displays may be available both at the zone and cage level.

In another example, a user may have the option of creating, saving and recalling customized views of the equipment or data to which they have access. For example, a customer may create a roll up view showing the critical equipment servicing them across multiple IBXs. In another example, a user may have the ability to print their view to a PDF file. In another example, the DCIM system may have the ability to import AutoCAD drawings. These drawings may be used to maintain IBX and cage layouts. In another example, the DCIM system may either have the ability to be connected to AutoCAD through the use of a database or the ability for specific users (See Access Levels) to easily import files.

In one example, the DCIM system may have the ability to create status reports based upon selected customers, IBXs or regions. These status reports may show the maintenance, resiliency and alarm status for each customer in the report group. Reporting will also be available by cage or zone for temperature and humidity points. Reports may show actual historical data as well as summarize periods of SLA compliance and deviation.

In one example, the IBX power and mechanical infrastructure objects for each IBX need to have relational links to each other. The relationships between different objects can be one-to-one, one-to-many, many-to-one, and many-to-many.

EXAMPLE 1

Multiple generators feed one electrical bus

EXAMPLE 2

One electrical bus feeds multiple Main Switch Boards

EXAMPLE 3

One Uninterruptable Power Supply feeds one Ultra High Distribution bus

EXAMPLE 4

Multiple Ultra High Distribution busses feed multiple Static Switches

These relationships will be used to determine how an event specific to one object will affect other infrastructure objects. The relationships may be defined based on user inputs creating a graphical relationship between a plurality of icons depicting infrastructure assets in a data center, such as by a user creating a one-line diagram via a user interface, as described below with respect to FIG. 21.

In one example, availability and alarm information for all electrical system infrastructure objects (used for display, reporting, proactive notification) may be available for every power circuit delivered to customer cabinets. Each power circuit may be dependent on many infrastructure objects. The DCIM system may keep a record of infrastructure on which each power circuit is dependent. In one example, availability and alarm information for a specific power circuit may be limited to each infrastructure object on which the circuit is dependent.

In one example, availability and alarm information for all mechanical system infrastructure objects (used for display, reporting, proactive notification) may be available for all Spaces (defined as: Private Cages, Secure Cabinets, Business Suites). Each Space may be dependent on many infrastructure objects. The DCIM system may keep a record of infrastructure on which each Space is dependent. In one example, availability and alarm information for a specific power circuit may be limited to each infrastructure object on which the circuit is dependent.

In one example, the DCIM system may have an application programming interface, or API, enabling the data a customer would see (given their unique permissions as defined in Access Levels) to be ported into their own proprietary systems. The API may be as open as possible to allow the data customer the greatest flexibility.

Figure 29:
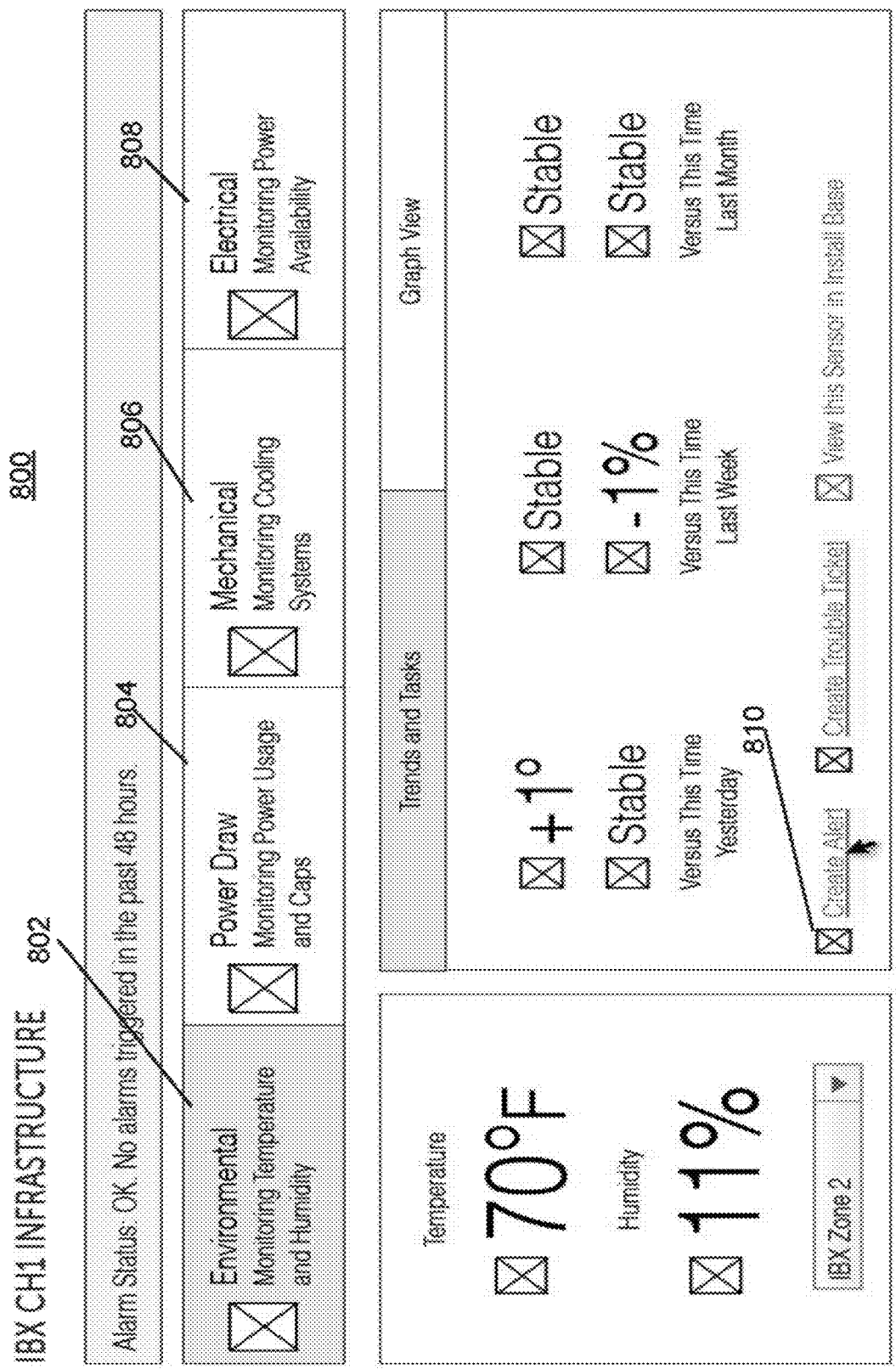
FIGS. 29-31 are schematic diagrams illustrating example user interfaces for creating alerts in a data monitoring system in accordance with techniques described herein.
Figure 30:
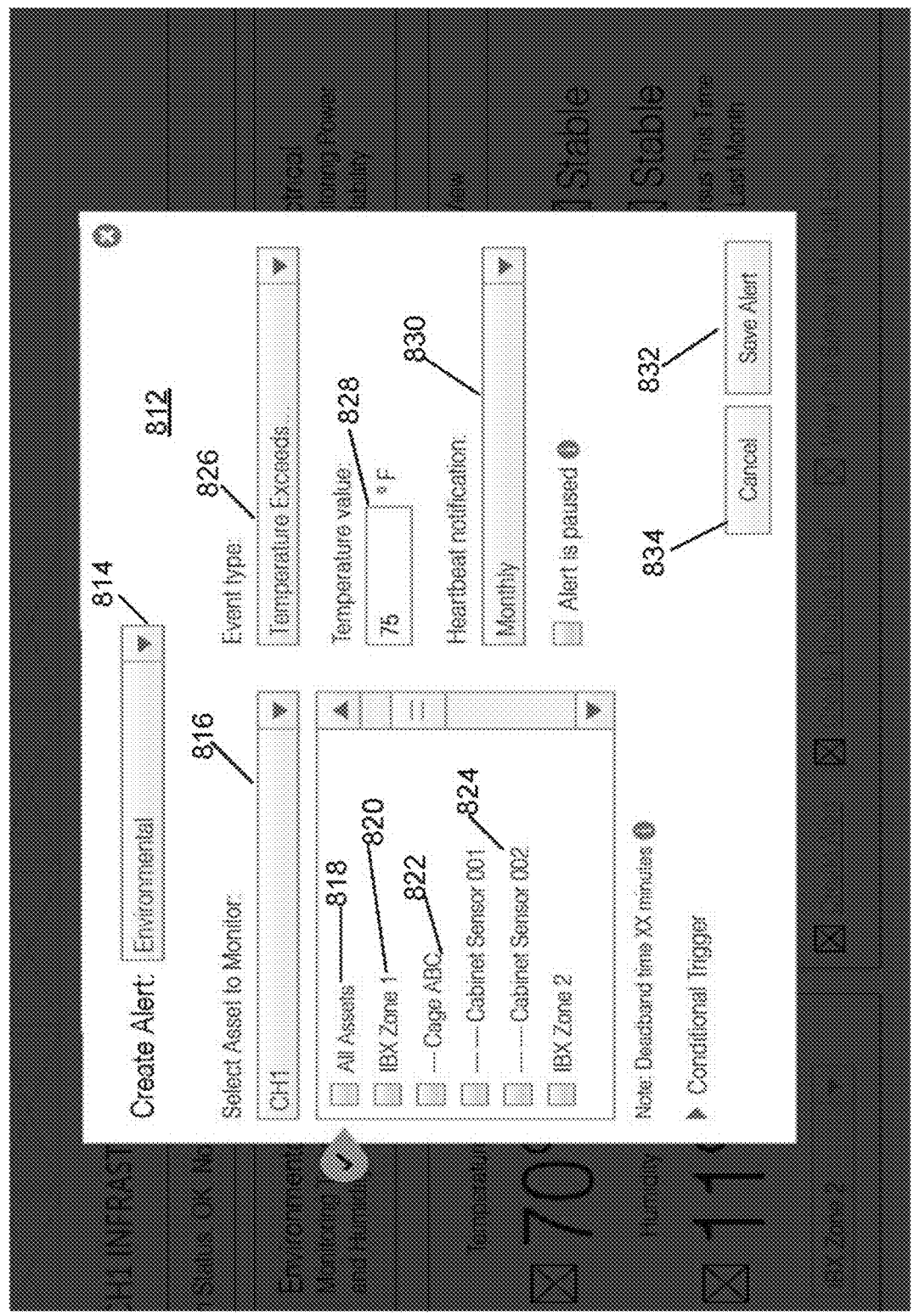
Figure 31:
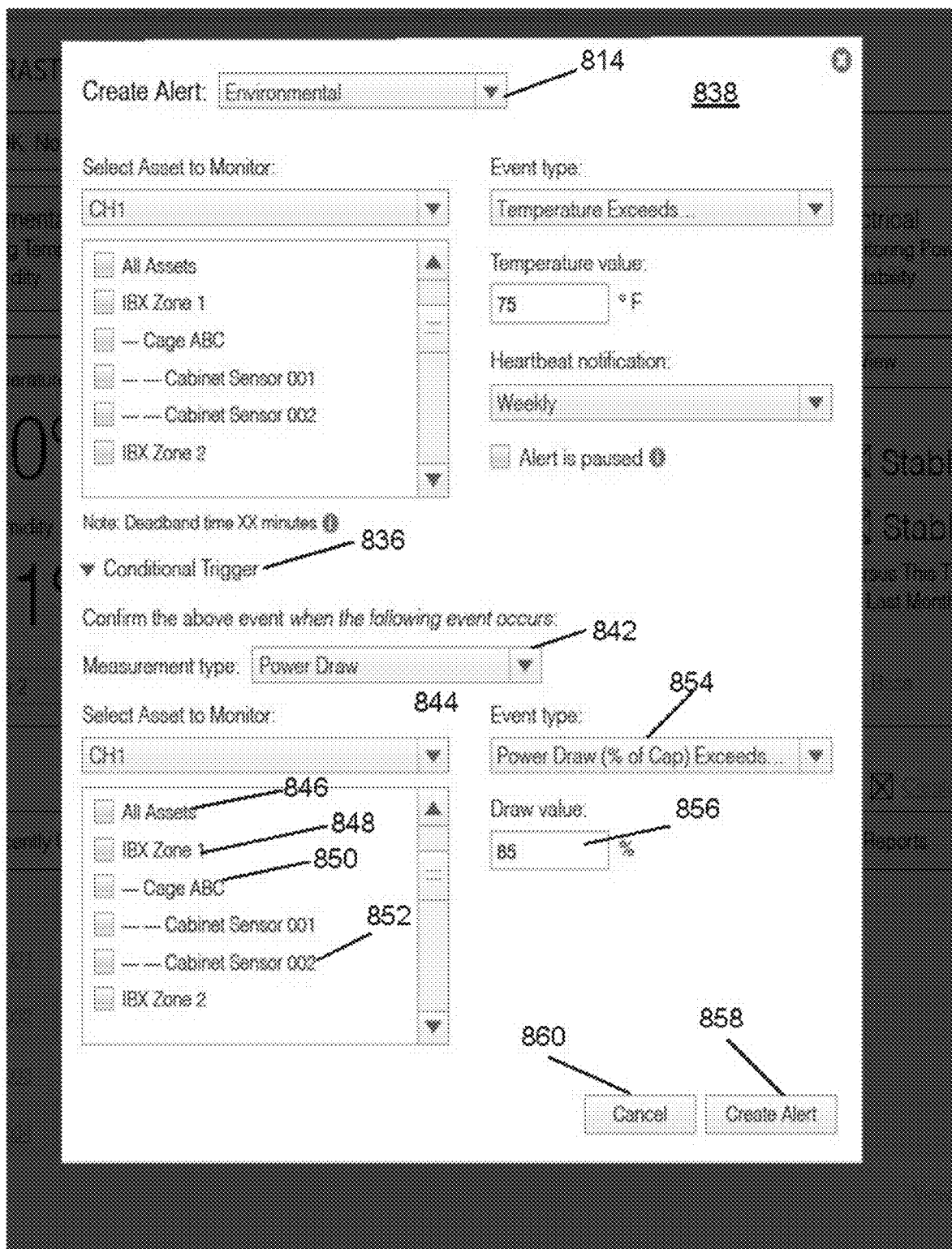

In one example, the DCIM system may be capable of providing proactive, real-time notification of all alarms or changes in resiliency statuses. In one example, the DCIM system may have these notifications sent via SMS text, email (SMTP), or SNMP (TRAP), or other protocol. Users with proper permissions (See Access Levels) may have the ability to turn notifications for each piece of infrastructure off or to control by which means they receive notification for each infrastructure object. In another example, the DCIM system may provide daily, weekly, or monthly summary reports of alarms and changes in resiliency statuses via email to users with proper permissions (See Access Levels). In another example, each infrastructure object for which a user has configured proactive, real-time notifications may send a system confidence message at least once per day to verify connectivity. This message may be sent using the method of delivery chosen by the user and may indicate that it is a test message verifying connectivity. In one example, if a user has turned off notifications for an infrastructure object, no system confidence messages may be sent. In some examples the user may create alerts as notifications, such as shown in FIGS. 29-31.

In one example, temperature and humidity sensors may be installed in some or all customer cages to provide cage level environmental reporting. The DCIM system may be capable of scaling to support temperature/humidity sensor additions on the fly, and may be easily configurable and, once installed, appear in the all applicable data views. In another example, the controls and monitoring system at each IBX may or may not have the capacity to handle the number of sensors needed. In one example, in order to make cage level temperature and humidity data available to users in the DCIM system, the local controls/monitoring system may be bypassed at some or all IBXs to make the data from these additional, cage level sensors available to the DCIM system directly.

In one example, reports may be capable of being set up to generate automatically and be emailed to a specified set of email addresses regularly (daily, weekly, monthly, quarterly, annually).

In one example, a report of access logs specific to a particular customer may be pulled. This report may detail the access to a particular private cage—both by who and when.

In one example, the user may select a date range for the report.

In one example, a report of all infrastructure object alarms that occur during a specified time frame which affect a particular customer may be requested by a user. In one example, if a user identified as an 'Internal User' in the CRUD matrix in the Access Levels requirements described above attempts to pull a report, the user may be able to choose a customer or cage (system name) to report on. In one example, if the user is identified as a 'Customer User' in the CRUD matrix, the user may only have the ability to choose a cage (system name) for which they have access. Either type of user may be able to specify the date range for the report.

In one example, the DCIM system may create status reports for a subset of infrastructure objects (limited to those objects that actually affect the user) based upon cages, IBXs or regions. These status reports may show the maintenance, resiliency and alarm status for each infrastructure object in the report group, for example, and the user may be able to specify the date range for the report. In one example, RPP load balancing report may show that Cage A has 10 kVA of provisioned power and 3 kVA of draw from RPP 1 and 12 kVA of provisioned power and 5 kVA of draw from RPP 2 and 3 kVA of provisioned power and 0 kVA of draw from RPP 3. In one example, one cage's report may show load balancing from all infrastructure objects listed above.

In one example, a cage level report detailing total provisioned power on all power circuits vs actual power draw on all power circuits specific to each generator, UPS, STS/ATS, PDU, RPP may be requested.

In one example, a report detailing the equipment list of infrastructure objects supporting a particular cage for which a user has access to view may be requested. Information for each infrastructure object (electrical and mechanical) may include one or more of the following:

Equipment type (CRAC, UPS, Pump, etc.)
Equipment identifier (Example: UPS C-1A)
Manufacture name
Equipment name
Equipment model number
Equipment Serial number
Area equipment supports
Date of manufacture
Date of installation
Date of last preventive maintenance
Date of last corrective maintenance In one embodiment, a report detailing the upcoming maintenance events for infrastructure objects in a cage may be pulled (requested). The report may include one or more of the following:

Type of maintenance (there are five different CMR types)
Non-critical activity (parking lot/elevator/ect.)
Scheduled Preventative (planned preventative maintenance)
Remedial Corrective (corrective or emergency, used to fix equipment that is down or has the
potential to cause an imminent outage)
Scheduled Customer Outage (used when maintenance requires that customer's equipment be put offline)
Managed Services
Description of the maintenance
Summary of objectives for the maintenance
Have the ability to select all infrastructure object instances applicable to user or only a subset of infrastructure object instances applicable to user (check boxes)
According to one example, a user may select a future time window on which to report.

According to another example, a report detailing past maintenance events for infrastructure objects in a cage may be pulled and may include one or more of the following:
Type of maintenance (there are five different CMR types)
Non-critical activity (parking lot/elevator/ect.)
Scheduled Preventative (planned preventative maintenance)
Remedial Corrective (corrective or emergency, used to fix equipment that is down or has the potential to cause an imminent outage)
Scheduled Customer Outage (used when maintenance requires that customer's equipment be put offline)
Managed Services
Description of the maintenance
Summary of the maintenance (what was done, was it successful, did it require additional maintenances, etc)
Have the ability to select all infrastructure object instances applicable to user or only a subset of infrastructure object instances applicable to user (check boxes)
In one example, a user may select a past time window on which to report.

In one example, the DCIM system may provide proactive, real-time notification of upcoming maintenances. The system may send these notifications via SMS text, email (SMTP), or SNMP (TRAP), or other protocols. In one example, users with proper permissions (See Access Levels) may turn on/off notifications of upcoming maintenances for each piece of infrastructure or control the means by which maintenance notifications are received for each infrastructure object.

In one example, the DCIM system may provide consistent graphical views of the underlying data. For example, a view of a generator needs to show the same information in the same graphical manner and with similar naming structures without regard to the site being viewed.

In one example, the DCIM system may keep a log of all configuration changes made, including logged-in user who made the change, date/time of the change made, and the details of the changes that were made.

In one example, an end user configurable check and balances engine capable of being configured to verify any system data against any other system data may be included. The resultant calculation of this engine may be a native system tag with all other features which a normal system tag would possess.

In another example, an end user configurable calculation engine capable of being configured to calculate PUE or other efficiency calculations may be included. The resultant calculation of this engine may be a native system tag with all other features which a normal system tag would possess.

In another example, an end user configurable advanced calculation engine capable of answering time based queries such as 'did event x happen more than y times in z period?' may be included. The resultant calculation of this engine may be a native system tag with all other features which a normal system tag would possess.

In one example, the DCIM system may include the ability for an end user with proper permissions to be able to create ad-hoc reports, trends or graphics on the fly using any combination of the data in the system.

In one example, the DCIM system may include complex applications ('Apps') such as one or more of the following: Electrical one-line diagrams with what-if capabilities; Cooling what-if capabilities; Association of Remedy/Maximo data with a piece of equipment such that the graphical representation of a piece of equipment shows the planned maintenance status.

As described above, DCIM system 22 includes DCIM tools 47, such as the global data center (IBX) monitoring system (GIMS) 42 for data center health monitoring, reporting and dashboards, and infrastructure asset usage analysis. The GIMS 42 may be associated with a number of possible operational activities. For example, the GIMS 42 may be associated with operational management of power usage effectiveness (PUE), management of alerts, along with management of templates, assets, points and access controls. The GIMS 42 may also be associated with real time analytics of historical data trends, asset maintenance, consistent asset view, asset status and fault information. In another example, GIMS 42 may be associated with simulation and prediction of asset hierarchy traversal, one-line diagram-what-if analysis, and time based query rules.

In one example, the GIMS 42 may include a customizable dashboard that is configured to receive user inputs that enable the user to create a graphical relationship between a number of icons depicting infrastructure assets in a data center. A computing device, such as computing device 500 (FIG. 16), of the dashboard automatically associates, based on the graphical relationship between the icons, respective infrastructure assets depicted by the icons with respective customer equipment in the data center affected by the infrastructure assets. The association between the infrastructure assets and the customer equipment may then be stored in a storage device, such as storage device 508, by the computing device 500.

For example, the customizable dashboard may provide the user with the ability to take an icon representing a device or piece of equipment, such as an uninterruptable power supply, an air handler, or similar device, for example, and drag or transfer the piece of equipment from a list of equipment onto a canvas portion of the user interface to create a default depiction of the piece of equipment. In one example, in addition to this default depiction of the single piece of equipment, the user may select information from other businesses systems to be included. For example, in addition to the default depiction of piece of equipment, other related system maintenance information may be included in the depiction, such as whether there was past maintenance or scheduled future maintenance associated with the piece of equipment, as well as customer management information, such as what customers are affected by the specific piece of equipment.

In this way, in addition to having the capability to select an asset, such as a power, cooling, electrical or mechanical related asset, the user may drag the asset from an asset list to a canvas or screen to display a default depiction of the asset or piece of equipment. In one example, a user may to select operating data and/or business data to be included with the default depiction of the asset in the display, and therefore has the option to select any combination of operating data and business data to be displayed in combination with the default depiction of the piece of equipment on a single canvas or screen. The user may thus extend a default depiction of a piece of equipment, and add multiple instances to a single view, such as displaying all fuel tanks located in a particular geographic area on a single graphic, for example, in addition to displaying specific information, such as maintenance information, or customers affected by those assets on the same graphic.

In another example, after a user drags an asset from an asset list to a palette, canvas or dashboard screen to display the asset, the user may request that other assets or asset related options associated with an asset be displayed, such as maintenance, temperature, effected customers, alarms, display of the asset, and resiliency, for example. According to one example, resiliency may be an indication as to whether the asset has a matched up pair that may be utilized as a spare in the event that the displayed asset fails. In another example, affected customers may be an indication of customers affected by the asset.

FIG. 19 is a schematic diagram illustrating a customizable dashboard for displaying an asset in accordance with techniques described herein. As shown in FIG. 19, a dashboard 600 may include an asset tree portion 602 that lists assets, such as a generator 604, for example, one or a multiple number of times, along with a palette portion 606 for displaying an asset or a tag. In the example illustrated in FIG. 19, the asset that is being displayed is a generator asset 608 as a result of the user selecting generators 604 from the tree portion. As described above, a user navigates through the items listed in the tree portion 602, and may select and drag a particular tag or an entire asset from the tree portion 602 to the palette portion 606. In the example illustrated in FIG. 19, the palette portion 606 includes the generator asset 608, in addition to alarm information 619, maintenance information 612, historical data temperature information 614, and certain selected data points 616, for that generator 608.

In one example, the relative arrangement of selected icons, i.e., the generator asset 608, alarm information 619, maintenance information 612, historical data temperature information 614, and certain selected data points 616, may be determined and controlled by the user, so that the user interface receives input from the user indicating how the selected icons and data are to be arranged on the palette portion 606 relative to each other. In another example, the user interface may receive inputs that perform one or more of rearranging the relative position of the icons, removing one or more of the icons, re-sizing the icons, or inserting additional icons to the palette portion 606. In addition, while temperature information 614 is shown in a graphical format, in one example, the user may determine how the data is to be displayed, such as historically, in a chart format, in a graphical format, etc., and may input these selections which are received by the user interface.

In this way, both a default view and a customizable view may be created by the user for each asset. For example, in response to receiving a user input selecting an icon depicting an asset from an asset hierarchy tree displayed by a user interface and moving the asset to a dashboard section of the user interface, a computing device may output for display a plurality of options for information to display about the asset associated with the selected icon, the plurality of options comprising a default information view of the asset and a list of customers affected by the asset. The computing device receives a user input selecting at least one of the plurality of options, and outputs for display information about the asset according to the selected at least one of the plurality of options. As another example, a presented option which can be selected may include a current resiliency status of the asset indicating whether there is an operational backup asset for the asset.

In another example, the dashboard 600 may include a display dropdown 618 that enables the user to create the customized dashboard 600 as described above, and save or download the dashboard 600 in various formats, such as a PNG image, a JPEG image, a PDF document, a SVG vector image, an Excel image, or as a report, for example. In another example, the user interface may receive an instruction from the user to send the customized dashboard 600 to another user (whose address/number may be specified in the instruction) who may subsequently perform one or more of rearranging the relative position of the icons on the dashboard 600, removing one or more of the icons, re-sizing the icons, or inserting additional icons to the palette portion 606, and may save the resulting dashboard 600 as their own dashboard 600. In another example, in response to receiving a command from the user to save the created dashboard, the user interface saves the dashboard and may update live data, and when the created dashboard is reloaded, the resulting displayed dashboard is loaded with updated live data.

Figure 20:
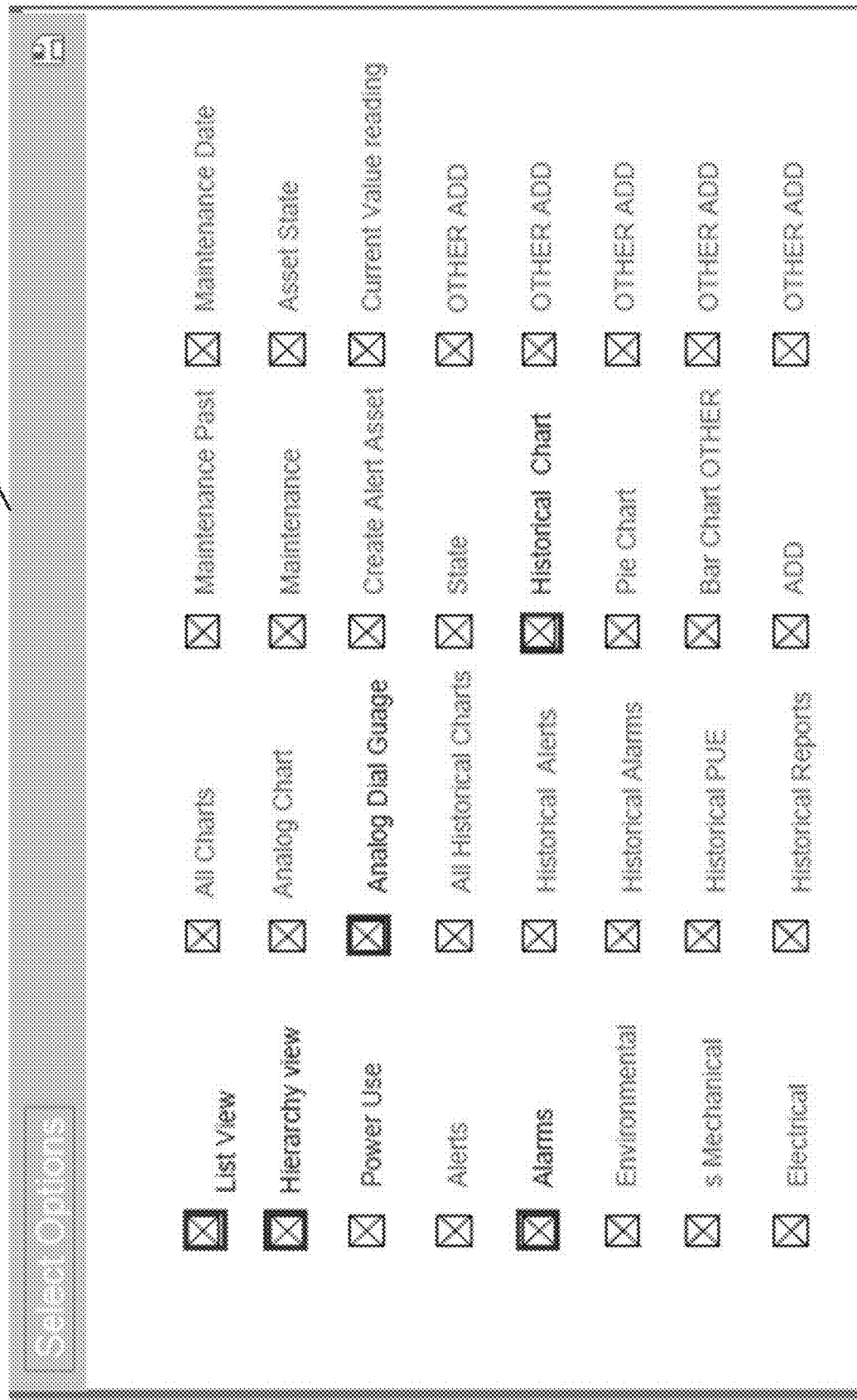
FIG. 20 is a schematic view of example selection options presented for display by a user interface for selecting asset related information in a customizable dashboard for displaying an asset in accordance with techniques described herein.

FIG. 20 is a schematic view of selection options presented for display by a user interface for selecting asset related information in a customizable dashboard for displaying an asset in accordance with techniques described herein. As shown in FIG. 20, in one example, multiple options may be displayed in select options window 640 of the dashboard 600. For example, as shown in FIG. 20, the user interface may receive input from the user to customize the dashboard 600 indicating selections of desired asset related information such as list view or hierarchy view, power use, user alerts, system alarms, environmental, mechanical or electrical data, resiliency (not shown), and affected customers (not shown), chart formats, graphical formats, historical view, pie chart view, and so forth, from the select options window 640.

Figure 21:
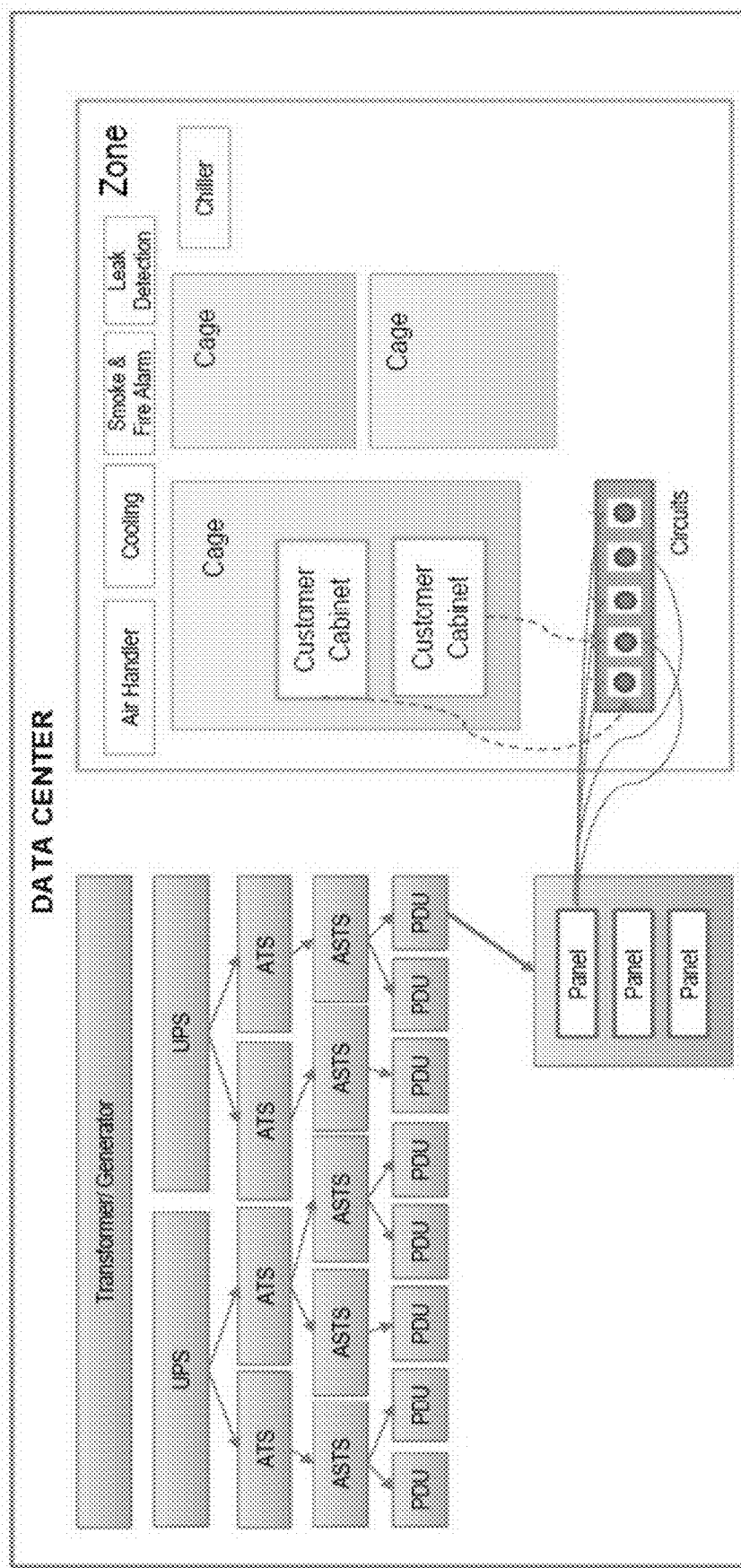
FIG. 21 is a block diagram illustrating a logical view of the hierarchical relationship between data center assets, cages, and customer cabinets in an example data center.

FIG. 21 is a block diagram illustrating a logical view of the hierarchical relationship between data center assets, cages, and customer cabinets in an example data center. The left side of the logical view shows the hierarchical relationships between electrical infrastructure assets including a transformer/generator, UPSs, ATSs, ASTSs, PDUs, panels within a PDU, and circuits physically coupled to the panels. Data indicative of the relationships between the electrical infrastructure assets may be stored in one or more databases. The right side of the view shows customer cages having customer cabinets located inside the cages. The customer cabinets are physically coupled to the circuits. The cabinetto-circuit mappings and the circuit-to-panel mappings may be stored in a customer management database, in some examples. The rights side of the logical view also shows that the cages, cabinets, and circuits are within a zone of the data center. Although only a single zone is shown, a data center will typically have multiple zones, and each cage is associated with a single zone. The zone is also logically associated with various mechanical infrastructure assets, such as an air handler, cooling device, chiller, smoke and fire alarms, and leak detection device. Data indicative of the associations between the mechanical assets and the zones may be stored in an asset management database.

As described herein, a user-facing tool (e.g., GIMS) may provide a drag and drop feature for building a one-line diagram. For example, a user can drag a switch below a PDU in the one-line diagram. The GIMS sends the GIMS data to the data center gateway (for example, after the user selects "save"). When the data center gateway system receives the GIMS data representing the relationship between the infrastructure assets, the data center gateway system stores the data. In some examples, the relationship between the infrastructure assets may be expressed in terms of an "upstream" or "downstream" properties relative to each other, representing whether the assets are upstream or downstream to one another relative to a power source (i.e., upstream or downstream in a real-time power path). The data center gateway system may store the data in a relational database, for example. The data may be structured data that describes the infrastructure assets and their properties.

The data center gateway system determines which customers affected by/dependent upon an infrastructure asset (e.g., a UPS). For example, the data center gateway system queries the server requesting an indication of customers dependent upon the UPS. The system looks for any infrastructure assets that are specified as "downstream" of the UPS in the data structure, and follows the tree of downstream devices until reaching a lowest level of assets in the data structure. In some examples, the lowest level of assets in the data structure may be the customer cabinets. In other examples, the lowest level of assets in the data structure may not be the customer cabinets, but instead may be the assets directly connected to the customer cabinets (e.g., circuits). In some examples, a relationship between customer cabinets and the assets directly connected to the customer cabinets may be stored in a separate data structure also accessible to the data center gateway system. For example, the relationship of customer-to-PDU circuits may be stored in a customer management database. This association may be generated when a customer is on-boarded and the customer is assigned to one or more circuits on a PDU. For example, circuits of a PDU may be tagged with customer identifiers (IDs). In this manner, in response to receiving a user input requesting a list of customers of the data center dependent upon one of the infrastructure assets in the data center, the system may reply with a list of customers affected based on the stored association between the infrastructure assets and the customer cabinets (e.g., the hierarchy/mapping generated by the data center gateway system). In some examples, the list of customers affected may be a subset of all the customers of the data center.

The data stored in the data structure based on the one-line diagram inputs may subsequently be used by the data center gateway system in determining which infrastructure assets to display to a given customer user, such that the customer user sees only those infrastructure assets that provide power (or cooling) to the customer's equipment. Which infrastructure assets are displayed to the customer are controlled based on customer sign-in, based on the customer ID tied to those PDUs they are associated with as noted above. The data center gateway system sends to the client device a data array of PDUs that the customer ID is associated with in the customer database. The portal application/GIMS receives this data from the data center gateway system then renders a graphical depiction of the graphical relationship between the infrastructure assets that includes only the PDUs in the array of PDUs.

Figure 22:
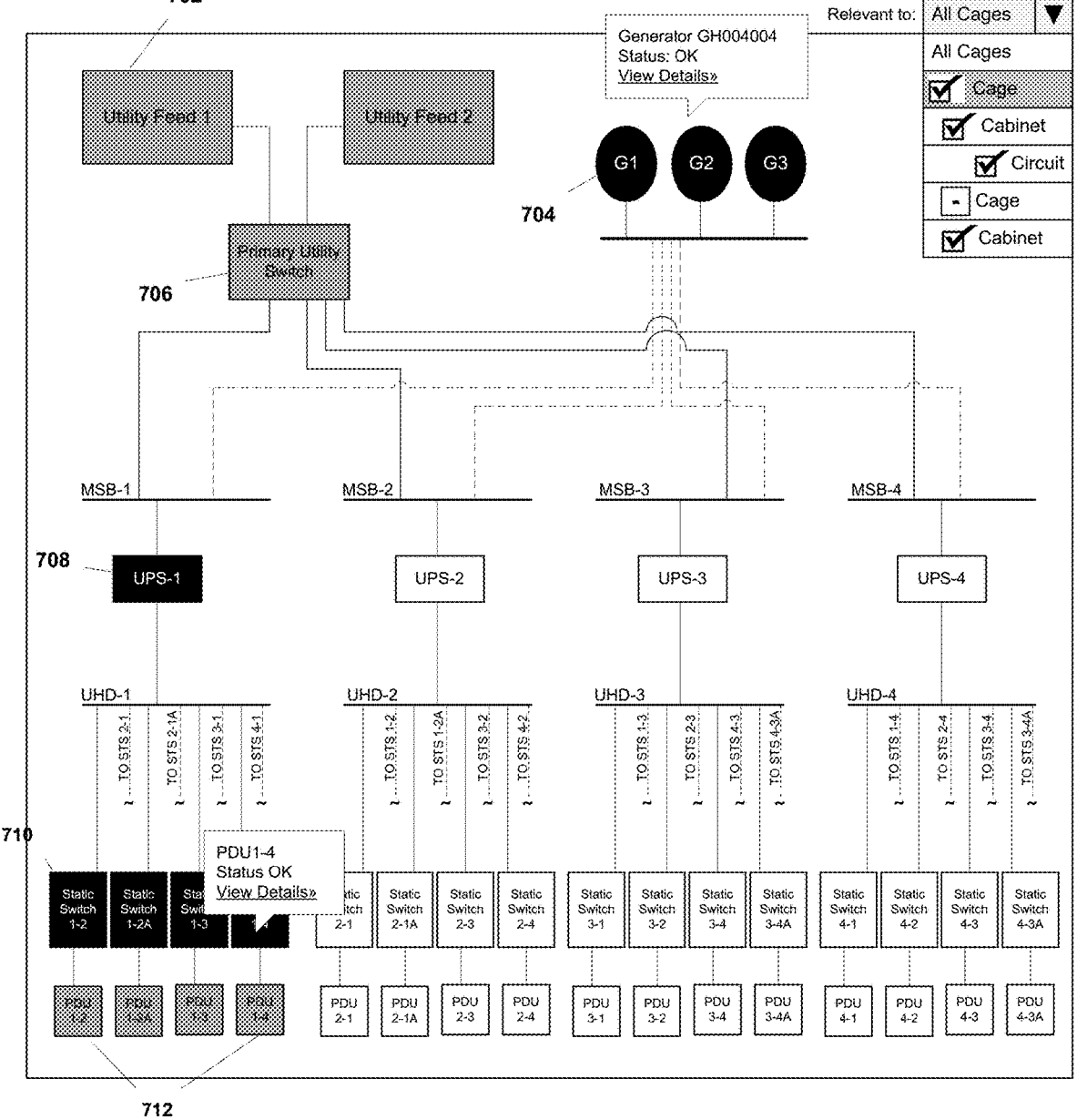
FIG. 22 is schematic diagram of an example user interface having a one-line diagram that may be generated to determine an affected customer list in accordance with techniques described herein.

FIG. 22 is schematic diagram of a one-line diagram that may be generated to determine affected customers in accordance with techniques described herein. As shown in FIG. 22, in one example, an IBX diagram 700 is output for display by the user interface and may include one or more utilities 702, one or more generators 704, and a primary switch 706 between the one or more utilities 702 and the one or more generators 704. The user interface may be produced by a customer portal application or GIMS application executing on a computing device such as a computer, tablet, or mobile device. As depicted in the IBX diagram 700, electricity flows down to a UPS 708, and the UPS 708 flows down to static switches 710 and eventually to electrical panels within one or more power distribution units (PDU) 712 that output electricity to circuits to which customer cabinets are connected.

In one example, to determine an affected customers list associated with customers having customer cabinets dependent upon (affected by) a given asset or assets, such as by one or more UPS 704, a user may generate an IBX diagram 700 by selecting one or more utilities 702, one or more generators 704, and a primary switch 706 between the one or more utilities 702 and the one or more generators 704 from asset tree portion 602 (e.g., an asset icon library) and dragging the selected items to the palette portion 606 (dragging and dropping). In addition, the user may select a static switch 710 from the asset tree portion and position the selected switch 710 beneath a desired UPS 708, and may select one or more desired PDU 712, associated with a known customer or multiple customers, and position the one or more PDU 712 below the static switch 710. The asset icon library may include an icon for each infrastructure asset in a data center, where the icon indicates an identifier that uniquely identifies the infrastructure asset in the data center. For example, the identifier may specify an asset type and an asset number.

In this way, according to one example, the user may create a one-line diagram (also called a "single-line diagram") associated with a specific user selected configuration on the IBX diagram 700 using known relationships between given customers and one or more PDU 712 linked to a given UPS 708. The relationships between customers and circuits, and circuits to UPSs may be obtained from a customer database (e.g., a customer relationship management application), such as by a data center gateway system.

In this manner, in response to receiving a plurality of user inputs creating graphical relationships between a plurality of icons depicting infrastructure assets in a data center, a computing device having a system such as a GIMS application can automatically determine, based on the graphical relationships, hierarchical relationships between the infrastructure assets in the data center depicted by the icons. The user inputs creating the graphical relationships between the icons may include inputs positioning the icons relative to each other, and connector icons coupling the icons (e.g., arrows or interconnecting lines).

The computing device may be configured to translate the icons depicting the infrastructure assets and the interconnecting lines to the data indicative of the hierarchical relationships, such as to a JSON format having objects that identify the individual infrastructure assets, and properties defined for each of the JSON objects. The properties may include properties identifying upstream and/or downstream infrastructure assets in a power path. The properties may include properties identifying a data center zone associated with the infrastructure assets. The properties may also include resiliency status of the infrastructure assets in the hierarchy (indicating whether the asset is resilient, i.e., whether there is at least one spare/backup asset available in the power path or zone). In some examples, the operations of determining the hierarchical relationships between the infrastructure assets and resiliency status are performed by the GIMS application at the computing device, e.g., in an "offline" operation. In other examples, these operations may be performed by the data center gateway after receiving the raw data indicative of the icons and interconnecting lines.

The computing device may then store data indicative of the hierarchical relationships between the infrastructure assets. For example, the computing device may store the data in response to receiving a user selection to "Save" the one-line diagram arrangement. For example, storing the data indicative of the hierarchical relationships between the infrastructure assets may include storing the data in cache memory of the computing device. The computing device may transmit the data indicative of the hierarchical relationships to a data center gateway (e.g., data center gateway 34 of FIGS. 2-3, and data platform 59 of FIGS. 4 and 9) of a DCIM system for persistent storage, such as in database 135 (FIG. 9). Database 135 may include a data structure, or any suitable type of repository for storing data. In some examples, the computing device may transmit the data to the data center gateway 34 via APIs in the service layer 120 in the form of JavaScript Object Notation (JSON) data. In some examples, instead of using a dynamic GIMS tool for using icons and connectors to create the JSON data depicting the data center asset layout, a data center administrator may submit a static JSON map to the GIMS system, which the GIMS tool may store and send to data center gateway.

The following is an example portion of a structured data document (e.g., JSON) that may be sent by Data Center Gateway, showing how infrastructure assets such as ASTS and PDUs are hierarchically related with properties including upstream assets, downstream assets, and resiliency status.

```
"CH1.ASTS-1-2-A": {
    "assetTemplate": "ASTS",
    "points": {
        "assettype": "ASTS",
        "s1failure": "missing",
        "loadons1": true,
        "s2failure": "missing",
        "loadons2": false,
        "preferredsource": "missing",
        "resiliencyvote": "missing",
        "resilient": true,
        "alarm": "missing",
        "preferredParent": "CH1.UPS-1",
        "currentParent": "CH1.UPS-1",
        "idealPath": true,
        "hierarchyResiliency": true
    },
    "upstream": ["CH1.UPS-1", "CH1.UPS-2"],
    "downstream": ["CH1.PDU-1-2A"]
},
"CH1.PDU-1-2A": {
    "assetTemplate": "PDU",
```

-continued

```
    "points": {
        "assettype": "PDU",
        "resilient": "missing",
        "alarm": "missing",
        "preferredParent": "CH1.ASTS-1-2-A",
        "currentParent": "CH1.ASTS-1-2-A",
        "idealPath": true,
        "hierarchyResiliency": true
    },
    "upstream": ["CH1.ASTS-1-2-A"]
}
```

The data center gateway 59 receives the data from the GIMS tool regarding each data center layout/hierarchy of infrastructure assets, and stores the data in database 135. Data center gateway 59 (also shown as data center gateway 34 of FIG. 3 and ExSight Data Platform 20) may build a mapping between customers and data center infrastructure assets (e.g., UPSs, PDUs, generators) based on the stored data received as JSON data from the GIMS tool and based on data obtained from one or more Enterprise IT systems 48, such as Siebel, Maximo, Caplogix, and other systems. Data center gateway 59 may dynamically re-generate the mapping at configured intervals (e.g., every minute, hourly, every 4 hours, daily, or other configurable time interval). This mapping may be used by data center gateway 59 in response to receiving queries from any of DCIM tools 47 or product apps such as customer portal 53. In some examples, data center gateway 59 may store the mapping in the form of a tree data structure. In some examples, data center gateway 59 may store the mapping as a data structure that associates a customer ID with each of the infrastructure assets relevant to the customer's cabinets (e.g., assets the customer's cabinets are dependent upon for electrical or mechanical operation).

In this manner, data center gateway 59 provides data that currently reflects the status and hierarchy of data center infrastructure assets in real-time or near-real-time. In some examples, data center gateway 59, GIMS, and customer portal may be configured to use web sockets to automatically push data to the user interfaces (e.g., GIMS or customer portal), such that the graphical depictions of the real-time power path change in real-time based on current state in the data center as detected by the DCIM edges. GIMS or customer portal may use an API that sends messages to data center gateway 59 and receives event-driven responses without having to poll the data center gateway 59 for a reply.

In some examples, the resulting one-line diagram may be used to simulate a one-line diagram-what-if analysis within real time analytics of historical data trends in the GIMS 89 for informing the user on what customers may be affected by an asset. That is, the GIMS 89 and, in turn, data center gateway may receive a request for information about what is likely to happen in a proposed one-line diagram setup, based on analysis of historical data trends. The data center gateway can provide the what-if analysis information in response to the request.

The enterprise IT systems 48 may include customer relationship management systems, data center management systems, and other systems. The data from the Enterprise IT systems 48 may include data that specifies customer IDs associated with data center zones, and customer IDs associated with circuits. These properties may be assigned as part of customer on-boarding, when a customer first is assigned cabinet(s) in a data center. A customer may be assigned a location vector (e.g., a data center floor, zone, room, cage), and this association may be stored in one of enterprise IT systems 48. In addition, a circuit-to-panel mapping may be stored in a customer relationship management system, for example. A panel-to-PDU mapping may be stored in the same or a different IT system. When the infrastructure assets in each IBX (data center) are first detected by the DCIM edge, the infra asset configurator 44 creates the infrastructure asset record in the enterprise IT systems, and associates a zone with mechanical assets. After the infrastructure assets are populated in the systems, the assets may be made available in icon libraries of GIMS 42 and visualization analytical tool 49.

In some examples, in response to subsequently receiving a user input requesting a list of customers of the data center affected by one of the infrastructure assets in the data center, the computing device may retrieve a list of customers from the data center gateway based on the data indicative of the hierarchical relationships between the infrastructure assets, and output for display the list of customers. In some examples, such as shown in FIG. 21, the computing device may receive a user request requesting a view of infrastructure assets that are "relevant to" all cages, particular selected cages, selected cabinets within a cage, or selected circuits within a cabinet. In response to receiving the user request, the computing device may send the request to the data center gateway (e.g., via the API gateway), and the data center gateway parses the stored data to identify a proper subset of infrastructure assets that are relevant to the selected cage(s)/cabinet(s)/circuit(s). The data center gateway outputs an array of data (e.g., JSON data) relevant to the selected items, and sends it to the requesting computing device, which converts the data to the graphical depiction of icons and interconnections for the subset of infrastructure assets, and outputs the graphical depiction of the data for display.

As another example, in response to receiving a user input selecting an alarm configured for one of the infrastructure assets in the data center, the computing device outputs for display a list of customers affected by the alarm based on the data indicative of the hierarchical relationships between the infrastructure assets.

In some examples, a computing device receives a request from a customer of a data center to display a real-time power path through a plurality of assets of the data center, and the computing device determines a subset of the plurality of assets of the data center that provide power to equipment of the customer of the data center, and outputs for display a graphical depiction of the real-time power path between the subset of the plurality of assets of the data center that provide power to equipment of the customer in the data center. The computing device may be a computer, tablet, or mobile device of the customer executing a customer application that allows the customer to see aspects of the data center affecting the customer's cabinets and cages. For example, the customer may submit the request using one or more product applications 46 (FIG. 3) or customer applications 65 (FIG. 4). The data center gateway 34 (or data center gateway/data platform 59, FIGS. 4 and 9) receives an indication of the request via API platform 63.

In response to receiving the indication of the request, the data center gateway 59 may determine the subset of the data center assets that provide power to customer equipment (i.e., provides power to customer cabinets assigned to the customer in the data center) based on data indicative of hierarchical relationships between the infrastructure assets accessible to the data center gateway 59, including zones associated with the infrastructure assets and/or upstream/downstream asset properties in the power path. In some examples, the data center gateway determines the subset of the data center assets that provide power to the customer cabinets based on the data indicative of the hierarchical relationships between the infrastructure assets that was created based on an operations user's one-line diagram creation, as described above. In some examples, the data center gateway 59 may additionally determine the subset based on data obtained from enterprise IT systems 48. The data may include customer-to-cabinet mapping data, cabinet-to-circuit mapping data, circuit-to-PDU mapping data, or other mappings. In some examples, the subset of the data center assets that provide power to the customer cabinets may be all of the data center assets, such as where the customer has a large presence in the data center. In this manner, the term "subset" refers to a proper subset that may include the entire set.

While the generation of a one-line diagram to determine an affected customer list, illustrated in FIG. 21, is described for purposes of example with respect to electrical infrastructure assets, similar user interfaces and systems may be used for creating associations and relationships between other types of infrastructure assets, such as mechanical, environmental, cooling, or power draw systems.

In one example, the data center gateway may generate an electrical single line data vector of one or more data center sites, and relevancy levels of assets is chosen within a co-location space. In one example, a current power path in real time may be shown, as opposed to merely a static image to show where power is coming from in real live time. For example, different generator paths may be shown to the user by the GIMS or portal application in the user interface in response to the user clicking on one or more UPS or static switches in the one-line diagram. The line leading to a generator may take on a different form to indicate changes in status of a generator. For example, the line may take on a bold weight or a green color when there is an overload, or a dotted line when utility power is out. When an automatic static transfer switch (ASTS) is moved over to a redundant path, it is an indication of a primary path failure. When a UPS is taken off line, the associated primary paths may go blank and there is a roll-over to the redundant path. In this way, a user may be provided with real time visibility to different simulated power paths, and the user may determine the resiliency of power circuits by moving different switches or combination of switches to view the resulting power circuit indications. As a result, additional operational visibility is made available to the user to enable the user to make more educated decisions on mitigating actions that may be taken by the user based on simulated failures or outages of power circuits, for example, and to give the user an opportunity to prepare for given contingencies in the system and to create timely risk mitigation strategies that may be put into place during real life outages and failures.

Figure 23:
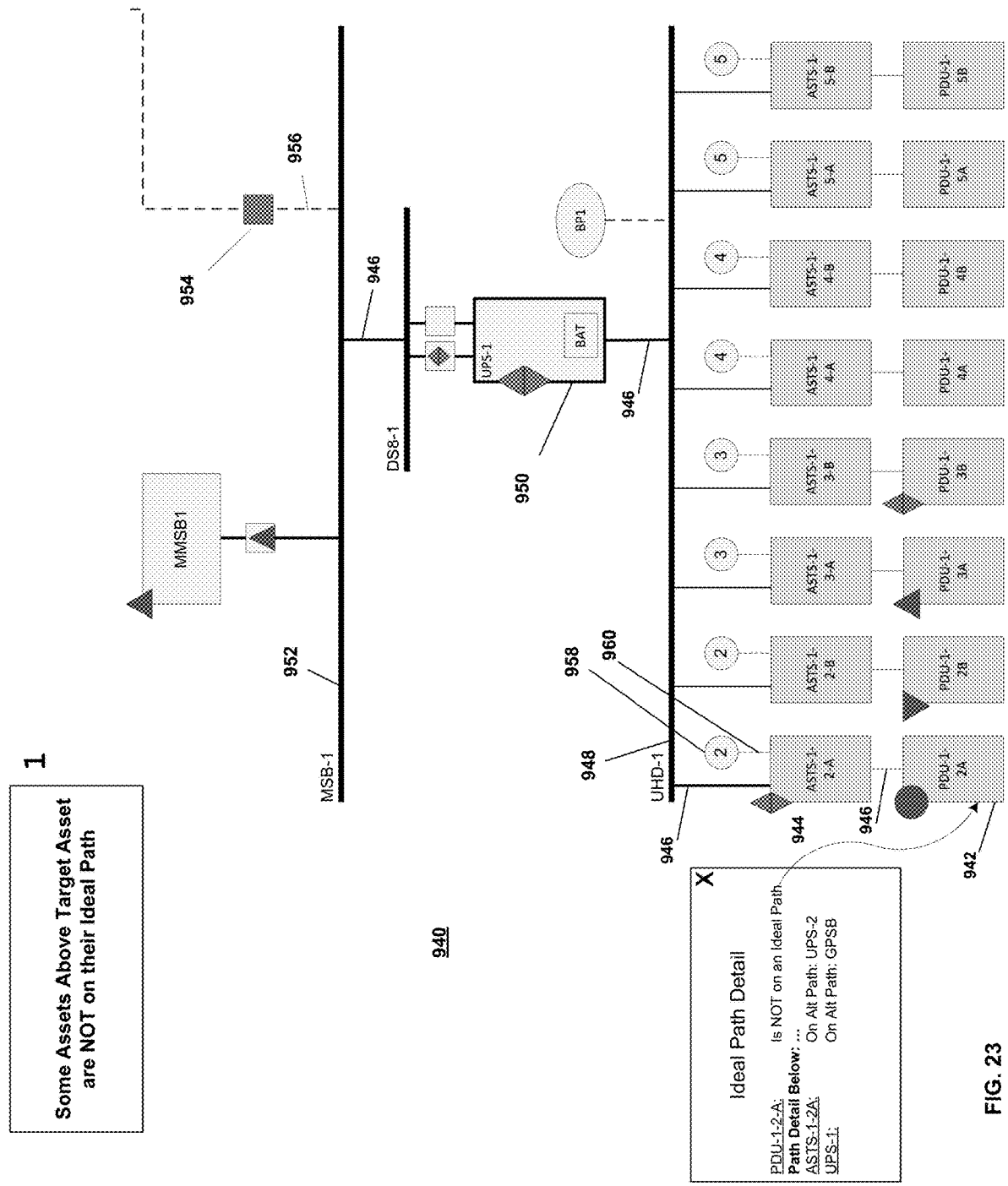
FIGS. 23-26 are schematic diagrams of a data structure hierarchy for determining whether an asset is on an ideal path or is resilient, according to an example of the present disclosure.

FIGS. 23-26 are schematic diagrams of a data structure hierarchy for illustrating whether an asset is on an ideal path or is resilient, according to an example of the present disclosure. As illustrated in FIG. 23, according to one example, an ideal path and resiliency diagram 940 may be generated by the GIMS or customer portal application based on data received from the data center gateway. The data center gateway creates the data by traversing its data structures based on the upstream and downstream properties of the objects associated with the infrastructure assets, and based on derived properties indicating whether an infrastructure asset is resilient and is on an ideal path. The data center gateway may use a structured data format for storing the data. A lower asset 942 in the data center, such as a PDU, for example, has a next upstream or parent asset 944, such as an ASTS, for example, located upstream from the lower asset 942. When a connection line path 946 connecting the lower asset 942 to the parent asset 944 is a solid line connection, this represents a primary/preferred path. When a connection line path such as 946 is shown in a lighter gray color, this indicates the current power path is not flowing through the electrical connection represented by the connection line path 946. When a connection line path such as UHD 948 is shown in a bold black line, this indicates the current power path is flowing through the electrical connection represented by the line.

The data center gateway system may traverse the data structure from parent to child or from child to parent and determines whether a parent data asset 950, such as a UPS, for example, is part of the current power path. The data center gateway 59 may determine this based on data received from DCIM edge system receiving data from the infrastructure assets, and based on tag points indicating whether the assets are operational. If the MSB (monitoring system branch) 952 is on the real-time power path, for example, the data center gateway sends data to GIMS/portal to display a connection line path 946 connecting the data asset 950 to the parent asset 952 as a solid line connection. As in FIG. 23, the next parent data asset 954, such as a generator, for example, has a hash-line connection path 956 connecting the data asset 952 to the generator 954 shown as a bold black hashed-line connection, which would indicate that the asset path of assets downstream to generator 954 is being powered by the generator 954. If any of the connections paths 946 between assets 942, 944 and 948-952 are not black line connections, or the hash-line connection 956 is a black line connection, this may be an indication the asset path is determined by data center gateway not to be an ideal path. Since, in the example shown in FIG. 23, the connection paths between the assets 942, 944 and 948-952 are solid, but the hash-line connection path 956 to the generator 954 is a solid hashed-line connection, indicating that the asset path is being powered by the generator 954, the path is determined not to be an ideal path. The GIMS/portal application may be configured to output a notification box for display specifying details of an ideal path. The assets not on the ideal path may be displayed various icons or colors overlaid on the display to highlight assets having various properties in the current configuration.

In the example of FIG. 23, icon 958 is has a hashed-line connection path 960 from the ATST 944 to the indicator 958 is bold black, as shown in FIG. 23, indicating the power path is going through the backup asset represented by 958.

Figure 24:
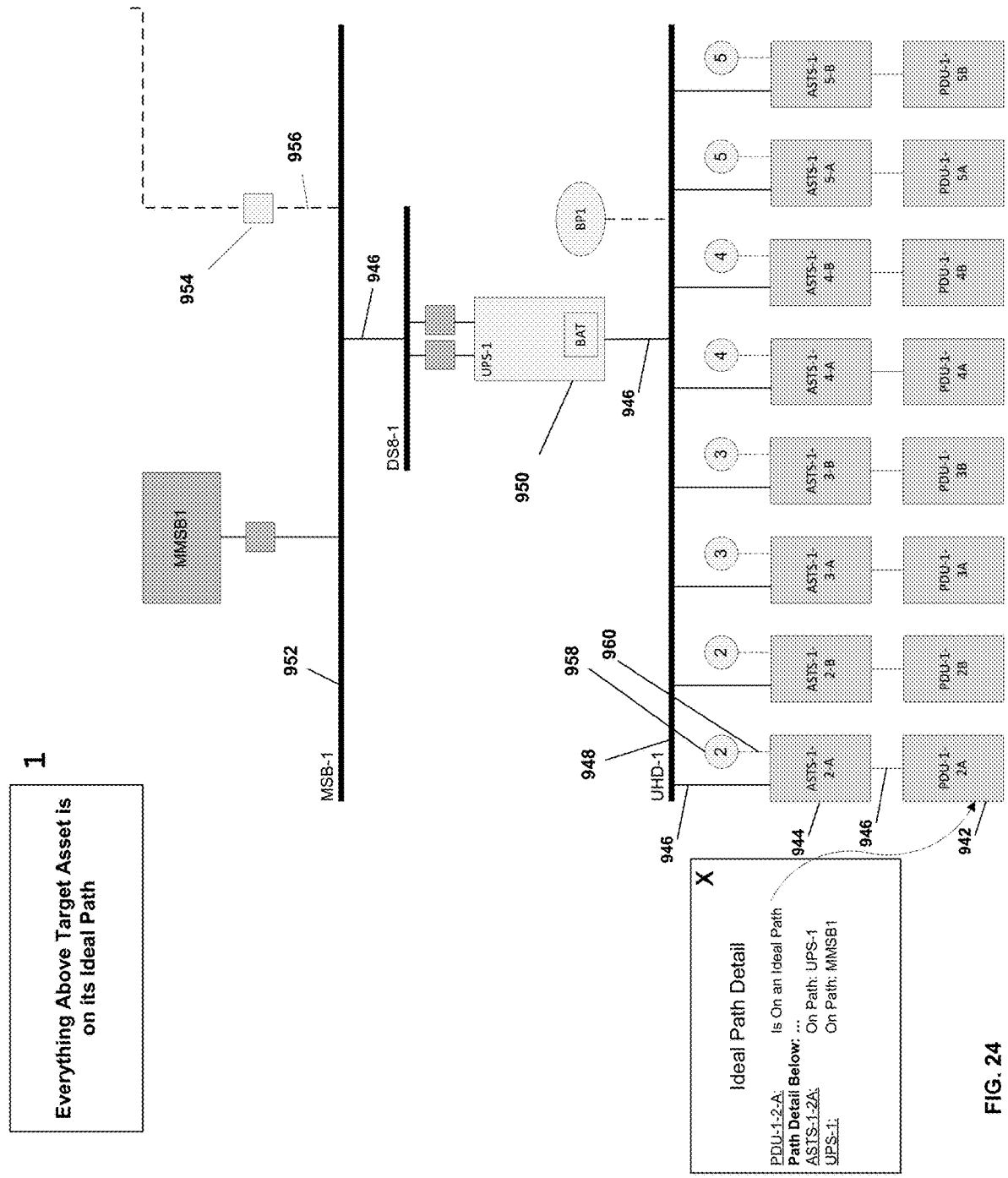

In the example illustrated in FIG. 24, since the connections paths 946 between assets 942, 944 and 948-952 are bold black line connections, and the hash-line connection 956 to the generator 954 is not a bold black line connection, the asset path in FIG. 24 is determined to be an ideal path.

Figure 25:
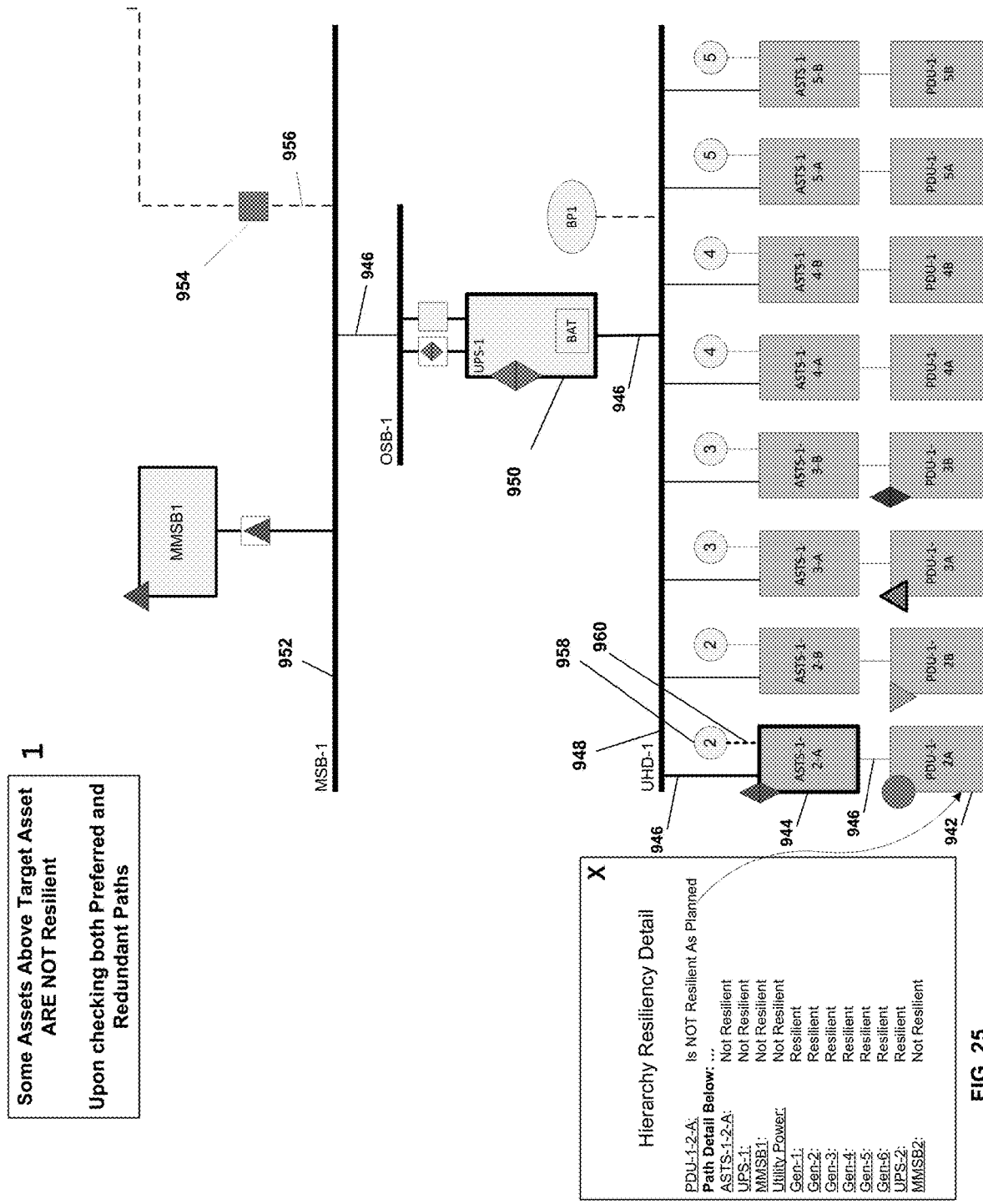

In the example illustrated in FIG. 25, since the connection paths 946 between the assets 942, 944 and 948-952 are bold black, and the hash-lined connection path 956 to the generator 954 is a bold black hashed-line connection, indicating that the asset path is being powered by the generator 954, the path is determined not to be an ideal path. In addition, because the UPS 950 is not resiliently connected by a backup and primary connection to 946, the application outputs an indication that various assets are not resilient as planned. The data center gateway determines which assets should be flagged as not resilient by traversing the data structure to determine which assets are downstream of the affected UPS 950. In this way, the data center gateway identifies child assets of a non-resilient parent asset.

Figure 26:
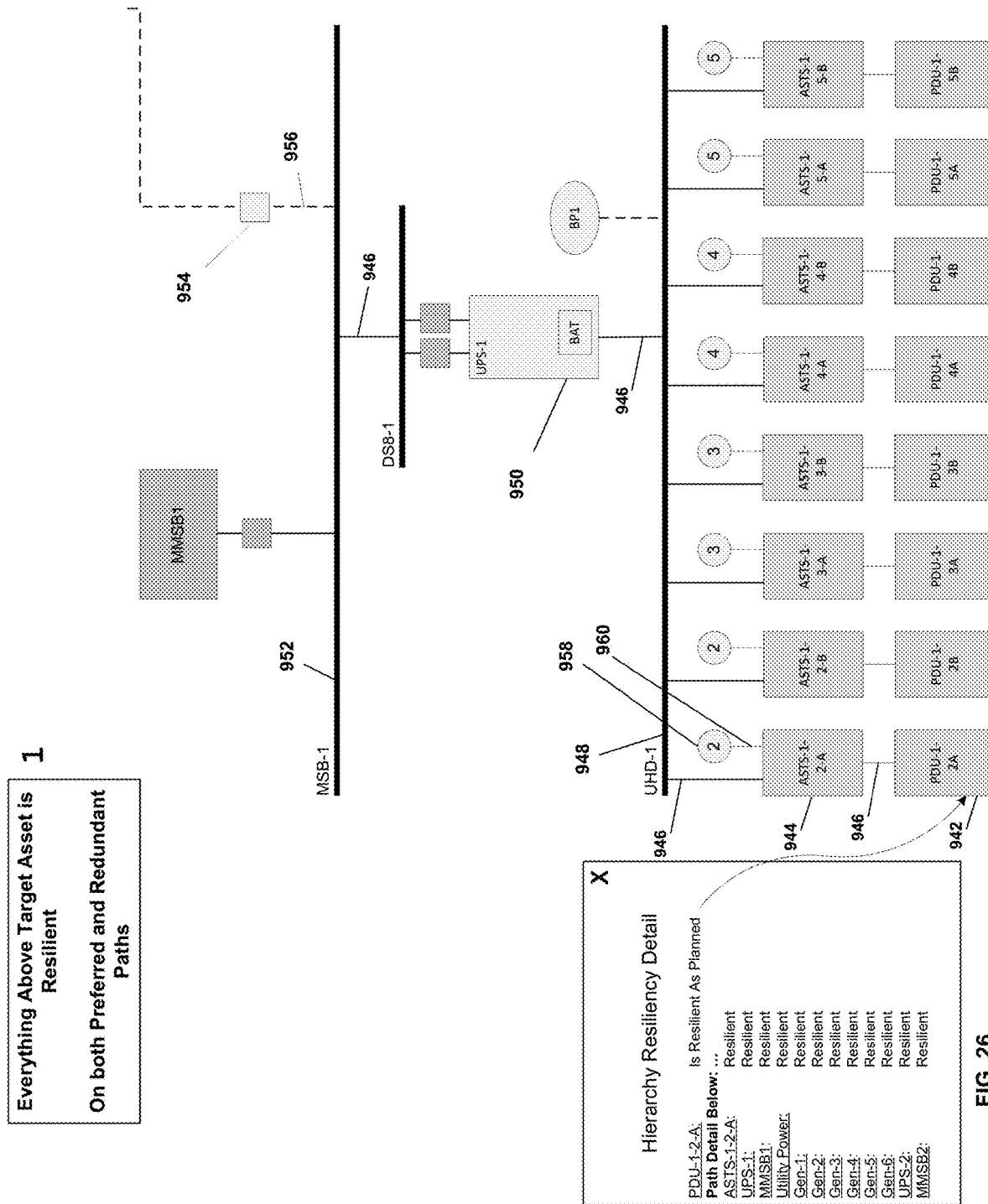

Finally, in the example illustrated in FIG. 26, since the connections paths 946 between assets 942, 944 and 948-952 are bold black line connections, and the hash-line connection 956 to the generator 954 is not a bold black line connection, this illustrates that the real-time power asset path in FIG. 26 is determined by data center gateway to be an ideal path.

Figure 27:
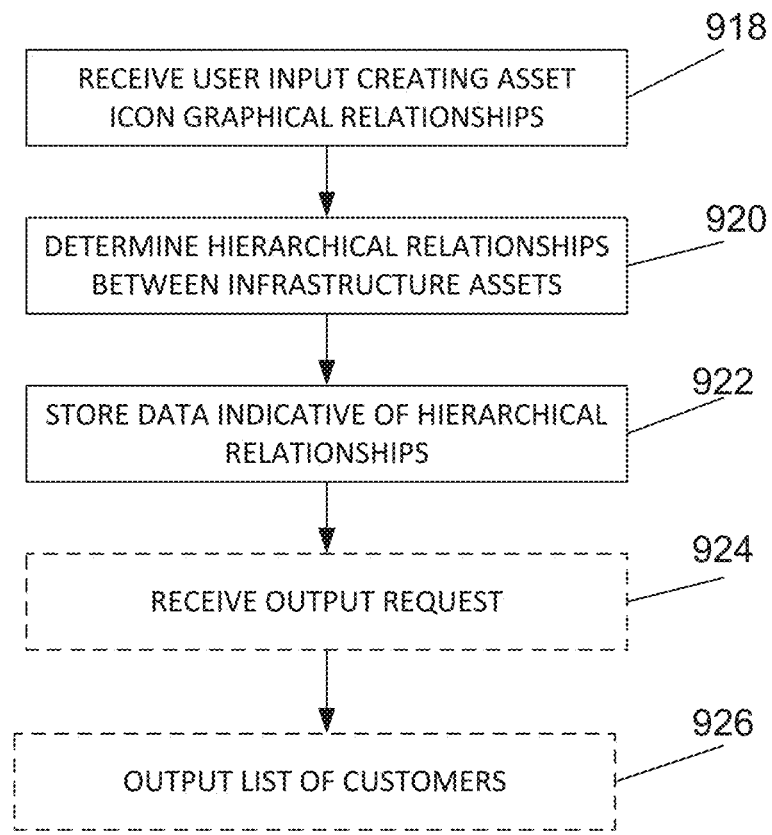
FIG. 27 is a flowchart illustrating example operation of one or more network devices in a data center infrastructure monitoring system in accordance with techniques described herein.

FIG. 27 is a flowchart illustrating example operation of one or more network devices in a data center infrastructure monitoring system in accordance with techniques described herein. As illustrated in FIG. 27, according to one example, computing device 500 receives user inputs, creating a graphical relationship between icons selected by the user depicting infrastructure assets in a data center (918). Computing device 500 determines, based on the graphical relationships, hierarchical relationships between the infrastructure assets in the data center depicted by the icons (920), and stores data indicative of the hierarchical relationships between the infrastructure assets (922). For example, computing device 500 may store the data to storage devices 508 (e.g., local memory). In one example, computing device 500 may store the association between the infrastructure assets and the customer equipment by recording a customer identifier in association with entries for each of the infrastructure assets in a data structure. The computing device 500 may execute a GIMS module 558 that performs one or more of these steps. The GIMS module 558 may send the data to a data center gateway module of the computing device 500 or of a separate computing device. Optionally, in response to receiving an output request from a user (924) computing device 500 outputs a list of customers based on the data indicative of the hierarchical relationships between the infrastructure assets (926).

In one example, in response to receiving a user input requesting a list of customers of the data center affected by one of the infrastructure assets in the data center, computing device 500 may output, for display, the list of customers affected based on the stored association between the infrastructure assets and the customer equipment. In another example, in response to receiving a user input selecting an alarm configured for one of the infrastructure assets in the data center, computing device 500 may output, for display, a list of customers affected by the alarm based on the stored association between the infrastructure assets and the customer equipment. In yet another example, in response to receiving a user input selecting an asset tag point configured for one of the infrastructure assets in the data center, the computing device may output, for display, a list of customers affected by the asset tag point based on the stored association.

Figure 28:
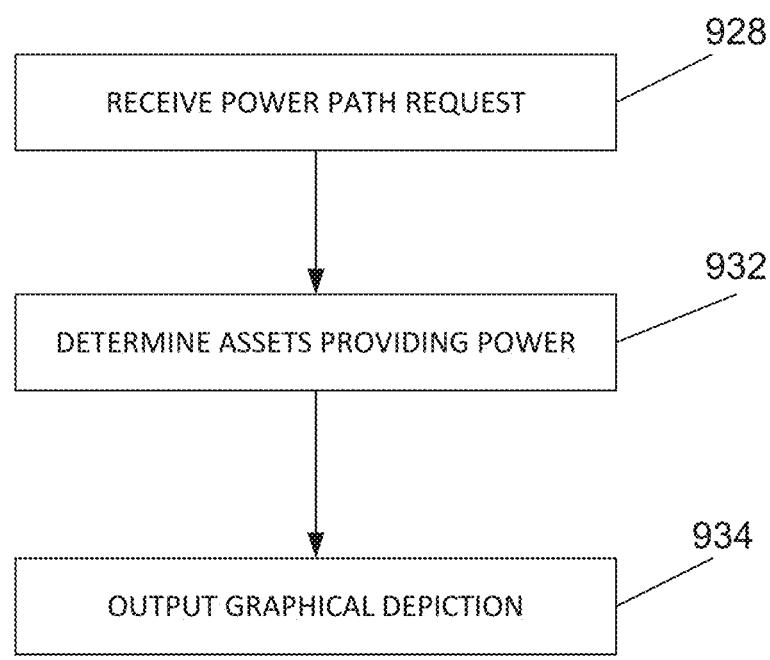
FIG. 28 is a flowchart illustrating example operation of one or more network devices in a data center infrastructure monitoring system in accordance with techniques described herein.

FIG. 28 is a flowchart illustrating example operation of one or more network devices in a data center infrastructure monitoring system in accordance with techniques described herein. As illustrated in FIG. 28, according to one example, computing device 500 receives a request from a customer of a data center to display a real-time power path that shows a current flow of power through a number of assets of the data center (928), such as by a customer portal application and APIs connected to a data center gateway. Computing device 500 (e.g., a data center gateway) determines a subset of the assets of the data center that provide power to equipment of the customer of the data center (932), e.g., based on a customer ID of the customer as logged in to the portal and based on real-time power path asset hierarchy data received from the data center gateway. The computing device 500 outputs for display a graphical depiction of the real-time power path between the subset of the assets of the data center that provide power to equipment of the customer in the data center (934).

FIGS. 29-31 are schematic diagrams illustrating creating alerts in a data monitoring system in accordance with techniques described herein. As shown in FIG. 29, according to one example of the present disclosure, computing device 500 may output a user interface 800 for configuring an alert. For example, user interface 800 may present options for receiving input specifying one or more data center assets for DCIM system 22 to monitor for a primary alert, an event type for the primary alert, and a conditional trigger event upon which raising the alert will be conditioned. For example, a co-location user may choose between environmental, power draw, mechanical and electrical monitoring, and may create one or more alerts for any asset by clicking on one or more create alert link, such as an environmental alert link 802, a power draw alert link 804, a mechanical alert link 806, or an electrical alert link 808. Once one or more create alert links have been chosen, the process is continued by clicking on a "create alert" link 810.

As shown in FIG. 30, once the "create alert" link 810 is selected, an alert window 812 is generated. In the example shown in FIG. 30, environmental alert link 802 was chosen from user interface 800 and is indicated by an alert selected drop down 814. Once the alert window 812 is generated, the user may choose all assets 818 or one or more specific asset type for an IBX from a drop-down menu 816. For example, a one or more IBX zone 820 may be selected, one or more cage 822 may be selected, or one or more cabinet 824 may be selected. An event type 826 may be selected, such as temperature exceeds or falls below a given temperature value 828 or is within a given temperature range, for example, or humidity exceeds or falls below a given value or is within a specific humidity range. In addition, a heartbeat notification 830 may be selected to indicated the time frame over which notification of alerts may be generated. In response to receiving the user inputs creating and configuring the alert, the user may save the generated alert by clicking a save alert link 832, or may cancel generation of the alert by clicking on a cancel alert link 834. In response to the portal application or GIMS receiving the indication to save the alert, the portal application or GIMS may send data indicative of the alert configuration to the data center gateway 59, e.g., via APIs.

In one example, a user may generate a conditional trigger by clicking on a conditional trigger link 836 and choosing a second event, or conditional trigger event, that must occur in addition to the initially selected event in order for an alert to be generated. For example, as shown in FIG. 31, once the save alert link 832 is selected, and the conditional alert link 836 is selected, a second create alert window 838 is generated in which a temperature event may be initially chosen, such as the temperature value exceeding 75 degrees, for example. The user may subsequently select a second event or conditional trigger event in the second create alert window 838 that must occur for the alert to be generated. The user may select one or more of an environmental alert, power draw alert, mechanical alert, or electrical alert from the conditional trigger event dropdown menu 836.

In the example shown in FIG. 31, a power draw alert is chosen as the conditional trigger event from a measurement type dropdown menu 842. Once the conditional trigger event is selected from dropdown menu 842, the user selects an asset to monitor for the conditional trigger even from an asset to monitor drop down menu 844. The user may choose all assets 846 or one or more specific asset type for an IBX from a drop-down menu 844. For example, one or more IBX zone 848 may be selected, one or more cage 850 may be selected, or one or more cabinet 852 may be selected. An event type 854 may be selected, such as power draw exceeding a selected given percent of power draw capacity value 856, such as that the power draw of an asset exceeds a given value, such as 85%, for example. An alert would only be triggered if both the initial event, the temperature value exceeding 75 degrees, for example, and the second event, the power draw of an asset exceeds a given value, such as 85%, for example, are satisfied.

Any combination of environmental, power draw, mechanical and electrical monitoring alerts may be generated so that a user may customize alerts to tell them certain specific information when one of any specific contingent events occur. In one example, a conditional alert may be created so that when the utility power goes out the user receives temperature readings, since cooling systems typically go down during power outages. As a result, the temperature readings may be limited to being received only when the power goes out, for example. In response to receiving the user inputs creating and configuring the conditional alert, the user may save the generated conditional alert by clicking a save alert link 858, or may cancel generation of the alert by clicking on a cancel alert link 860.

In this way, a computing device may output for display a user interface for configuring an alert, wherein the user interface presents options for receiving input specifying one or more data center assets to monitor for a primary alert event, an event type for the primary alert event, and a conditional trigger event upon which raising the alert will be conditioned, receive a user input configuring the alert, and store configuration data for the configured alert based on the user input. For example, the computing device may execute a customer portal application that presents the user interface (e.g., in a web browser) and receives the data indicative of the user inputs, and translates the data to a format for sending to the data center gateway of the DCIM system via APIs in the service layer 120. The data center gateway may receive the data for the configured alert, and store the data to rules for application by the rules engine 133 (FIG. 9). The DCIM system described herein may then monitor the one or more data center assets for occurrence of both the conditional trigger event and the primary alert event, and in response to detecting the conditional trigger event and the primary alert event associated with the configured alert, the rules engine may cause the notification engine 131 to raise the configured alert.

In one example, a user may use a combination of both the conditional alerts and the conditional reports described herein based on of any combination of environmental, power draw, mechanical and electrical monitoring events. In this way, a user may customize both alerts and reports in combination to generate alerts and reports based on certain specific information and only when any specific contingent events occur.

As described above, in one example, in response to receiving a plurality of user inputs creating a graphical relationship between a plurality of icons depicting infrastructure assets in a data center, a computing device may automatically associate respective infrastructure assets depicted by the icons with respective customer cabinets in the data center affected by the infrastructure assets based on the graphical relationship, and store the association between the infrastructure assets and the customer cabinet. In response to receiving a user input requesting a list of customers of the data center affected by one of the infrastructure assets in the data center, the computing device may output the list of customers based on the stored association for display. In another example, in response to receiving a user input selecting an alarm configured for one of the infrastructure assets in the data center, the computing device may output a list of customers affected by the alarm based on the stored association for display.

In another example, in response to receiving a user input selecting an icon depicting an asset from an asset hierarchy tree displayed by a user interface and moving the asset to a dashboard section of the user interface, the computing device may output a plurality of options for information to display about the asset associated with the selected icon, the plurality of options comprising a default information view of the asset and a list of customers affected by the asset. The computing device may receive a user input selecting at least one of the plurality of options, and may output information about the asset according to the selected at least one of the plurality of options for display.

In another example, in response to receiving a user input selecting an icon depicting an asset from an asset hierarchy tree displayed by a user interface and moving the asset to a dashboard section of the user interface, the computing device may output a plurality of options for information to display about the asset associated with the selected icon, the plurality of options comprising a default information view of the asset and a current resiliency status of the asset. The computing device may receive a user input selecting at least one of the plurality of options, and may output information about the asset according to the selected at least one of the plurality of options for display. In another example, in response to receiving a user input selecting an alarm configured for a data center infrastructure asset, the computing device may output a list of customers of the data center affected by the alarm for display to the user.

In another example, a computing device may receive a request from a customer of a data center to display a real-time power path through a plurality of assets of the data center, determine a subset of the plurality of assets of the data center that provide power to equipment of the customer of the data center, and output a graphical depiction of the real-time power path between the subset of the plurality of assets of the data center that provide power to cabinets of the customer in the data center for display to the user. In another example, the plurality of assets may comprise primary assets and backup assets, and outputting the graphical depiction of the real-time power path may comprise showing whether the real-time power path is currently providing power to the cabinets of the customer through primary assets or backup assets.

In another example, the computing device may output a user interface for configuring an alert, wherein the user interface presents options for receiving input specifying one or more data center assets to monitor for a primary alert event, an event type for the primary alert event, and a conditional trigger event upon which raising the alert will be conditioned. The computing device may receive a user input configuring the alert, and may store configuration data for the configured alert based on the user input. In another example, a data center infrastructure monitoring system may monitor the one or more data center assets for the configured alert, and in response to detecting the conditional trigger event and the primary alert event associated with the configured alert, raise the configured alert.

In another example, the computing device may output a user interface for configuring a report, wherein the user interface presents options for receiving input specifying one or more data center assets to monitor for a primary report event, an event type for the primary report event, and a conditional trigger event upon which generating the report will be conditioned. The computing device may receive a user input configuring the report, and may store configuration data for the configured report based on the user input. In another example, a data center infrastructure monitoring system may monitor the one or more data center assets for the configured report, and in response to detecting the conditional trigger event and the primary alert event associated with the configured report, generate the configured report. As a further example, a method includes in response to receiving a user input requesting a current resiliency status of infrastructure assets of a data center affecting data center equipment of a customer of the data center, outputting, by a computing device and for display, information specifying the current resiliency status of the infrastructure assets of the data center affecting the data center equipment of the customer.

Figure 32:
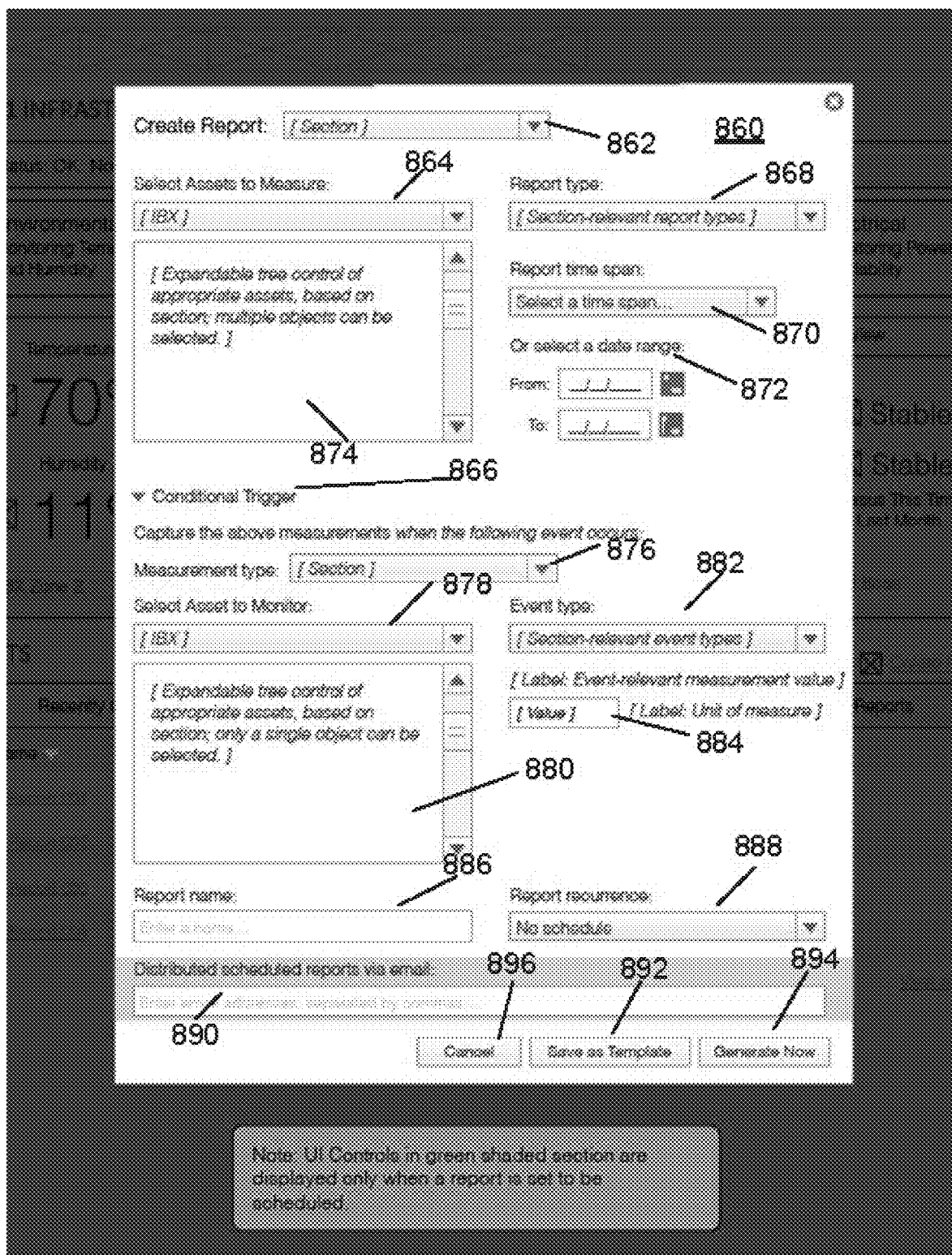
FIG. 32 is a schematic diagram illustrating an example user interface for creating of reports in a data monitoring system in accordance with techniques described herein.

FIG. 32 is a schematic diagram illustrating an example user interface for creating reports in a data center infrastructure monitoring system in accordance with techniques described herein. Similar to the customized alerts that may be created as described above, in another example a co-location user may create customized reports that are to be generated. In one example, conditional reports may be generated by a user for any combination of environmental, power draw, mechanical and electrical monitoring events so that a user may customize reports to report on certain specific information only when one of any specific contingent events occur. In one example the user may indicate that a report of temperature for the last month be generated only when a specific generator or generators were running, resulting in a temperature report being generated only during specific instances. In another example, a user may customize a report so that when an infrastructure asset such as a UPS is operating on batteries, a report is generated to indicate what the load is on a specific cage, so that when load is shifted to a different data center, load fall down or reduction may be monitored by the user. The resulting conditional reports may be received by the user via email, for example, or by any other reports delivery means.

For example, as illustrated in FIG. 32, according to one example of the present disclosure, computing device 500 may output a user interface 860 for configuring a report. For example, user interface 860 may present options for receiving input specifying one or more data center assets for DCIM system 22 to generate the report, select assets for the report, and a conditional trigger event upon which generating the report will be conditioned. For example, a co-location user may choose between environmental, power draw, mechanical and electrical report by clicking on a drop down menu 862 and selecting the desired type of report. The user may select an IBX for the report from a "select assets to measure" drop down menu 864, along with one or more specific assets for the IBX within an asset window 866. Section-relevant report types may be selected using a drop down menu 868, along with a report time span 870 and/or a selected date range 872 for the report.

In one example, a user may also generate a conditional trigger for generation of the report by clicking on a conditional trigger link 874 and choosing a second, conditional event that must occur in addition to the initially selected event in order for the report to be generated, similar to the above described conditional trigger for generating an alert. For example, as shown in FIG. 32, once the conditional trigger link 874 is selected, a measurement type may be selected from a measurement type drop down menu 876, an IBX may be selected from a "select assets to monitor" drop down menu 878, and single asset to monitor for the IBX may be selected from a conditional trigger asset window 880. The user may select one or more event type from a conditional trigger event type window 882, along with an event relevant measurement value from a measurement value drop down menu 884. The user may also enter a report name to identify the report in a report name window 886, select when the report should be generated in a report occurrence window 888, and select where the report should be distributed in a distributed schedule indicator window 890. The report may then be saved as a template by clicking a save as template tab 892, generate the report immediately by clicking a "generate now" tab 894, or cancel the conditional trigger report by clicking a cancel tab 896.

In one example, a user may also generate a conditional trigger for generation of the report by clicking on a conditional trigger link 874 and choosing a second, conditional event that must occur in addition to the initially selected event in order for the report to be generated, similar to the above described conditional trigger for generating an alert. For example, as shown in FIG. 32, once the conditional trigger link 874 is selected, a measurement type may be selected from a measurement type drop down menu 876, an IBX may be selected from a "select assets to monitor" drop down menu 878, and single asset to monitor for the IBX may be selected from a conditional trigger asset window 880. The user may select one or more event type from a conditional trigger event type window 882, along with an event relevant measurement value from a measurement value drop down menu 884. The user may also enter a report name to identify the report in a report name window 886, select when the report should be generated in a report occurrence window 888, and select where the report should be distributed in a distributed schedule indicator window 890. The report may then be saved as a template by clicking a save as template tab 892, generate the report immediately by clicking a "generate now" tab 894, or cancel the conditional trigger report by clicking a cancel tab 896. In response to the portal application or GIMS receiving the indication to save the report, the portal application or GIMS may send data indicative of the report configuration to the data center gateway 59, e.g., via APIs.

Figure 33:
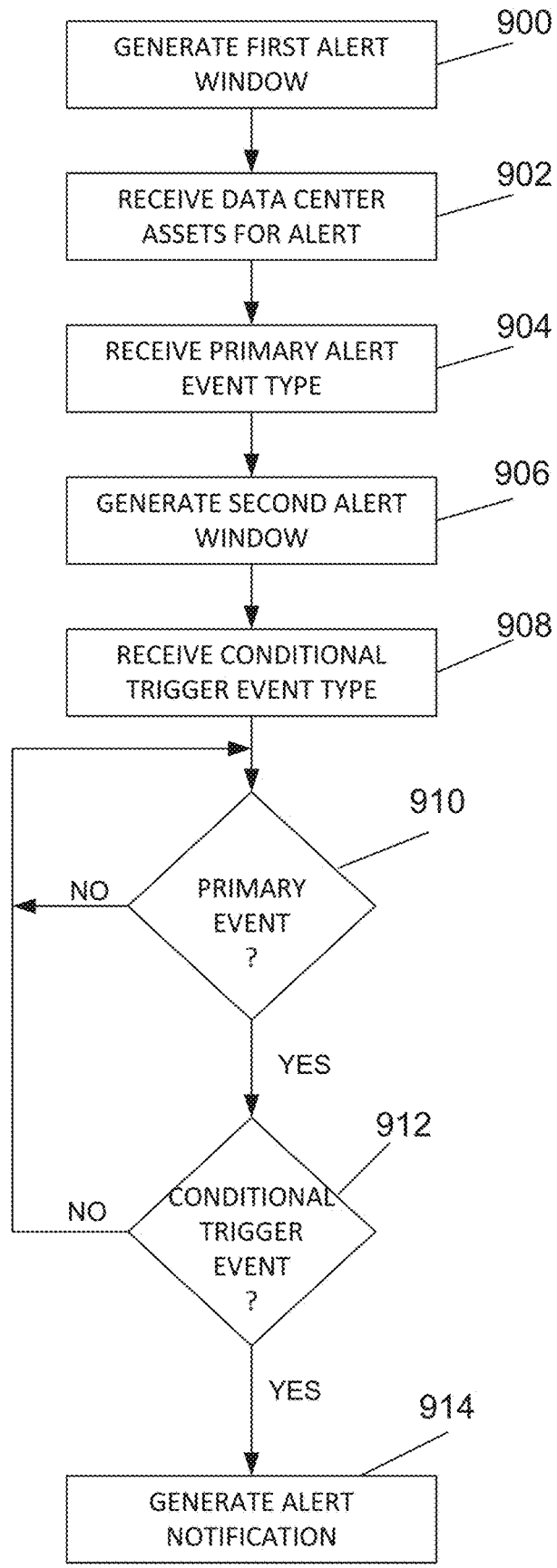
FIG. 33 is a flowchart illustrating example operation of one or more network devices in a data center infrastructure monitoring system in accordance with techniques described herein.

FIG. 33 is a flowchart illustrating example operation of one or more network devices in a data center infrastructure monitoring system in accordance with techniques described herein. As illustrated in FIG. 33, according to one example, computing device 500 may output a user interface for creating an alert and create or generate a first alert window (900). Computing device 500 receives data indicating selection of one or more data center assets for an alert selected from the first window by a user (902), along with data indicating selection of a primary alert event (904). If a conditional trigger event type is selected by the user, computing device 500 generates a second alert window (906), and receives data indicating selection of a conditional trigger event selected by the user from the second alert window, (908). Computing device 500 stores the data for configuring the primary alert event and the conditional trigger. some examples, computing device may send the data to the data center gateway 59. For example the data may be stored by data center gateway as rules for application by the rules engine of data center gateway 59. The data center gateway 59 collects data from the DCIM edges and the rules engine monitors the data from selected one or more data center assets and determines, based on the stored selected data, whether both the selected primary event has occurred (910), and the selected conditional trigger alert has occurred (912). In response to detecting both the primary event and the conditional trigger event associated with the created alert have occurred, the data center gateway (which may be part of computing device 500 or separate) may provide an alert notification according to the alert configuration (914).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset. If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor. A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. In some examples, the computer-readable storage media may comprise nontransitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   storing, by a computing device in a first database, data indicative of associations between a plurality of mechanical assets that provide cooling in a data center and corresponding customer identifiers (IDs) associated with customers having customer equipment cooled by a corresponding one or more of the mechanical assets;

receiving, by the computing device, a request to display data indicative of any of the plurality of mechanical assets providing cooling to customer equipment of a first customer;

determining, by the computing device and based on the request and the first database, a first subset of the plurality of mechanical assets that are associated with a first customer ID associated with the first customer and provide cooling to the customer equipment of the first customer, wherein a second subset of the plurality of mechanical assets provide cooling to customer equipment of a second customer and do not provide cooling to the customer equipment of the first customer, wherein the second customer is associated with a second customer ID different than the first customer ID; and outputting, by the computing device and for display, a graphical depiction of mechanical assets that include only the first subset of the plurality of mechanical assets that are associated with the first customer ID and provide cooling to the customer equipment of the first customer.

2. The method of claim 1, wherein outputting, by the computing device and for display, the graphical depiction of mechanical assets that include only the first subset of the plurality of mechanical assets that are associated with the first customer ID and provide cooling to customer equipment of the first customer comprises:

outputting, by the computing device and for display, a flow path of a flow of cool water through the plurality of mechanical assets to only the first subset of the plurality of mechanical assets that are associated with the first customer ID.

3. The method of claim 1, further comprises:

receiving, by the computing device, a request to display a first subset of zones of a plurality of zones affected by the first subset of the plurality of mechanical assets that are associated with the first customer ID.

4. The method of claim 1, wherein the plurality of mechanical assets comprises primary assets and backup assets, wherein outputting the graphical depiction of the first subset of the plurality of mechanical assets that are associated with the first customer ID and provide cooling to the customer equipment of the first customer comprises outputting a graphical indication of whether the cooling is provided through the primary assets or the backup assets.

5. The method of claim 4, further comprising outputting, by the computing device and for display, an option to view further details about the backup assets.

6. The method of claim 1, further comprising:

in response to receiving, by the computing device, indications of a plurality of user inputs creating one or more graphical relationships between a plurality of icons depicting the plurality of mechanical assets, determining, by the computing device and based on the graphical relationships, hierarchical relationships between the plurality of mechanical assets as depicted by the icons; and storing, by the computing device, the data indicative of the hierarchical relationships between the plurality of mechanical assets, wherein determining the first subset of the plurality of mechanical assets that are associated with the first customer ID and provide cooling to customer equipment of the first customer further comprises determining the first subset based on data indicative of associations between the plurality of mechanical assets and one or more customer cabinets assigned to the first customer.

7. The method of claim 1, wherein receiving the request to display data indicative of any of the plurality of mechanical assets providing cooling to customer equipment of the first customer comprises:

receiving an indication of one or more customer cabinets in the data center, and wherein outputting the graphical depiction of mechanical assets that include only the first subset of the plurality of mechanical assets that are associated with the first customer ID and provide cooling to customer equipment of the first customer comprises: outputting a flow path of a flow of cool water between only those mechanical assets of the plurality of mechanical assets that provide cooling to the one or more customer cabinets in the data center.

8. The method of claim 1, receiving the request to display data indicative of any of the plurality of mechanical assets providing cooling to customer equipment of the first customer comprises: receiving an indication of one or more customer cages in the data center, and wherein outputting the graphical depiction of mechanical assets that include only the first subset of the plurality of mechanical assets that are associated with the first customer ID and provide cooling to customer equipment of the first customer comprises: outputting a flow path of a flow of cool water between only those mechanical assets of the plurality of mechanical assets that provide cooling to the one or more customer cages in the data center.

9. The method of claim 1, wherein receiving the request to display data indicative of any of the plurality of mechanical assets providing cooling to customer equipment of a first customer comprises: receiving an indication of one or more customer circuits in the data center, and wherein outputting the graphical depiction of mechanical assets that include only the first subset of the plurality of mechanical assets that are associated with the first customer ID and provide cooling to customer equipment of the first customer comprises: outputting a flow path of a flow of cool water between only those mechanical assets of the plurality of mechanical assets that provide cooling to the one or more customer circuits in the data center.

10. The method of claim 2, further comprising, in response to determining, by a data center infrastructure monitoring system, that the flow path of the flow of cool water through the plurality of mechanical assets of the data center has changed, automatically outputting, by the computing device and for display, an updated graphical depiction of a new current flow path of the flow of cool water through the plurality of mechanical assets to only the first subset of the plurality of mechanical assets that are associated with the first customer ID.

11. The method of claim 1, wherein receiving the request to display data indicative of any of the plurality of mechanical assets providing cooling to customer equipment of a first customer comprises receiving the request from a customer user having a user ID associated with the first customer ID, the method further comprising:

confirming, by the computing device and prior to outputting, for display, the graphical depiction, the user ID has been authenticated and is authorized to access information associated with the first customer ID.

12. A data center infrastructure monitoring system comprising:
- a plurality of geographically distributed data centers, each data center of the plurality of data centers comprising a corresponding plurality of mechanical assets; and
- a data center gateway system communicatively coupled to one or more data centers of the plurality of data centers, wherein the data center gateway system is configured to, for each data center of the one or more data centers:
  - store, in a first database, data indicative of associations between a plurality of mechanical assets that provide cooling in the data center and corresponding customer identifiers (IDs) associated with customers having customer equipment cooled by a corresponding one or more of the mechanical assets;
  - receive a request to display data indicative of any of the plurality of mechanical assets providing cooling to customer equipment of a first customer;
  - determine, based on the request and the first database, a first subset of the plurality of mechanical assets that are associated with a first customer ID associated with the first customer and provide cooling to the customer equipment of the first customer, wherein a second subset of the plurality of mechanical assets provide cooling to customer equipment of a second customer and do not provide cooling to the customer equipment of the first customer, wherein the second customer is associated with a second customer ID different than the first customer ID; and
  - output, for display, a graphical depiction of mechanical assets that include only the first subset of the plurality of mechanical assets that are associated with the first customer ID and provide cooling to the customer equipment of the first customer.

13. The system of claim 12, wherein the data center gateway system is further configured to output, for display, a flow path of a flow of cool water through the plurality of mechanical assets to the first subset of the plurality of mechanical assets that are associated with the first customer ID.

14. The system of claim 12, wherein the data center gateway system is further configured to receive a request from the first customer to display a first subset of zones of a plurality of zones that are affected by the first subset of the plurality of mechanical assets that are associated with the first customer ID.

15. The system of claim 12, wherein the plurality of mechanical assets comprises primary assets and backup assets, wherein outputting the graphical depiction of the first subset of the plurality of mechanical assets that are associated with the first customer ID and provide cooling to customer equipment of the first customer comprises outputting a graphical indication of whether the cooling is provided through the primary assets or the backup assets.

16. The system of claim 15, wherein the data center gateway system is further configured to output, for display, an option to view further details about the backup assets.

17. The system of claim 12, wherein the data center gateway system is further configured to, in response to receive indications of a plurality of user inputs creating one or more graphical relationships between a plurality of icons depicting the plurality of mechanical assets, determine, based on the graphical relationships, hierarchical relationships between the plurality of mechanical assets as depicted by the icons, and store the data indicative of the hierarchical relationships between the plurality of mechanical assets, and wherein the data center gateway system is further configured to determine the first subset based on data indicative of associations between the plurality of mechanical assets and one or more customer cabinets assigned to the first customer.

18. The system of claim 12, wherein the data center gateway system is further configured to receive an indication of one or more customer cabinets in the data center, and output, for display, a flow path of a flow of cool water between only those mechanical assets of the plurality of mechanical assets of the data center that provide cooling to the one or more customer cabinets in the data center.

19. The system of claim 12, wherein the data center gateway system is further configured to receive an indication of one or more customer cages in the data center, and output, for display, a flow path of a flow of cool water between only those mechanical assets of the plurality of mechanical assets of the data center that provide cooling to the one or more customer cages in the data center.

20. The system of claim 12, wherein the data center gateway system is further configured to receive an indication of one or more customer circuits in the data center, and output, for display, a flow path of a flow of cool water between only those mechanical assets of the plurality of mechanical assets of the data center that provide cooling to the one or more customer circuits in the data center.

21. The system of claim 13, wherein the data center gateway system is further configured to, in response to the determination that the flow path of the flow of cool water through the plurality of mechanical assets of the data center has changed, automatically output, for display, an updated graphical depiction of a new current flow path of the flow of cool water through the plurality of mechanical assets of the data center to only the first subset of the plurality of mechanical assets of the data center that are associated with the first customer ID.

22. A data center gateway system comprising processing circuitry having access to a storage device, the processing circuitry configured to:
- store, in a first database, data indicative of associations between a plurality of mechanical assets that provide cooling in a data center and corresponding customer identifiers (IDs) associated with customers having customer equipment cooled by a corresponding one or more of the mechanical assets;
- receive a request to display data indicative of any of the plurality of mechanical assets providing cooling to customer equipment of a first customer;
- determine, based on the request and the first database, a first subset of the plurality of mechanical assets that are associated with a first customer ID associated with the first customer and provide cooling to the customer equipment of the first customer, wherein a second subset of the plurality of mechanical assets provide cooling to customer equipment of a second customer and do not provide cooling to the customer equipment of the first customer, wherein the second customer is associated with a second customer ID different than the first customer ID; and
- output, for display, a graphical depiction of mechanical assets that include only the first subset of the plurality of mechanical assets that are associated with the first customer ID and provide cooling to the customer equipment of the first customer.

\* \* \* \* \*